US008279531B2

(12) United States Patent
Yamaguchi et al.

(10) Patent No.: US 8,279,531 B2
(45) Date of Patent: Oct. 2, 2012

(54) ZOOM LENS SYSTEM, IMAGING DEVICE AND CAMERA

(75) Inventors: Shinji Yamaguchi, Osaka (JP); Takehiro Nishioka, Nara (JP); Takuya Imaoka, Kanagawa (JP); Shunichiro Yoshinaga, Hyogo (JP)

(73) Assignee: Panasonic Corporation, Osaka (JP)

( * ) Notice: Subject to any disclaimer, the term of this patent is extended or adjusted under 35 U.S.C. 154(b) by 310 days.

(21) Appl. No.: 12/646,010

(22) Filed: Dec. 23, 2009

(65) Prior Publication Data
US 2010/0165480 A1 Jul. 1, 2010

(30) Foreign Application Priority Data

Dec. 25, 2008 (JP) .................................. 2008-330997
Dec. 25, 2008 (JP) .................................. 2008-330998
Dec. 25, 2008 (JP) .................................. 2008-330999
Dec. 25, 2008 (JP) .................................. 2008-331000
Dec. 25, 2008 (JP) .................................. 2008-331002

(51) Int. Cl.
*G02B 15/14* (2006.01)
(52) U.S. Cl. ........................ 359/686; 359/680
(58) Field of Classification Search ......... 359/680–682, 359/689, 686
See application file for complete search history.

(56) References Cited

U.S. PATENT DOCUMENTS

| 7,426,084 | B2* | 9/2008 | Bito et al. ............ 359/784 |
| 7,567,389 | B2* | 7/2009 | Souma ............ 359/682 |
| 7,623,298 | B2* | 11/2009 | Sudoh ............ 359/683 |
| 7,630,139 | B2* | 12/2009 | Souma ............ 359/676 |
| 7,755,846 | B2* | 7/2010 | Wada ............ 359/688 |
| 2005/0285970 | A1 | 12/2005 | Yamaguchi et al. |
| 2006/0066953 | A1 | 3/2006 | Nishio et al. |
| 2006/0221212 | A1 | 10/2006 | Hankawa et al. |
| 2007/0229973 | A1 | 10/2007 | Souma |
| 2008/0198484 | A1 | 8/2008 | Shinohara |

FOREIGN PATENT DOCUMENTS

| JP | 2005-084151 A | 3/2005 |
| JP | 2006-011186 A | 1/2006 |
| JP | 2006-098961 A | 4/2006 |
| JP | 2006-284790 A | 10/2006 |
| JP | 2007-072291 A | 3/2007 |
| JP | 2007-108715 A | 4/2007 |
| JP | 2007-279147 A | 10/2007 |
| JP | 2008-191306 A | 8/2008 |
| JP | 2008-197594 A | 8/2008 |
| WO | WO 2009/096152 * | 8/2009 |
| WO | WO 2009/096157 * | 8/2009 |

* cited by examiner

Primary Examiner — Jordan Schwartz
(74) Attorney, Agent, or Firm — Pearne & Gordon LLP

(57) ABSTRACT

A zoom lens system, in order from an object side to an image side, comprising a first lens unit having negative optical power, a second lens unit having positive optical power, and at least one subsequent lens unit having optical power, wherein in zooming from a wide-angle limit to a telephoto limit, the lens units are moved along an optical axis such that an air space between at least any two lens units among the lens units should vary, so that variable magnification is achieved, wherein the first lens unit includes a lens element having a reflecting surface for bending a light beam incident from the object, and wherein the condition is satisfied: $0.20<|f_{G1}|/f_T<0.52$ ($f_T/f_W \geq 4.0$, $f_{G1}$ is a composite focal length of the first lens unit, and each of $f_T$ and $f_W$ is a focal length of the entire system at a telephoto limit or a wide-angle limit), an imaging device and a camera are provided.

7 Claims, 65 Drawing Sheets

ZOOM LENS SYSTEM, IMAGING DEVICE AND CAMERA

CROSS-REFERENCE TO RELATED APPLICATION

This application is based on application Nos. 2008-330997, 2008-330998, 2008-330999, 2008-331000 and 2008-331002 filed in Japan on Dec. 25, 2008, the contents of which are hereby incorporated by reference.

BACKGROUND OF THE INVENTION

1. Field of the Invention

The present invention relates to a zoom lens system, an imaging device and a camera. In particular, the present invention relates to: a high-performance zoom lens system that has a reduced size with a short overall length of lens system and still has a high resolution and a relatively high zooming ratio of 4 or greater and that is satisfactorily applicable in wide-angle image taking; an imaging device employing this zoom lens system; and a thin and compact camera employing this imaging device.

Further, in particular, the present invention relates to: a high-performance zoom lens system that has a remarkably reduced size with a short overall length of lens system and still achieves a high resolution and a zooming ratio of approximately 3 or greater and that is satisfactorily applicable in wide-angle image taking; an imaging device employing this zoom lens system; and a thin and compact camera employing this imaging device.

Further, in particular, the present invention relates to: a high-performance zoom lens system that has a remarkably reduced size with a short overall length of lens system and still achieves a high resolution and a zooming ratio of approximately 3 or greater and that is satisfactorily applicable in wide-angle image taking and further provided with a blur compensation function of optically compensating image blur caused by hand blurring, vibration and the like; an imaging device employing this zoom lens system; and a thin and compact camera employing this imaging device.

2. Description of the Background Art

Remarkably strong requirements of size reduction and performance improvement are present in digital still cameras and digital video cameras (simply referred to as digital cameras, hereinafter) provided with an image sensor for performing photoelectric conversion. In particular, in recent years, thin digital cameras are requested in which top priority is imparted to storability and portability. As one of means for realizing such thin digital cameras, various kinds of zoom lens systems have been proposed in which the light beam incident from the object is bent.

Japanese Laid-Open Patent Publication No. 2008-197594 discloses a zoom lens, in order from the object, comprising: a first lens unit fixed during zooming and having negative refractive power; a second lens unit fixed during zooming and composed of a prism for bending the optical path and not having refractive power; a third lens unit moved during zooming and having positive refractive power; a fourth lens unit moved during zooming and having negative refractive power; and a fifth lens unit fixed during zooming and having positive refractive power.

Japanese Laid-Open Patent Publication No. 2008-191306 discloses an image formation optical system comprising a positive lens unit, a negative lens unit and a diaphragm, wherein: the negative lens unit is arranged on the object side relative to the diaphragm; the negative lens unit has a cemented lens constructed by cementing a plurality of lenses; in at least one lens constituting the cemented lens, the physical properties of the glass material thereof are specified by two conditions; and a prism is provided for bending the optical path of the optical system.

Japanese Laid-Open Patent Publication No. 2007-279147 discloses a variable magnification optical system comprising a plurality of lens units for causing light from an object side to form an image onto an image surface of an image sensor, wherein the plurality of lens units, in order from the object side to the image side, at least includes a first lens unit having negative optical power, a second lens unit having positive optical power, a third lens unit having negative optical power, and a fourth lens unit having positive optical power, wherein the second lens unit moves within a plane perpendicular to the optical axis so that image blur on the image surface is compensated, and wherein the first lens unit includes an optical axis changing element.

Japanese Laid-Open Patent Publication No. 2007-108715 discloses an image formation optical system comprising a positive lens unit, a negative lens unit and a diaphragm, wherein: the negative lens unit is arranged on the image surface side relative to the diaphragm; the negative lens unit has a cemented lens constructed by cementing a plurality of lenses; in at least one lens constituting the cemented lens, the physical properties of the glass material thereof are specified by three conditions; and a prism is provided for bending the optical path of the optical system.

Nevertheless, in the zoom lenses and the optical systems disclosed in the patent documents, although size reduction is achieved to an extent applicable to thin and compact digital cameras, their zooming ratio is as low as approximately 3 or smaller and does not satisfy the requirement for digital cameras in recent years.

Further, the zoom lenses and the optical systems disclosed in the patent documents do not satisfy the requirements for digital cameras in recent years that the devices should be remarkably thin and compact and still applicable in wide-angle image taking.

Further, the zoom lenses and the optical systems disclosed in Japanese Laid-Open Patent Publication Nos. 2008-197594, 2008-191306 and 2007-108715 are not provided with a blur compensation function of optically compensating image blur caused by hand blurring, vibration and the like. Moreover, in the optical system disclosed in Japanese Laid-Open Patent Publication No. 2007-279147, although a blur compensation function is provided, a second lens unit located at a second position from the object side is moved in a direction perpendicular to the optical axis direction. Then, since the second lens unit is a lens unit to be moved during zooming, a mechanical configuration is required that realizes both of the movement in the optical axis direction and the movement in a direction perpendicular to the optical axis. This causes size increase in the lens barrel.

SUMMARY OF THE INVENTION

An object of the present invention is to provide: a high-performance zoom lens system that has a reduced size with a short overall length of lens system and still has a high resolution and a relatively high zooming ratio and that is satisfactorily applicable in wide-angle image taking; an imaging device employing this zoom lens system; and a thin and compact camera employing this imaging device.

Another object of the present invention is to provide: a high-performance zoom lens system that has a remarkably reduced size with a short overall length of lens system and still achieves a high resolution and a zooming ratio of a medium order of magnitude and that is satisfactorily applicable in wide-angle image taking; an imaging device employing this zoom lens system; and a thin and compact camera employing this imaging device.

Yet another object of the present invention is to provide: a high-performance zoom lens system that has a remarkably reduced size with a short overall length of lens system and still achieves a high resolution and a zooming ratio of a medium order of magnitude and that is satisfactorily applicable in wide-angle image taking and further provided with a blur compensation function of optically compensating image blur caused by hand blurring, vibration and the like; an imaging device employing this zoom lens system; and a thin and compact camera employing this imaging device.

(I) The novel concepts disclosed herein were achieved in order to solve the foregoing problems in the conventional art, and herein is disclosed:

a zoom lens system, in order from an object side to an image side, comprising a first lens unit having negative optical power, a second lens unit having positive optical power, and at least one subsequent lens unit having optical power, wherein in zooming from a wide-angle limit to a telephoto limit at the time of image taking, the lens units are moved along an optical axis such that an air space between at least any two lens units among the first lens unit, the second lens unit and the subsequent lens unit should vary, so that variable magnification is achieved, wherein the first lens unit includes a lens element having a reflecting surface for bending a light beam incident from the object, and wherein the following condition (I-1) is satisfied:

$$0.20 < |f_{G1}|/f_T < 0.52 \quad (I\text{-}1)$$

(here, $f_T/f_W \geq 4.0$)

where, $f_{G1}$ is a composite focal length of the first lens unit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, the lens units are moved along an optical axis such that an air space between at least any two lens units among the first lens unit, the second lens unit and the subsequent lens unit should vary, so that variable magnification is achieved, wherein the first lens unit includes a lens element having a reflecting surface for bending a light beam incident from the object, and wherein the following condition (I-1) is satisfied:

$$0.20 < |f_{G1}|/f_T < 0.52 \quad (I\text{-}1)$$

(here, $f_T/f_W \cong 4.0$)

where, $f_{G1}$ is a composite focal length of the first lens unit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, the lens units are moved along an optical axis such that an air space between at least any two lens units among the first lens unit, the second lens unit and the subsequent lens unit should vary, so that variable magnification is achieved, wherein the first lens unit includes a lens element having a reflecting surface for bending a light beam incident from the object, and wherein the following condition (I-1) is satisfied:

$$0.20 < |f_{G1}|/f_T 0.52 \quad (I\text{-}1)$$

(here, $f_T/f_W \geq 4.0$)

where, $f_{G1}$ is a composite focal length of the first lens unit, $f_T$ is a focal length of the entire system at a telephoto limit, and $f_W$ is a focal length of the entire system at a wide-angle limit.

(II) The novel concepts disclosed herein were achieved in order to solve the foregoing problems in the conventional art, and herein is disclosed:

a zoom lens system, in order from an object side to an image side, comprising a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along an optical axis so that variable magnification is achieved, while the first lens unit is not moved along the optical axis, and wherein the following condition (II-1) is satisfied:

$$2.45 < T_{G2}/f_W < 4.90 \quad (II\text{-}1)$$

(here, $f_T/f_W \geq 4.0$)

where, $T_{G2}$ is an amount of axial movement of the second lens unit in zooming from a wide-angle limit to a telephoto limit at the time of image taking, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, while the first lens unit is not moved along the optical axis, and wherein the following condition (II-1) is satisfied:

$$2.45 < T_{G2}/f_W < 4.90 \quad (\text{II-1})$$

(here, $f_T/f_W \geqq 4.0$)

where, $T_{G2}$ is an amount of axial movement of the second lens unit in zooming from a wide-angle limit to a telephoto limit at the time of image taking, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, while the first lens unit is not moved along the optical axis, and wherein the following condition (II-1) is satisfied:

$$2.45 < T_{G2}/f_W < 4.90 \quad (\text{II-1})$$

(here, $f_T/f_W \geqq 4.0$)

where, $T_{G2}$ is an amount of axial movement of the second lens unit in zooming from a wide-angle limit to a telephoto limit at the time of image taking, $f_T$ is a focal length of the entire system at a telephoto limit, and $f_W$ is a focal length of the entire system at a wide-angle limit.

(III) The novel concepts disclosed herein were achieved in order to solve the foregoing problems in the conventional art, and herein is disclosed:

a zoom lens system, in order from an object side to an image side, at least comprising a first lens unit having negative optical power, a second lens unit having positive optical power, and a third lens unit having negative optical power, wherein in zooming from a wide-angle limit to a telephoto limit at the time of image taking, the lens units are moved along an optical axis such that an air space between the first lens unit and the second lens unit and an air space between the second lens unit and the third lens unit should vary, so that variable magnification is achieved, and wherein the following condition (III-1) is satisfied:

$$1.25 < \beta_{3T}/\beta_{3W} < 1.90 \quad (\text{III-1})$$

(here, $f_T/f_W \geqq 4.0$)

where, $\beta_{3T}$ is a lateral magnification of the third lens unit at a telephoto limit in an infinity in-focus condition, $\beta_{3W}$ is a lateral magnification of the third lens unit at a wide-angle limit in an infinity in-focus condition, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, at least comprises a first lens unit having negative optical power, a second lens unit having positive optical power, and a third lens unit having negative optical power, wherein in zooming from a wide-angle limit to a telephoto limit at the time of image taking, the lens units are moved along an optical axis such that an air space between the first lens unit and the second lens unit and an air space between the second lens unit and the third lens unit should vary, so that variable magnification is achieved, and wherein the following condition (III-1) is satisfied:

$$1.25 < \beta_{3T}/\beta_{3W} < 1.90 \quad (\text{III-1})$$

(here, $f_T/f_W \geqq 4.0$)

where, $\beta_{3T}$ is a lateral magnification of the third lens unit at a telephoto limit in an infinity in-focus condition, $\beta_{3W}$ is a lateral magnification of the third lens unit at a wide-angle limit in an infinity in-focus condition, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, at least comprises a first lens unit having negative optical power, a second lens unit having positive optical power, and a third lens unit having negative optical power, wherein in zooming from a wide-angle limit to a telephoto limit at the time of image taking, the lens units are moved along an optical axis such that an air space between the first lens unit and the second lens unit and an air space between the second lens unit and the third lens unit should vary, so that variable magnification is achieved, and wherein the following condition (III-1) is satisfied:

$$1.25 < \beta_{3T}/\beta_{3W} < 1.90 \quad \text{(III-1)}$$

(here, $f_T/f_W \geqq 4.0$)

where, $\beta_{3T}$ is a lateral magnification of the third lens unit at a telephoto limit in an infinity in-focus condition, $\beta_{3W}$ is a lateral magnification of the third lens unit at a wide-angle limit in an infinity in-focus condition, $f_T$ is a focal length of the entire system at a telephoto limit, and $f_W$ is a focal length of the entire system at a wide-angle limit.

(IV) The novel concepts disclosed herein were achieved in order to solve the foregoing problems in the conventional art, and herein is disclosed:

a zoom lens system, in order from an object side to an image side, comprising a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, wherein the first lens unit includes a lens element having a reflecting surface for bending a light beam incident from the object, and wherein the following condition (IV-1) is satisfied:

$$0.08 < (D_T - D_W)/f_W < 0.18 \quad \text{(IV-1)}$$

(here, $f_T/f_W \geqq 3.0$)

where, $D_T$ is a diameter of the aperture diaphragm at a telephoto limit, $D_W$ is a diameter of the aperture diaphragm at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, wherein the first lens unit includes a lens element having a reflecting surface for bending a light beam incident from the object, and wherein the following condition (IV-1) is satisfied:

$$0.08 < (D_T - D_W)/f_W < 0.18 \quad \text{(IV-1)}$$

(here, $f_T/f_W \geqq 3.0$)

where, $D_T$ is a diameter of the aperture diaphragm at a telephoto limit, $D_W$ is a diameter of the aperture diaphragm at a wide-angle limit, $f_T$ is a focal length of the entire system at a telephoto limit, and $f_W$ is a focal length of the entire system at a wide-angle limit.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, wherein the first lens unit includes a lens element having a reflecting surface for bending a light beam incident from the object, and wherein the following condition (IV-1) is satisfied:

$$0.08 < (D_T - D_W)/f_W < 0.18 \quad \text{(IV-1)}$$

(here, $f_T/f_W \geqq 3.0$)

where, $D_T$ is a diameter of the aperture diaphragm at a telephoto limit, $D_W$ is a diameter of the aperture diaphragm at a wide-angle limit, $f_T$ is a focal length of the entire system at a telephoto limit, and $f_W$ is a focal length of the entire system at a wide-angle limit.

(V) The novel concepts disclosed herein were achieved in order to solve the foregoing problems in the conventional art, and herein is disclosed:

a zoom lens system, in order from an object side to an image side, comprising a first lens unit having negative optical power, a second lens unit having positive optical power, a third lens unit having negative optical power, and a fourth lens unit having positive optical power, wherein in zooming from a wide-angle limit to a telephoto limit at the time of image taking, at least the second lens unit and the third lens unit among the first lens unit, the second lens unit, the third lens unit and the fourth lens unit are moved along the optical axis so that variable magnification is achieved, and wherein the fourth lens unit or a sub lens unit consisting of a part of the fourth lens unit is moved in a direction perpendicular to an optical axis.

The novel concepts disclosed herein were achieved in order to solve the foregoing problems in the conventional art, and herein is disclosed:

an imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, a third lens unit having negative optical power, and a fourth lens unit having positive optical power, wherein in zooming from a wide-angle limit to a telephoto limit at the time of image taking, at least the second lens unit and the third lens unit among the first lens unit, the second lens unit, the third lens unit and the fourth lens unit are moved along the optical axis so that variable magnification is achieved, and wherein the fourth lens unit or a sub lens unit consisting of a part of the fourth lens unit moves in a direction perpendicular to an optical axis.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system, in order from an object side to an image side, comprises a first lens unit having negative optical power, a second lens unit having positive optical power, a third lens unit having negative optical power, and a fourth lens unit having positive optical power, wherein in zooming from a wide-angle limit to a telephoto limit at the time of image taking, at least the second lens unit and the third lens unit among the first lens unit, the second lens unit, the third lens unit and the fourth lens unit are moved along the optical axis so that variable magnification is achieved, and wherein the fourth lens unit or a sub lens unit consisting of a part of the fourth lens unit moves in a direction perpendicular to an optical axis.

The present invention provides: a high-performance zoom lens system that has a reduced size with a short overall length of lens system (the distance from the most object side surface of the first lens unit to the image surface) and still a high resolution and a relatively high zooming ratio of 4 or greater and that is satisfactorily applicable in wide-angle image taking; an imaging device employing this zoom lens system; and a thin and compact camera employing this imaging device.

Further, the present invention provides: a high-performance zoom lens system that has a remarkably reduced size with a short overall length of lens system and still achieves a high resolution and a zooming ratio of approximately 3 or greater and that is satisfactorily applicable in wide-angle image taking; an imaging device employing this zoom lens system; and a thin and compact camera employing this imaging device.

Moreover, the present invention provides: a high-performance zoom lens system that has a remarkably reduced size with a short overall length of lens system and still achieves a high resolution and a zooming ratio of approximately 3 or greater and that is satisfactorily applicable in wide-angle image taking and further provided with a blur compensation function of optically compensating image blur caused by hand blurring, vibration and the like; an imaging device employing this zoom lens system; and a thin and compact camera employing this imaging device.

BRIEF DESCRIPTION OF THE DRAWINGS

This and other objects and features of this invention will become clear from the following description, taken in conjunction with the preferred embodiments with reference to the accompanied drawings in which.

Figure 1:
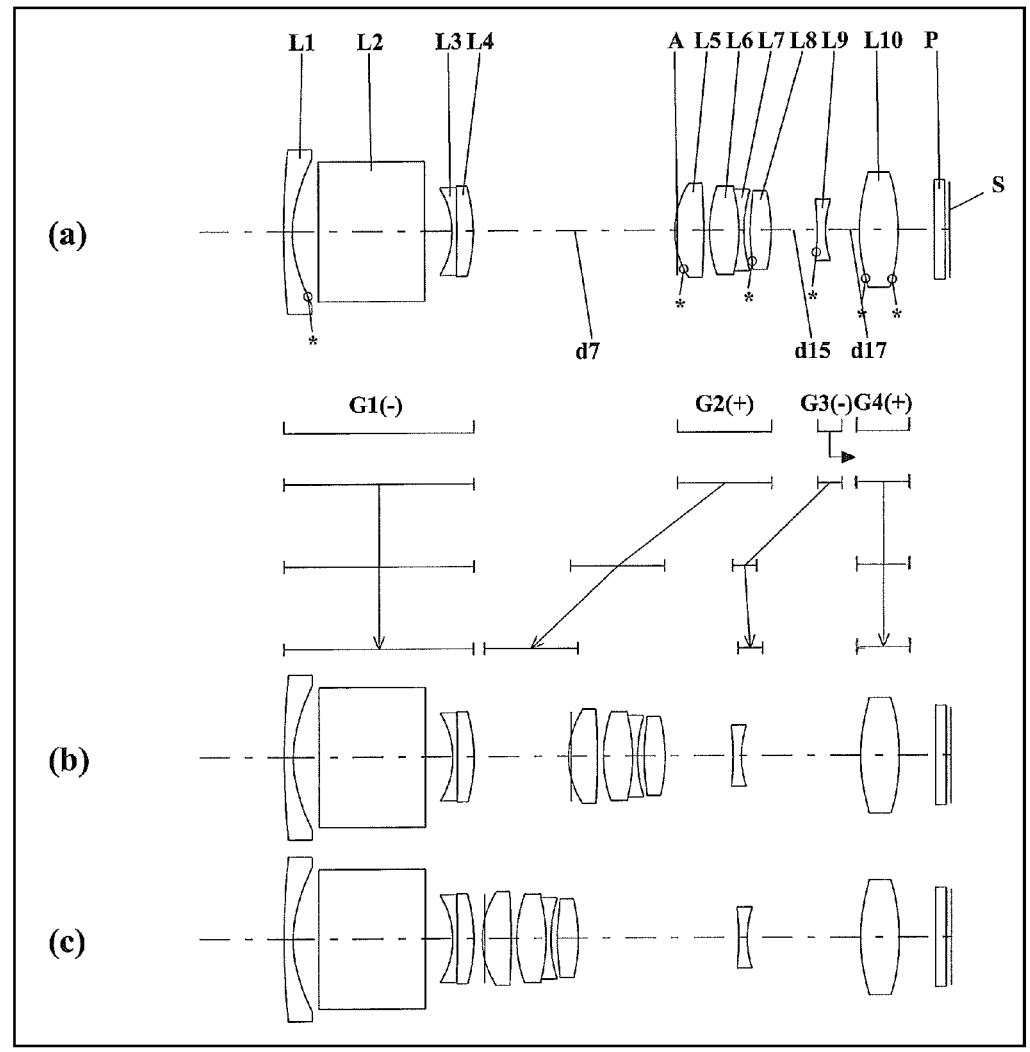
FIG. 1 is a lens arrangement diagram showing an infinity in-focus condition of a zoom lens system according to Embodiment I-1 (Example I-1)
Figure 2:
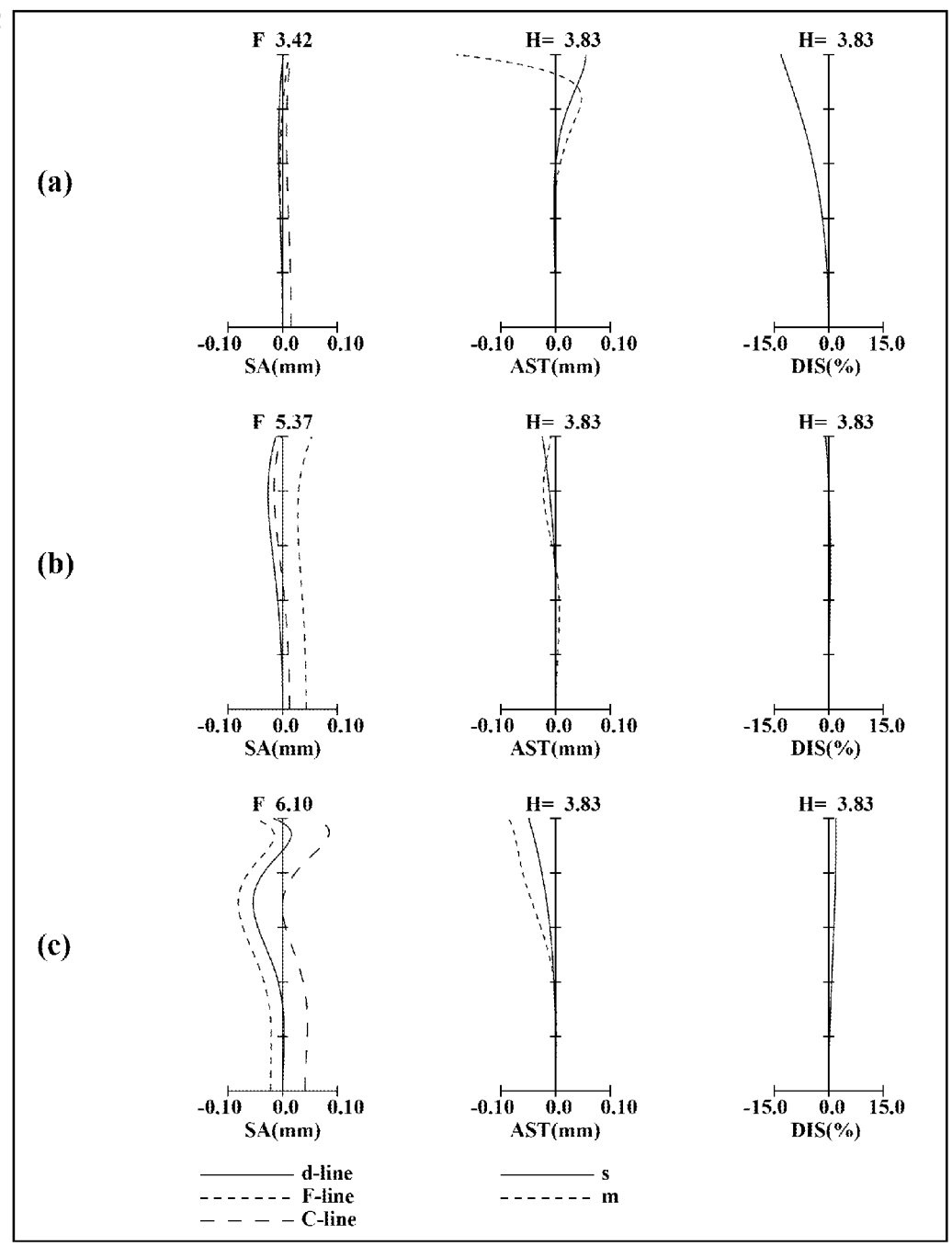
FIG. 2 is a longitudinal aberration diagram of an infinity in-focus condition of a zoom lens system according to Example I-1.
Figure 3:
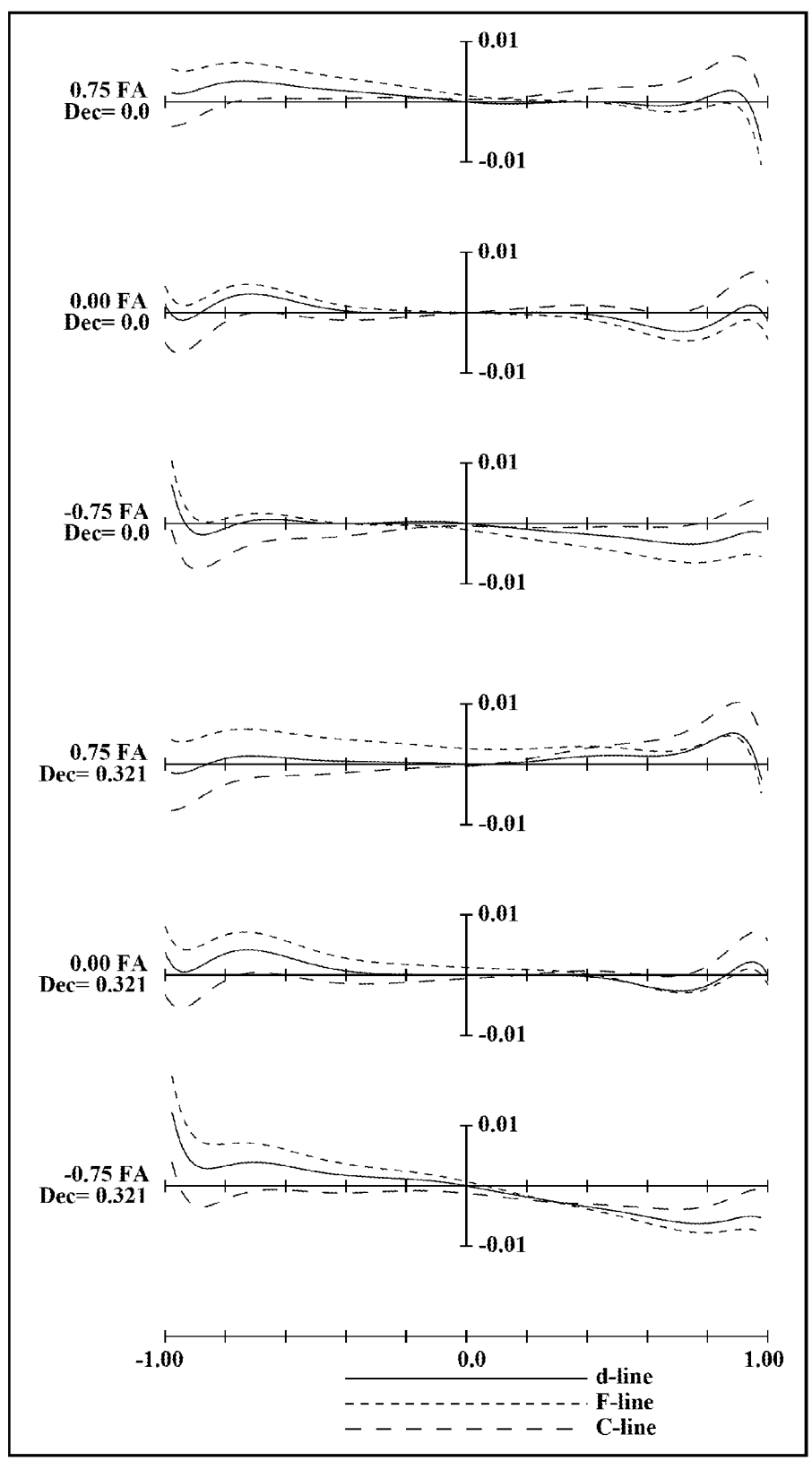
FIG. 3 is a lateral aberration diagram of a zoom lens system according to Example I-1 at a telephoto limit in a basic state where image blur compensation is not performed and in a blur compensation state.

DESCRIPTION OF THE PREFERRED EMBODIMENTS (Embodiments I-1 to I-4)

FIGS. 1, 4, 7 and 10 are lens arrangement diagrams of zoom lens systems according to Embodiments I-1 to I-4, respectively.

Each of FIGS. 1, 4, 7 and 10 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power, a second lens unit G2 having positive optical power, a third lens unit G3 having negative optical power; and a fourth lens unit G4 having positive optical power. The second lens element L2 (prism) in the first lens unit G1 corresponds to a lens element having a reflecting surface for bending the light beam incident from the object, that is, bending the axial principal ray incident from the object, for example, by approximately 90°. The position of the reflecting surface is not shown and omitted in the figure. Here, in the zoom lens system according to each embodiment, the lens element having a reflecting surface is composed of a prism. Instead, the lens element having a reflecting surface may be composed of, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the third lens unit G3 respectively move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, when these lens units are arranged in a desired optical power configuration, high optical performance is obtained and still size reduction is achieved in the entire lens system.

Further, in FIGS. 1, 4, 7 and 10, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 1, 4, 7 and 10, an aperture diaphragm A is provided on the most object side of the second lens unit G2, that is, between the first lens unit G1 and the second lens unit G2. Moreover, in zooming from a wide-angle limit to a telephoto limit at the time of image taking, the aperture diaphragm A moves along the optical axis integrally with the second lens unit G2.

As shown in FIG. 1, in the zoom lens system according to Embodiment I-1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment I-1, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment I-1, the third lens unit G3 comprises solely a bi-concave ninth lens element L9. Further, the ninth lens element L9 has an aspheric object side surface.

Further, in the zoom lens system according to Embodiment I-1, the fourth lens unit G4 comprises solely a bi-convex tenth lens element L10. The tenth lens element L10 has two aspheric surfaces.

Here, in the zoom lens system according to Embodiment I-1, a plane parallel plate P is provided on the object side relative to the image surface S (between the image surface S and the tenth lens element L10).

In the zoom lens system according to Embodiment I-1, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 4:
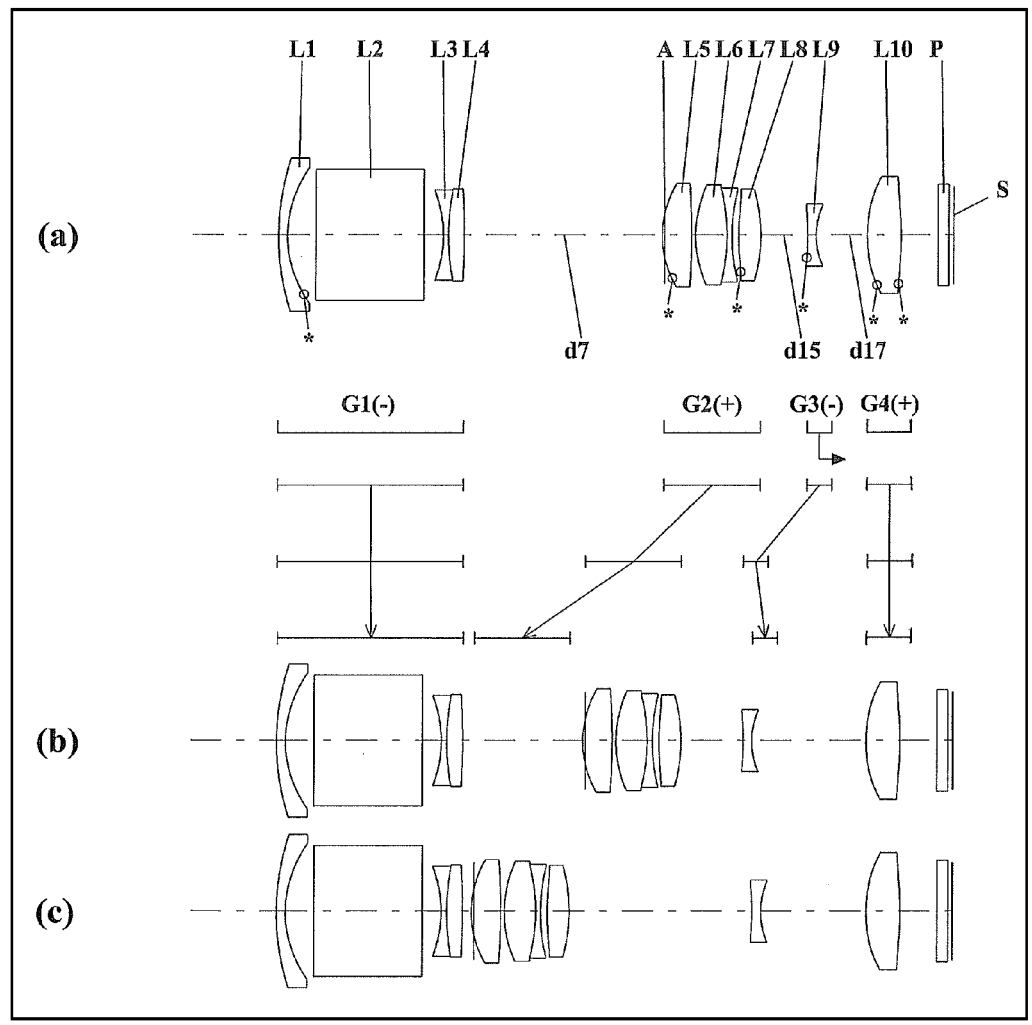
FIG. 4 is a lens arrangement diagram showing an infinity in-focus condition of a zoom lens system according to Embodiment I-2 (Example I-2)
Figure 5:
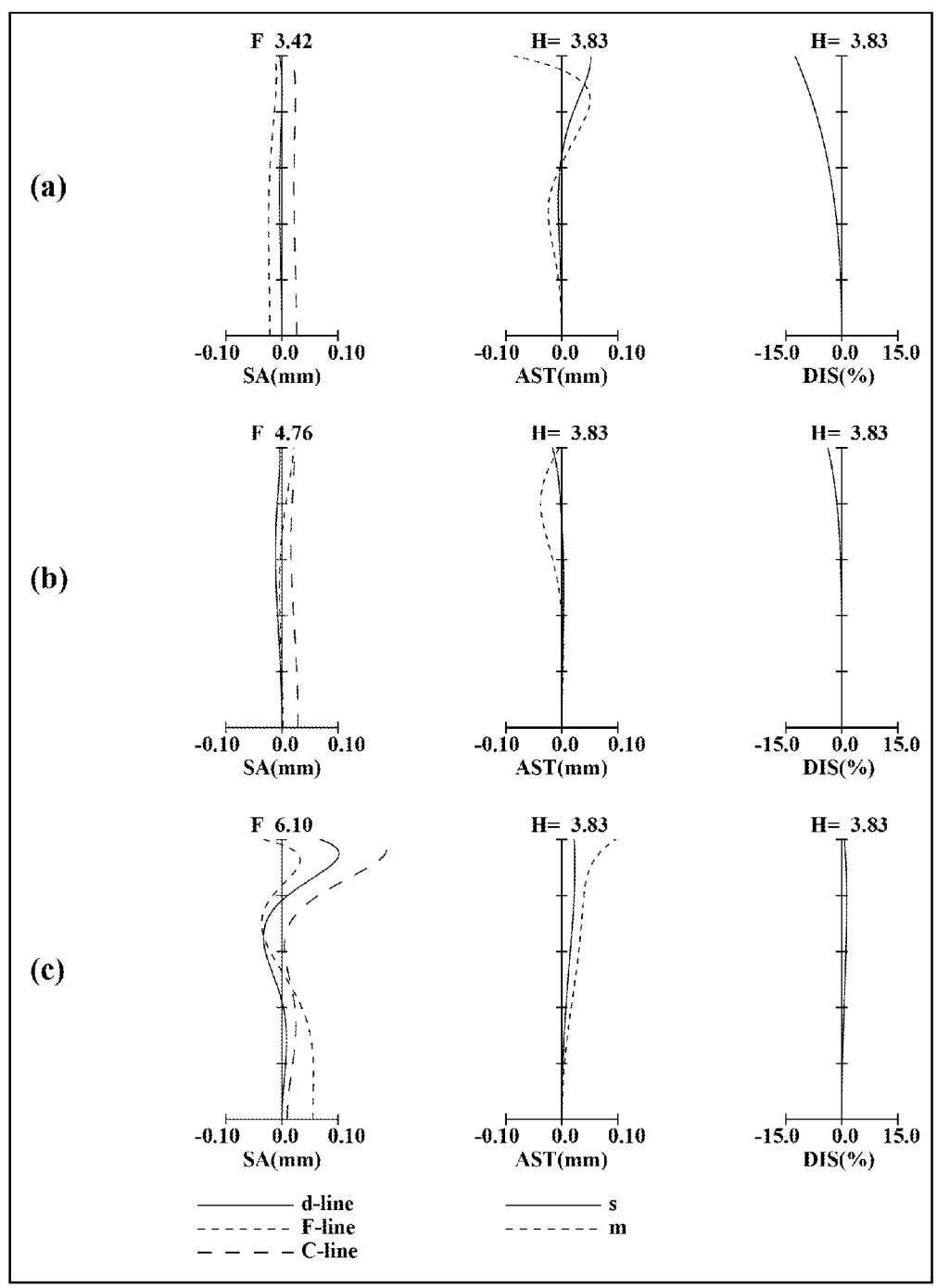
FIG. 5 is a longitudinal aberration diagram of an infinity in-focus condition of a zoom lens system according to Example I-2.
Figure 6:
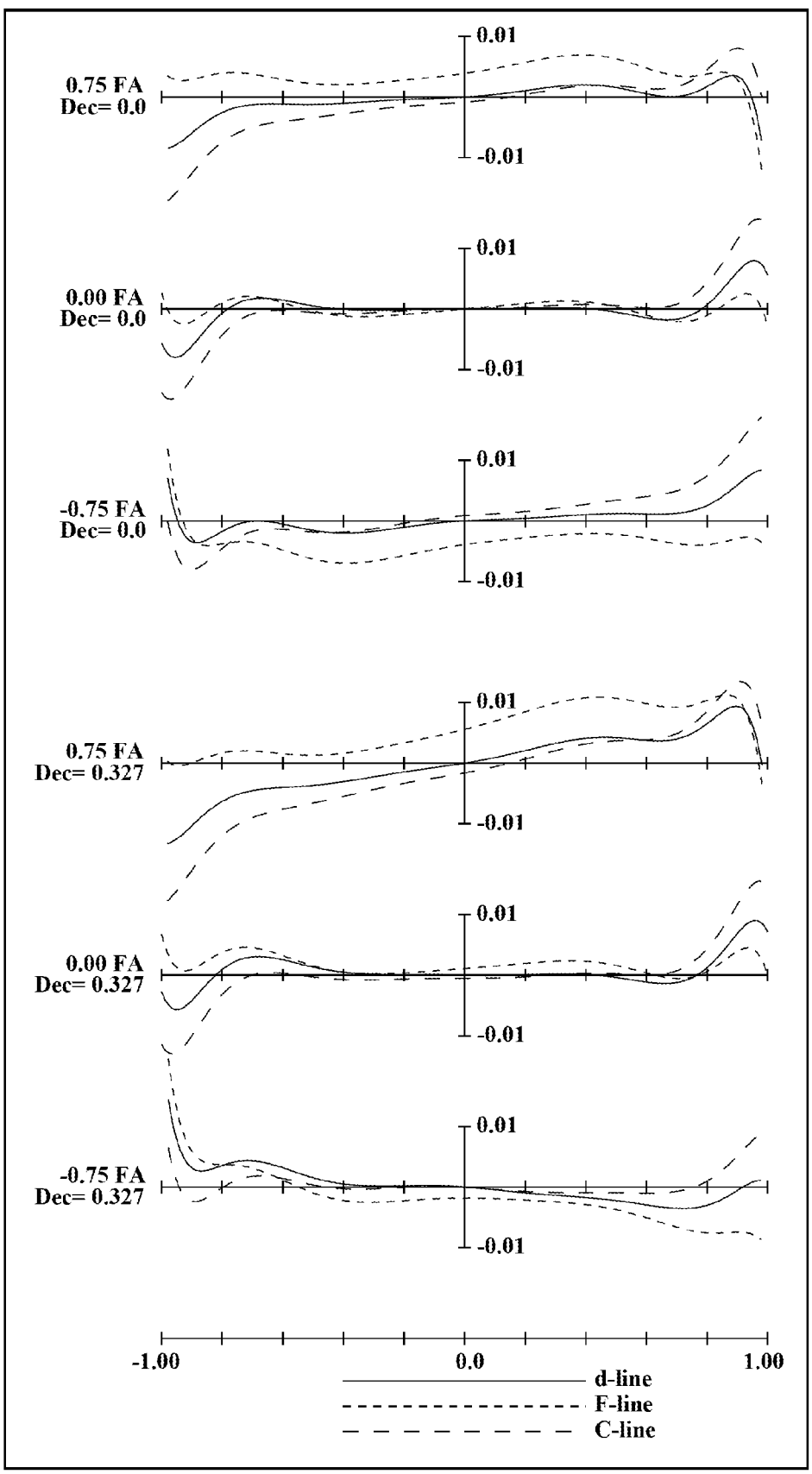
FIG. 6 is a lateral aberration diagram of a zoom lens system according to Example I-2 at a telephoto limit in a basic state where image blur compensation is not performed and in a blur compensation state.

As shown in FIG. 4, in the zoom lens system according to Embodiment I-2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has an aspheric image side surface.

Further, in the zoom lens system according to Embodiment I-2, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment I-2, the third lens unit G3 comprises solely a bi-concave ninth lens element L9. Further, the ninth lens element L9 has an aspheric object side surface.

Further, in the zoom lens system according to Embodiment I-2, the fourth lens unit G4 comprises solely a bi-convex tenth lens element L10. The tenth lens element L10 has two aspheric surfaces.

Here, in the zoom lens system according to Embodiment I-2, a plane parallel plate P is provided on the object side relative to the image surface S (between the image surface S and the tenth lens element L10).

In the zoom lens system according to Embodiment I-2, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 7:
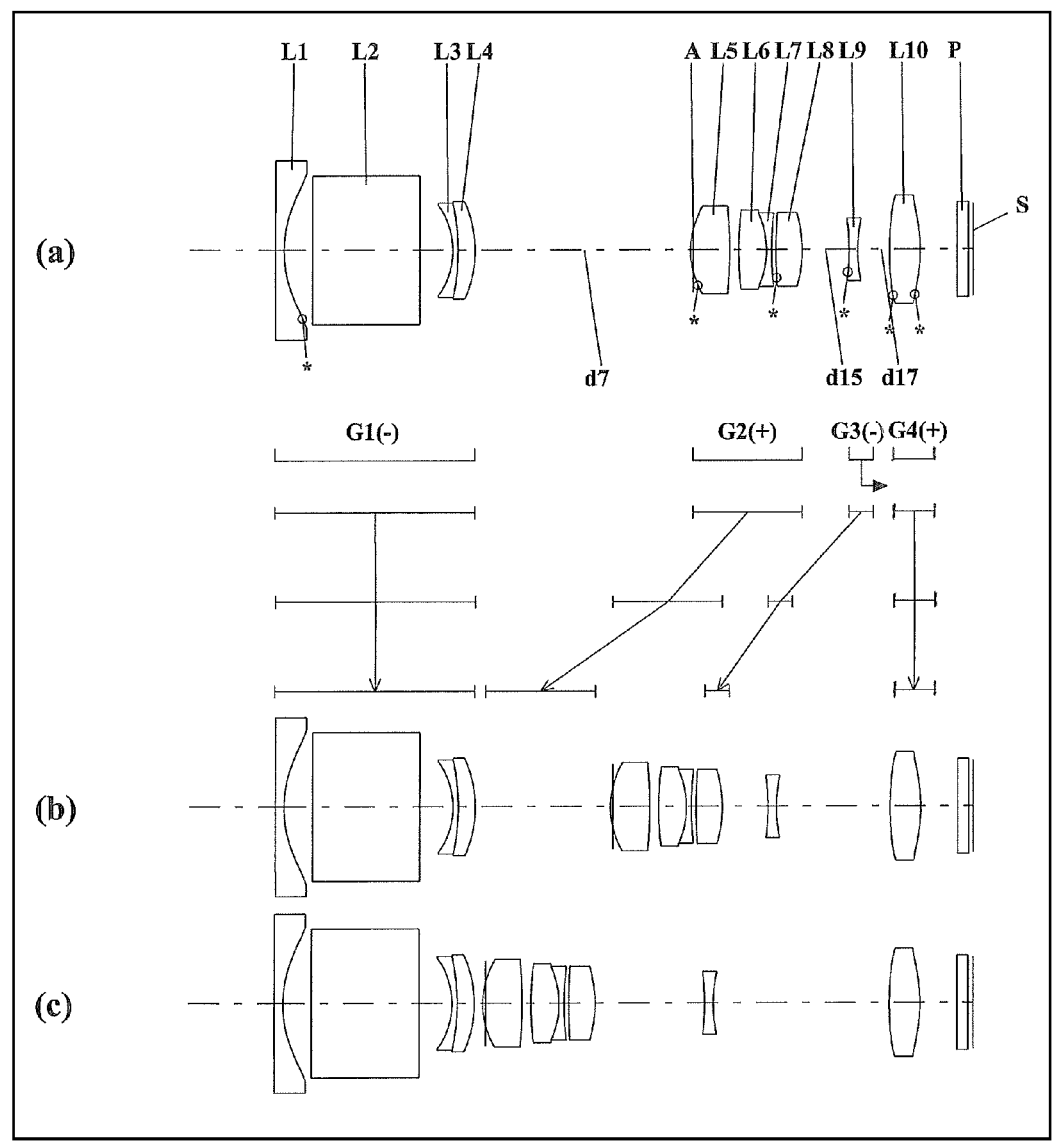
FIG. 7 is a lens arrangement diagram showing an infinity in-focus condition of a zoom lens system according to Embodiment I-3 (Example I-3)
Figure 8:
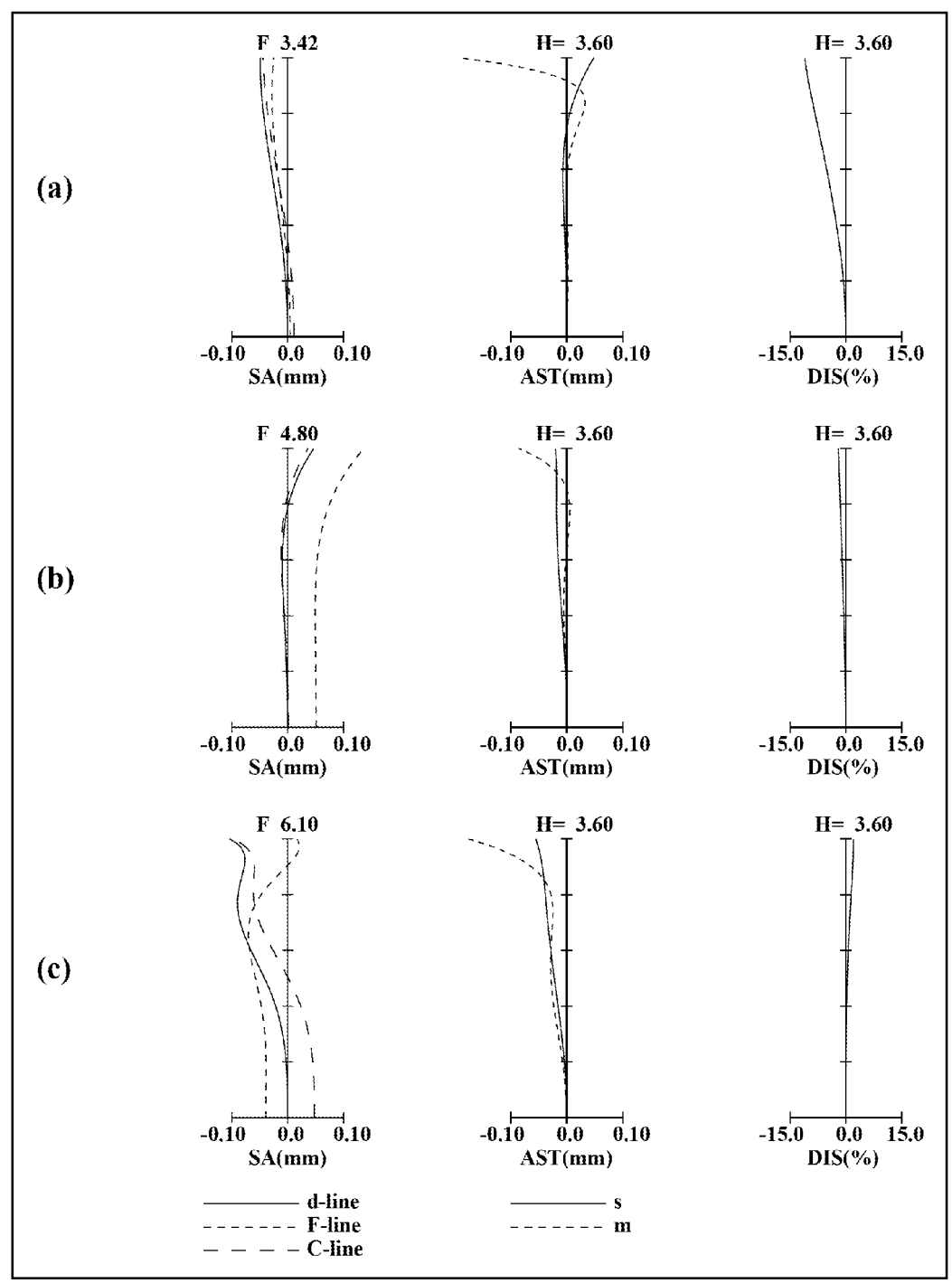
FIG. 8 is a longitudinal aberration diagram of an infinity in-focus condition of a zoom lens system according to Example I-3.
Figure 9:
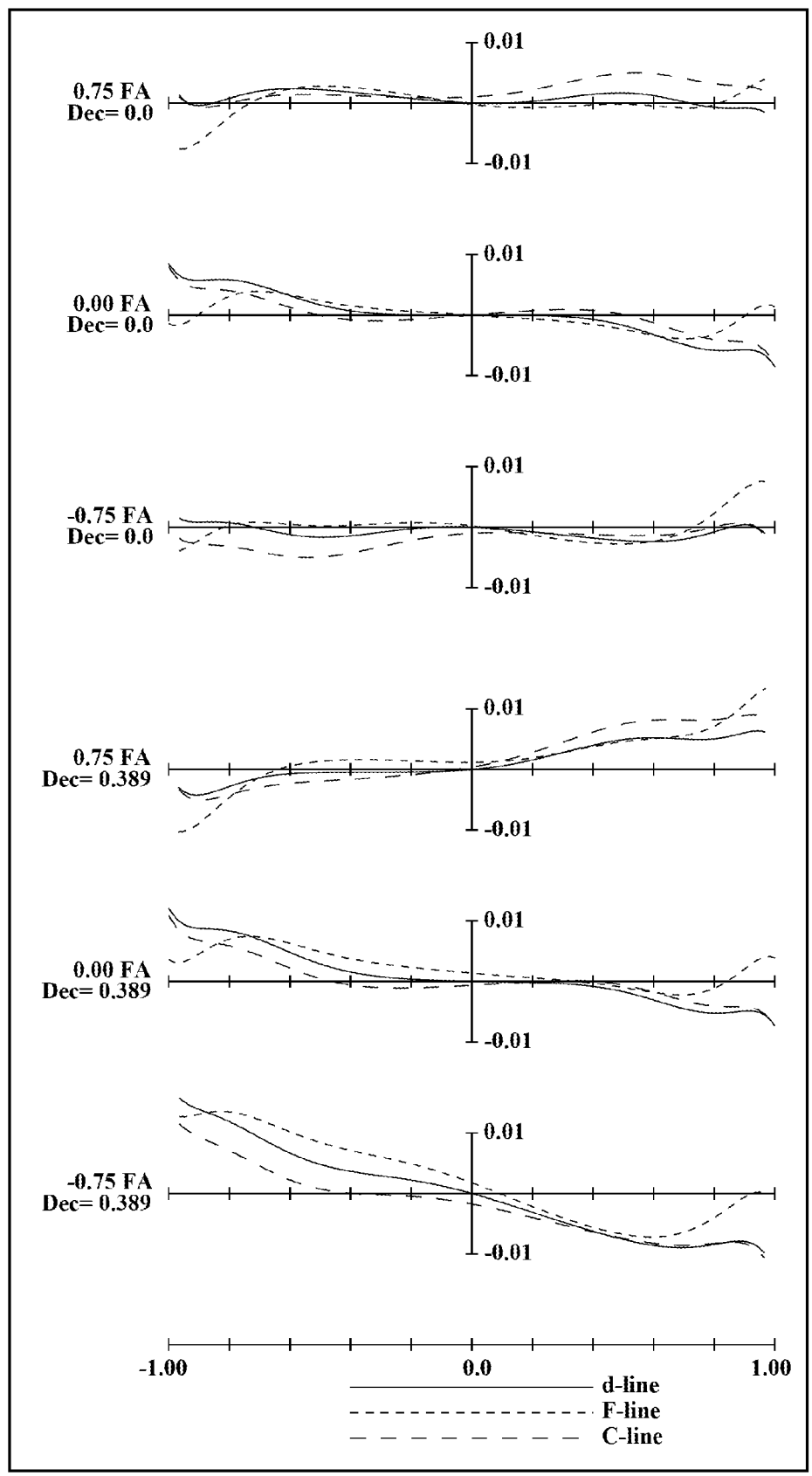
FIG. 9 is a lateral aberration diagram of a zoom lens system according to Example I-3 at a telephoto limit in a basic state where image blur compensation is not performed and in a blur compensation state.

As shown in FIG. 7, in the zoom lens system according to Embodiment I-3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment I-3, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment I-3, the third lens unit G3 comprises solely a bi-concave ninth lens element L9. Further, the ninth lens element L9 has an aspheric object side surface.

Further, in the zoom lens system according to Embodiment I-3, the fourth lens unit G4 comprises solely a bi-convex tenth lens element L10. The tenth lens element L10 has two aspheric surfaces.

Here, in the zoom lens system according to Embodiment I-3, a plane parallel plate P is provided on the object side relative to the image surface S (between the image surface S and the tenth lens element L10).

In the zoom lens system according to Embodiment I-3, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 10:
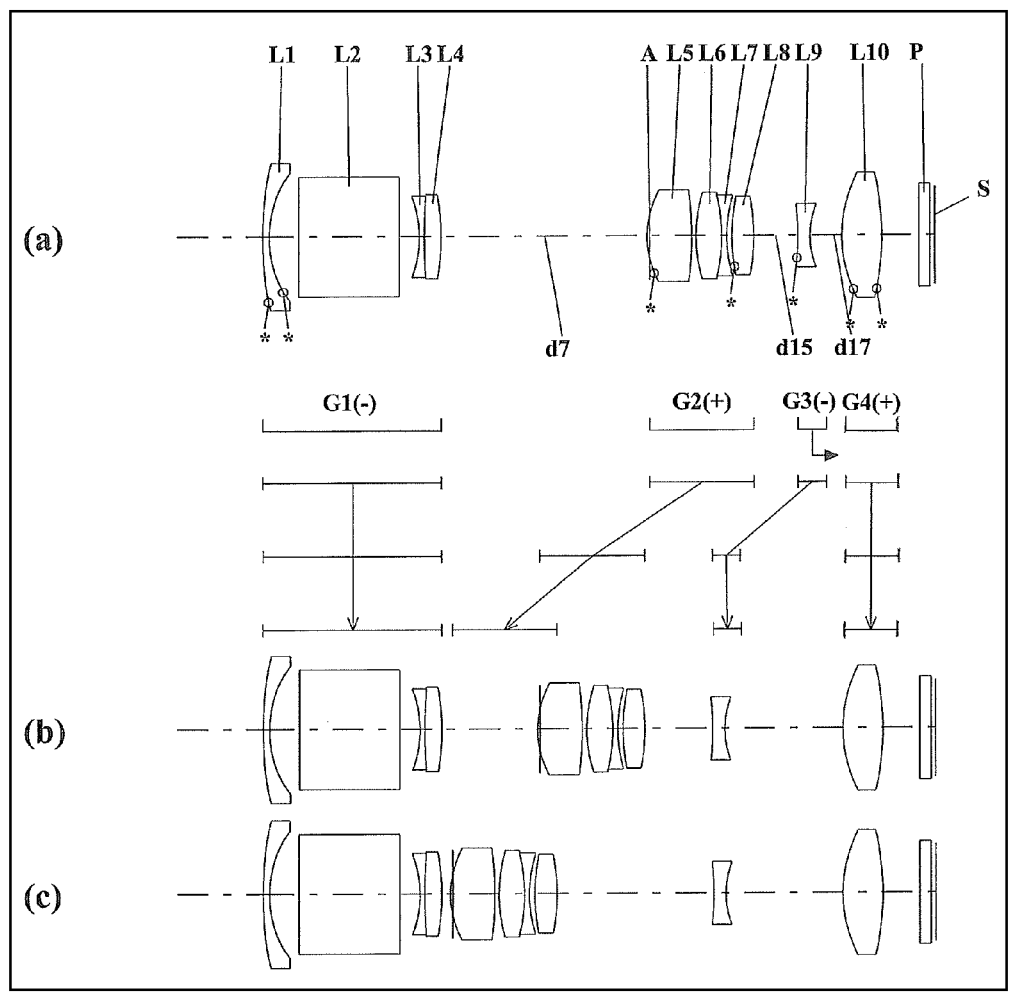
FIG. 10 is a lens arrangement diagram showing an infinity in-focus condition of a zoom lens system according to Embodiment I-4 (Example I-4)
Figure 11:
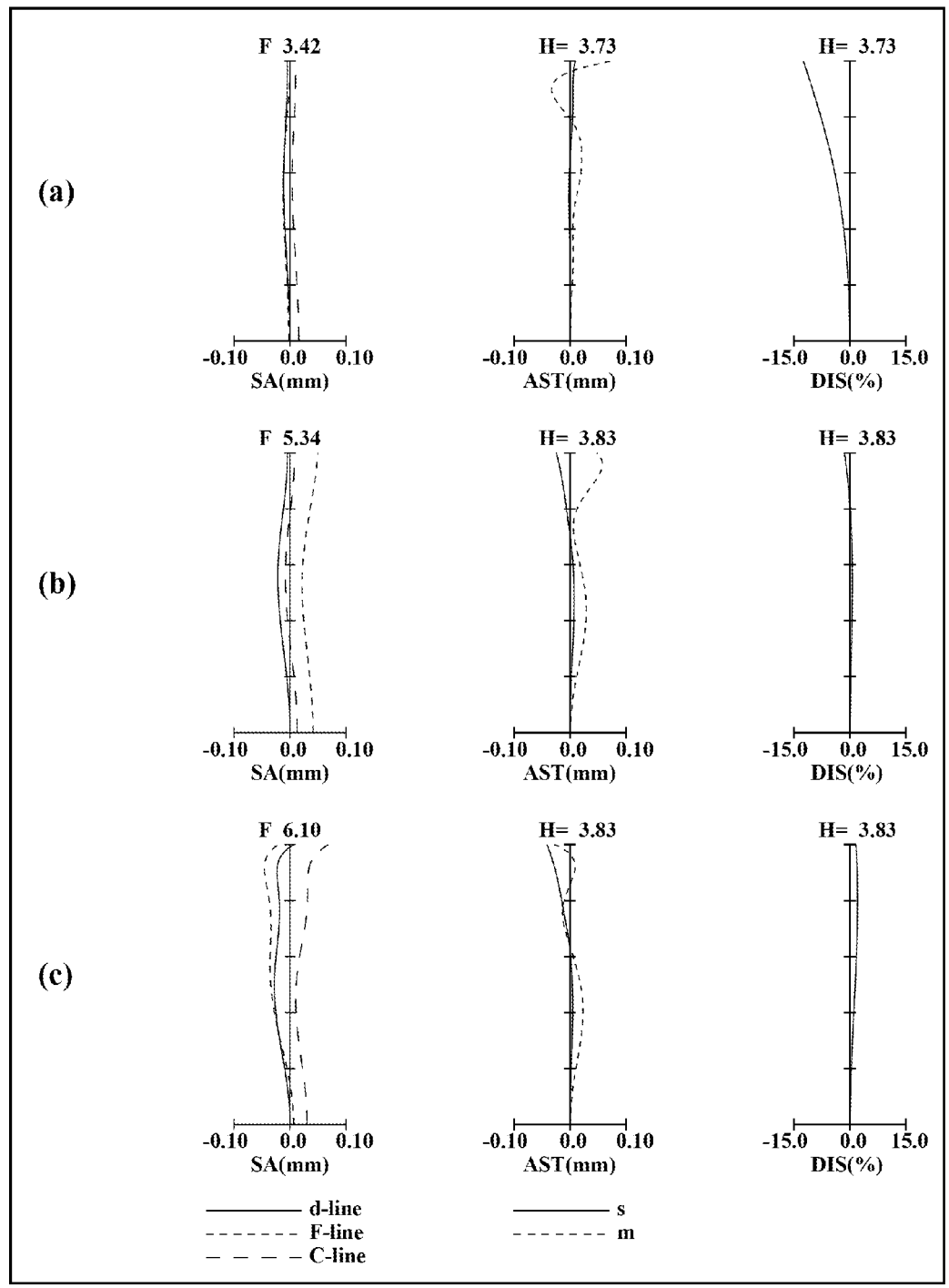
FIG. 11 is a longitudinal aberration diagram of an infinity in-focus condition of a zoom lens system according to Example I-4.
Figure 12:
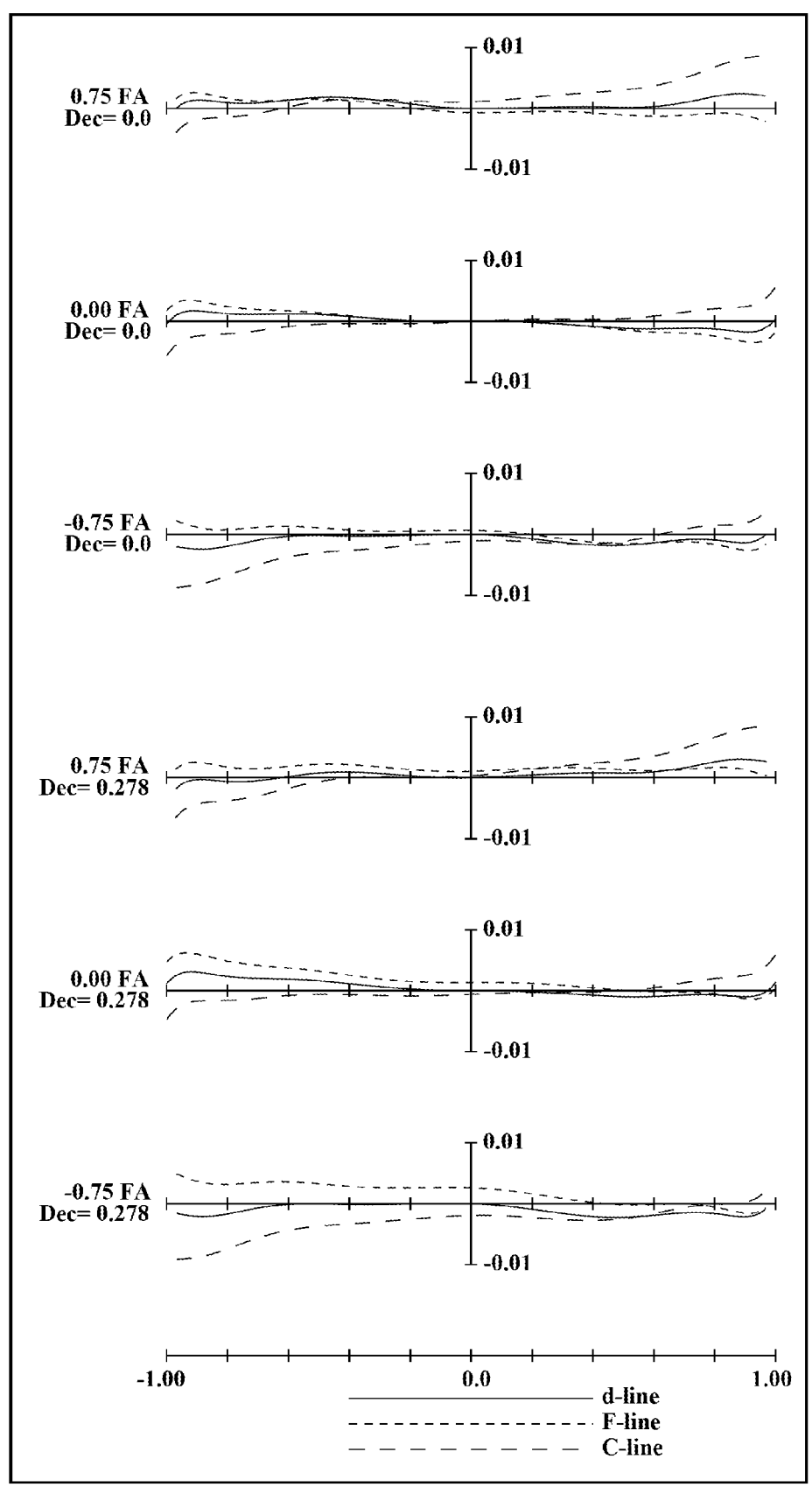
FIG. 12 is a lateral aberration diagram of a zoom lens system according to Example I-4 at a telephoto limit in a basic state where image blur compensation is not performed and in a blur compensation state.

As shown in FIG. 10, in the zoom lens system according to Embodiment I-4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment I-4, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment I-4, the third lens unit G3 comprises solely a bi-concave ninth lens element L9. Further, the ninth lens element L9 has an aspheric object side surface.

Further, in the zoom lens system according to Embodiment I-4, the fourth lens unit G4 comprises solely a bi-convex tenth lens element L10. The tenth lens element L10 has two aspheric surfaces.

Here, in the zoom lens system according to Embodiment I-4, a plane parallel plate P is provided on the object side relative to the image surface S (between the image surface S and the tenth lens element L10).

In the zoom lens system according to Embodiment I-4, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

In the zoom lens system according to Embodiments I-1 to I-4, the first lens unit G1 includes the second lens element L2 (prism) having a reflecting surface capable of bending the light beam incident from the object, that is, bending the axial principal ray incident from the object, for example, by approximately 90°. Thus, the zoom lens system is constructed such that the thickness in the direction of the optical axis of the axial light beam incident from the object is satisfactorily small in an image taking state.

In the zoom lens system according to Embodiments I-1 to I-4, in zooming from a wide-angle limit to a telephoto limit at the time of image taking, the first lens unit G1 does not move along the optical axis. Thus, as the lens barrel for holding this zoom lens system, a lens barrel without a shape change associated with zooming can be employed. This permits fabrication of a camera having a high degree of freedom in the shape as well as an excellent shock resistance.

In the zoom lens system according to Embodiments I-1 to I-4, the third lens unit G3 serving as a subsequent lens unit on the most object side located on the image side relative to the second lens unit G2 has negative optical power. Thus, the third lens unit G3 having negative optical power is moved during zooming so as to contribute to magnification change. Accordingly, a zooming ratio as high as 4 or greater is obtained in a state that a short overall length of lens system is achieved.

In the zoom lens system according to Embodiments I-1 to I-4, each of the first lens unit G1, the second lens unit G2, and the third lens unit G3 serving as a subsequent lens unit on the most object side located on the image side relative to the second lens unit G2 includes at least one lens element having an aspheric surface. As such, since a lens element having an aspheric surface is arranged in the first lens unit G1, distortion is compensated satisfactory. Further, since a lens element having an aspheric surface is arranged in the second lens unit G2, spherical aberration is compensated satisfactory. Moreover, since a lens element having an aspheric surface is arranged in the third lens unit G3, curvature of field is compensated satisfactory.

In the zoom lens system according to Embodiments I-1 to I-4, the aperture diaphragm A is located between the first lens unit G1 and the second lens unit G2. Thus, the effective lens diameter of the first lens unit G1 is allowed to be reduced, and hence the first lens unit G1 including the second lens element L2 having a reflecting surface can be constructed in a more compact form.

Here, the zoom lens system according to Embodiments I-1 to I-4 has a four-unit construction consisting of the first lens unit G1, the second lens unit G2, the third lens unit G3 and the fourth lens unit G4. However, in the zoom lens system of the present invention, as long as the lens system comprises a first lens unit having negative optical power, a second lens unit having positive optical power, and at least one subsequent lens unit having optical power, the number of lens units is not limited to a particular value. That is, the zoom lens system may have a three-unit construction, a four-unit construction, or even another construction.

Further, as described above, it is preferable that the third lens unit G3 serving as a subsequent lens unit on the most object side has negative optical power. However, the optical power of each subsequent lens unit is not limited to a particular sign.

In the zoom lens system according to Embodiments I-1 to I-4, in zooming from a wide-angle limit to a telephoto limit at the time of image taking, the second lens unit G2 and the third lens unit G3 among the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the fourth lens unit G4 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Conditions preferably to be satisfied by a zoom lens system like the zoom lens system according to Embodiments I-1 to I-4 are described below. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

In a zoom lens system like the zoom lens system according to Embodiments I-1 to I-4, in order from the object side to the image side, comprising a first lens unit having negative optical power, a second lens unit having positive optical power, and at least one subsequent lens unit having optical power, wherein in zooming from a wide-angle limit to a telephoto limit at the time of image taking, the lens units are moved along the optical axis such that the air space between at least any two lens units among the first lens unit, the second lens unit and the subsequent lens unit should vary, so that variable magnification is achieved, and wherein the first lens unit includes a lens element having a reflecting surface for bending the light beam incident from the object (this lens configuration is referred to as basic configuration I of the embodiment, hereinafter), the following condition (I-1) is satisfied.

$$0.20 < |f_{G1}|/f_T < 0.52 \quad (I\text{-}1)$$

(here, $f_T/f_W \geqq 4.0$)
where,
$f_{G1}$ is a composite focal length of the first lens unit,
$f_T$ is a focal length of the entire system at a telephoto limit, and
$f_W$ is a focal length of the entire system at a wide-angle limit.

The condition (I-1) relates to the focal length of the first lens unit and the focal length of the entire system at a telephoto limit. When the value goes below the lower limit of the condition (I-1), the focal length of the first lens unit becomes short, and hence image planarity at a wide-angle limit is degraded. In contrast, when the value exceeds the upper limit of the condition (I-1), the amount of movement of the second lens unit at the time of magnification change increases, and hence size reduction is not achieved in the lens system.

Here, when at least one of the following conditions (I-1)' and (I-1)'' is satisfied, the above-mentioned effect is achieved more successfully.

$$0.27 < |f_{G1}|/f_T \quad (I\text{-}1)'$$

$$|f_{G1}|/f_T < 0.50 \quad (I\text{-}1)''$$

(here, $f_T/f_W \geqq 4.0$)
Further, it is more preferable that the conditions (I-1), (I-1)' and (I-1)'' are satisfied under the following condition.

$$f_T/f_W \geqq 4.3$$

In a zoom lens system having basic configuration I like the zoom lens system according to Embodiments I-1 to I-4, it is preferable that the following condition (I-2) is satisfied.

$$0.20 < f_{G2}/f_T < 0.62 \quad (I\text{-}2)$$

(here, $f_T/f_W \geqq 4.0$)
where,
$f_{G2}$ is a composite focal length of the second lens unit,
$f_T$ is a focal length of the entire system at a telephoto limit, and
$f_W$ is a focal length of the entire system at a wide-angle limit.

The condition (I-2) relates to the focal length of the second lens unit and the focal length of the entire system at a telephoto limit. When the value goes below the lower limit of the condition (I-2), a possibility arises that the spherical aberration at a telephoto limit is degraded. In contrast, when the value exceeds the upper limit of the condition (I-2), the amount of movement of the second lens unit at the time of magnification change increases, and hence a possibility arises that size reduction in the lens system becomes difficult.

When the following condition (I-2)' is satisfied, the above-mentioned effect is achieved more successfully.

$$0.31 < f_{G2}/f_T \quad (I\text{-}2)'$$

(here, $f_T/f_W \geqq 4.0$)
Further, it is more preferable that the conditions (I-2) and (I-2)' are satisfied under the following condition.

$$f_T/f_W \geqq 4.3$$

The lens units constituting the zoom lens system according to Embodiments I-1 to I-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment I-5)

Figure 13:
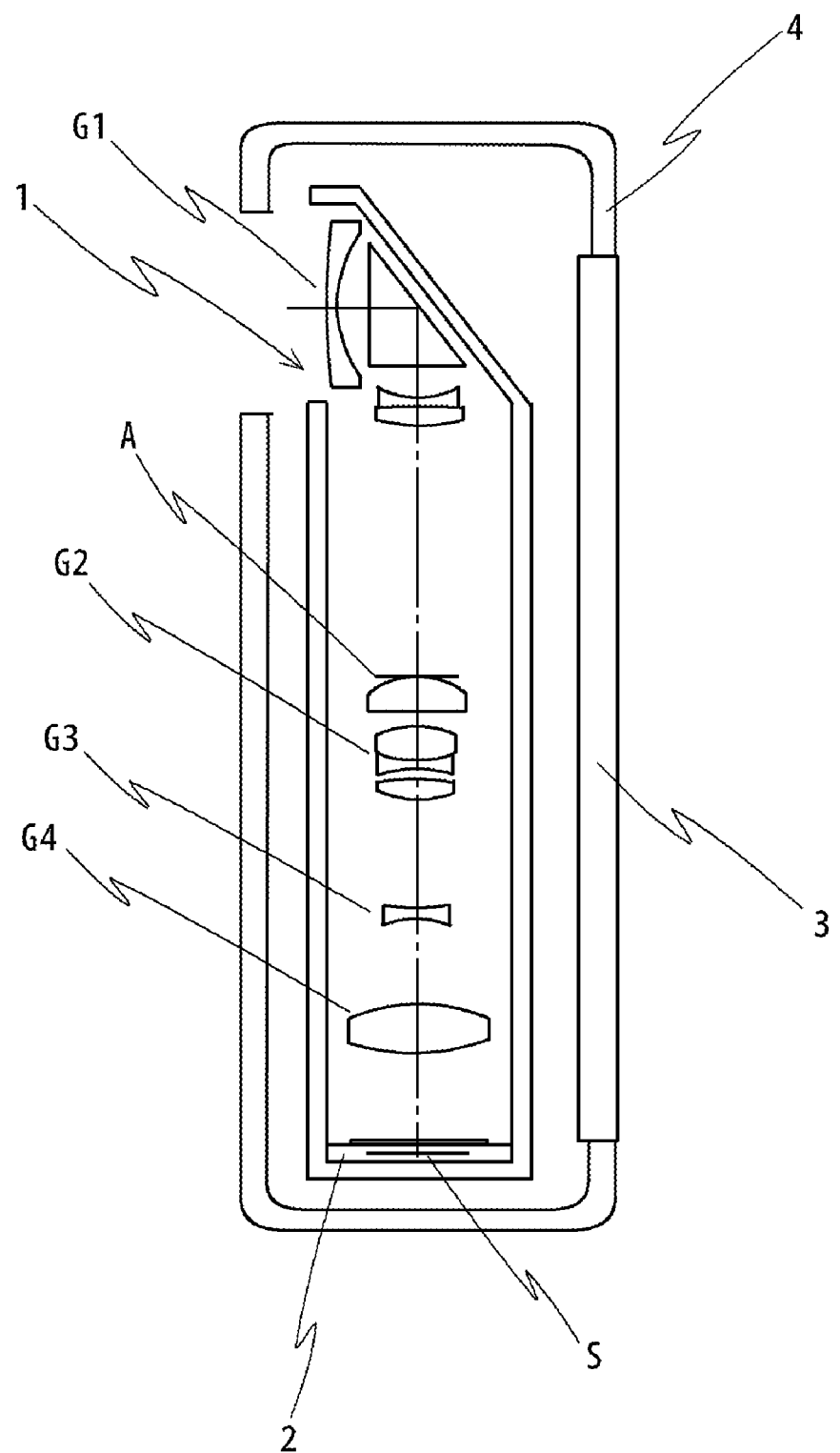
FIG. 13 is a schematic construction diagram of a digital still camera according to Embodiment I-5.

FIG. 13 is a schematic construction diagram of a digital still camera according to Embodiment I-5. In FIG. 13, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment I-1. In FIG. 13, the zoom lens system 1 comprises a first lens unit G1, an aperture diaphragm A, a second lens unit G2, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment I-1 is employed in a digital still camera, a small digital still camera is obtained that has a high resolution and high capability of compensating the curvature of field and that has a short overall length of lens system at the time of non-use. Here, in the digital still camera shown in FIG. 13, any one of the zoom lens systems according to Embodiments I-2 to I-4 may be employed in place of the zoom lens system according to Embodiment I-1. Further, the optical system of the digital still camera shown in FIG. 13 is applicable also to a digital video camera for moving images. In this case, moving images with high resolution can be acquired in addition to still images.

Here, the digital still camera according to the present Embodiment I-5 has been described for a case that the employed zoom lens system 1 is a zoom lens system according to Embodiments I-1 to I-4. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments I-1 to I-4.

Further, an imaging device comprising a zoom lens system according to Embodiments I-1 to I-4 described above and an image sensor such as a CCD or a CMOS may be applied to a mobile telephone, a PDA (Personal Digital Assistance), a surveillance camera in a surveillance system, a Web camera, a vehicle-mounted camera or the like.

(Embodiments II-1 to II-4)

FIGS. 14, 17, 20 and 23 are lens arrangement diagrams of zoom lens systems according to Embodiments II-1 to II-4, respectively.

Each of FIGS. 14, 17, 20 and 23 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W \cdot f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power, a second lens unit G2 having positive optical power, a third lens unit G3 having negative optical power; and a fourth lens unit G4 having positive optical power. The second lens element L2 (prism) in the first lens unit G1 corresponds to a lens element having a reflecting surface for bending the light beam incident from the object, that is, bending the axial principal ray incident from the object, for example, by approximately 90°. The position of the reflecting surface is not shown and omitted in the figure. Here, in the zoom lens system according to each embodiment, the lens element having a reflecting surface is composed of a prism. Instead, the lens element having a reflecting surface may be composed of, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the third lens unit G3 respectively move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, when these lens units are arranged in a desired optical power configuration, high optical performance is obtained and still size reduction is achieved in the entire lens system.

Further, in FIGS. 14, 17, 20 and 23, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 14, 17, 20 and 23, an aperture diaphragm A is provided on the most object side of the second lens unit G2, that is, between the first lens unit G1 and the second lens unit G2. Moreover, in zooming from a wide-angle limit to a telephoto limit at the time of image taking, the aperture diaphragm A moves along the optical axis integrally with the second lens unit G2.

Figure 14:
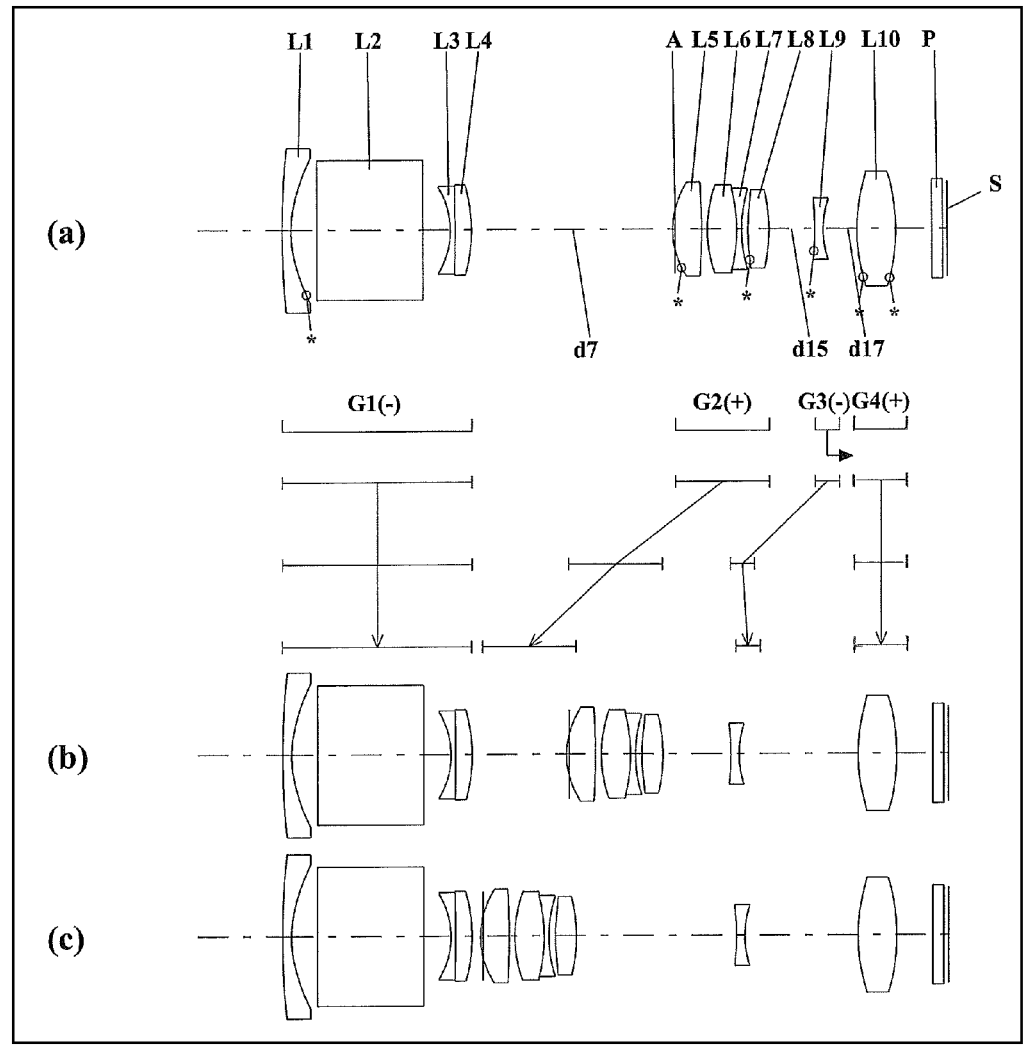
FIG. 14 is a lens arrangement diagram showing an infinity in-focus condition of a zoom lens system according to Embodiment II-1 (Example II-1)
Figure 15:
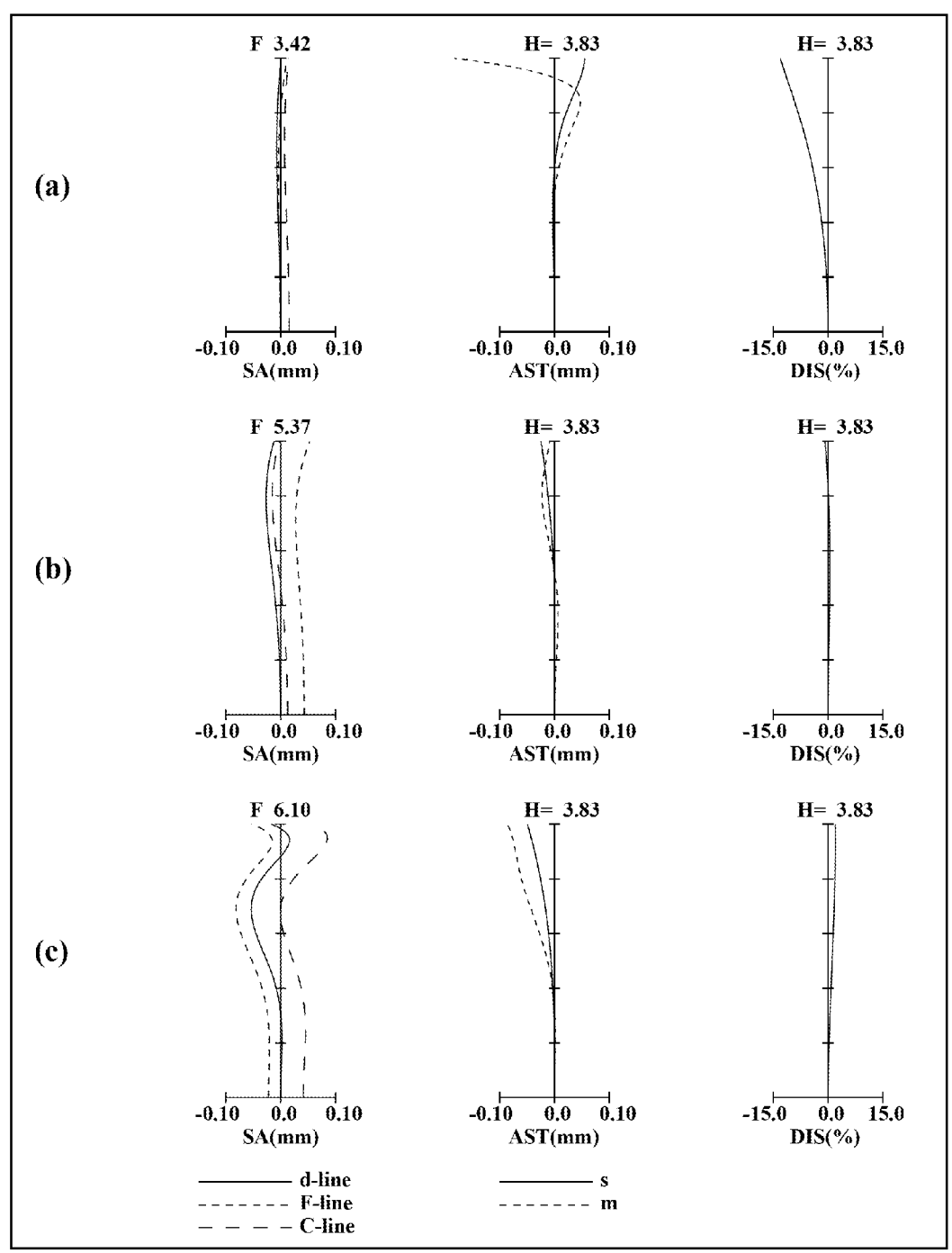
FIG. 15 is a longitudinal aberration diagram of an infinity in-focus condition of a zoom lens system according to Example II-1.
Figure 16:
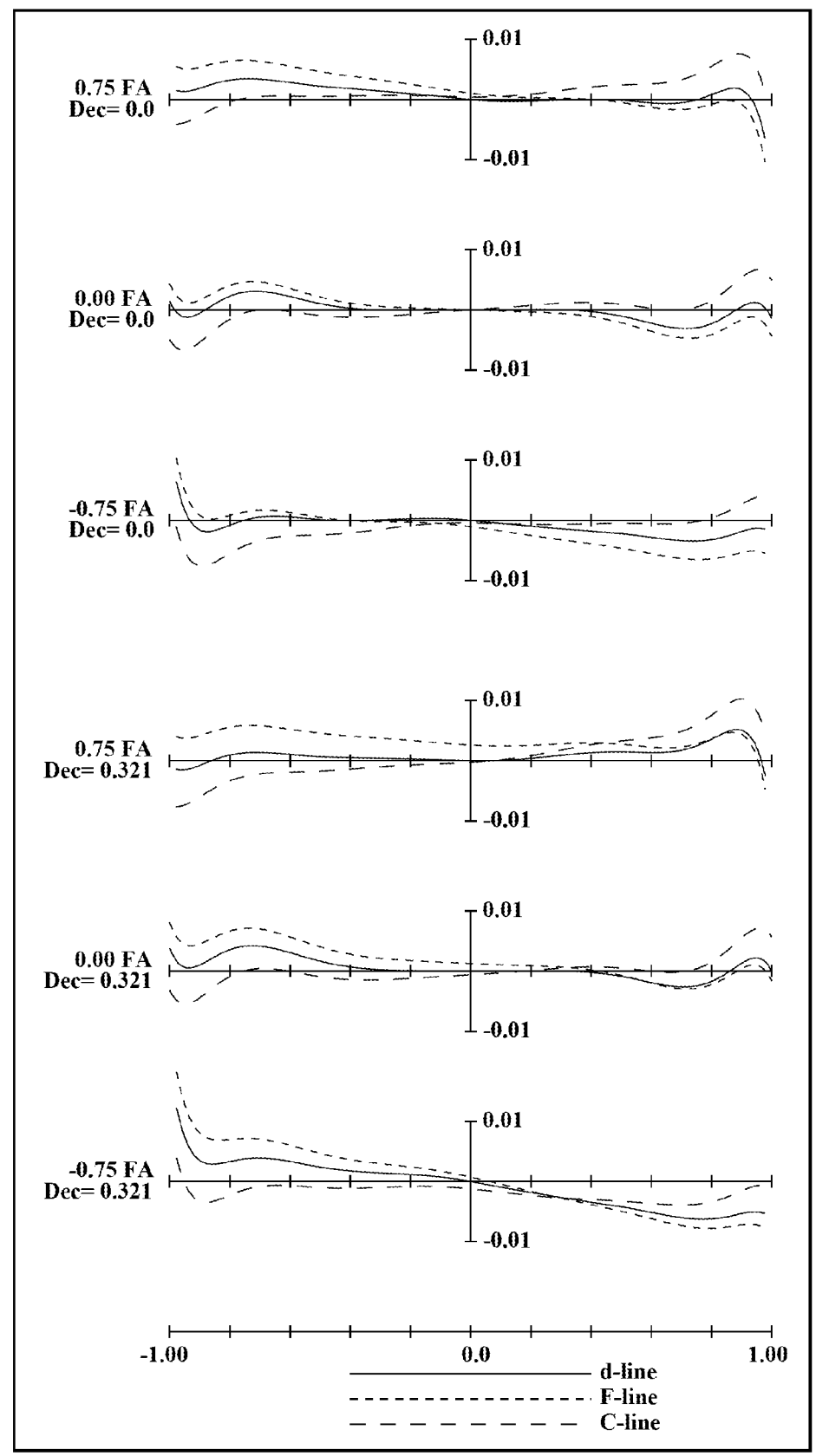
FIG. 16 is a lateral aberration diagram of a zoom lens system according to Example II-1 at a telephoto limit in a basic state where image blur compensation is not performed and in a blur compensation state.

As shown in FIG. 14, in the zoom lens system according to Embodiment II-1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment II-1, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment II-1, the third lens unit G3 comprises solely a bi-concave ninth lens element L9. Further, the ninth lens element L9 has an aspheric object side surface.

Further, in the zoom lens system according to Embodiment II-1, the fourth lens unit G4 comprises solely a bi-convex tenth lens element L10. The tenth lens element L10 has two aspheric surfaces.

Here, in the zoom lens system according to Embodiment II-1, a plane parallel plate P is provided on the object side relative to the image surface S (between the image surface S and the tenth lens element L10).

In the zoom lens system according to Embodiment II-1, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 17:
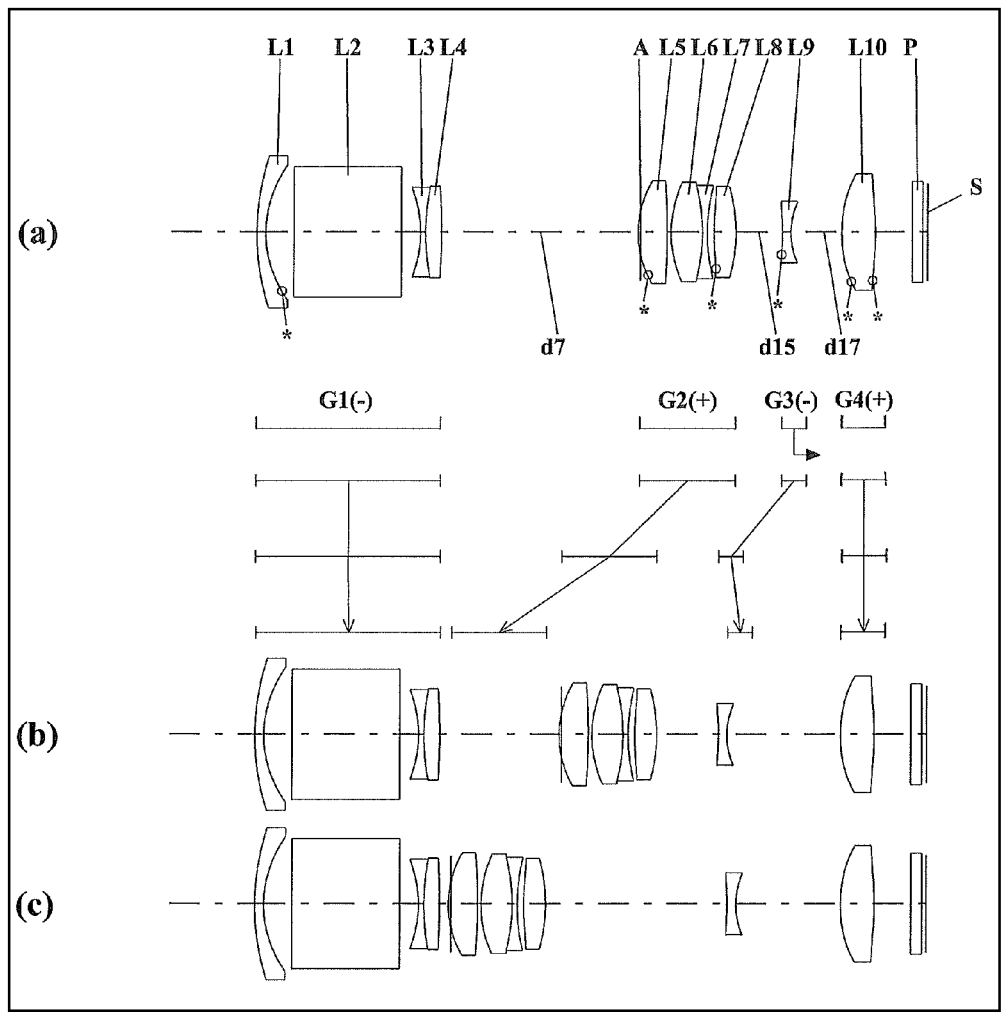
FIG. 17 is a lens arrangement diagram showing an infinity in-focus condition of a zoom lens system according to Embodiment II-2 (Example II-2)
Figure 18:
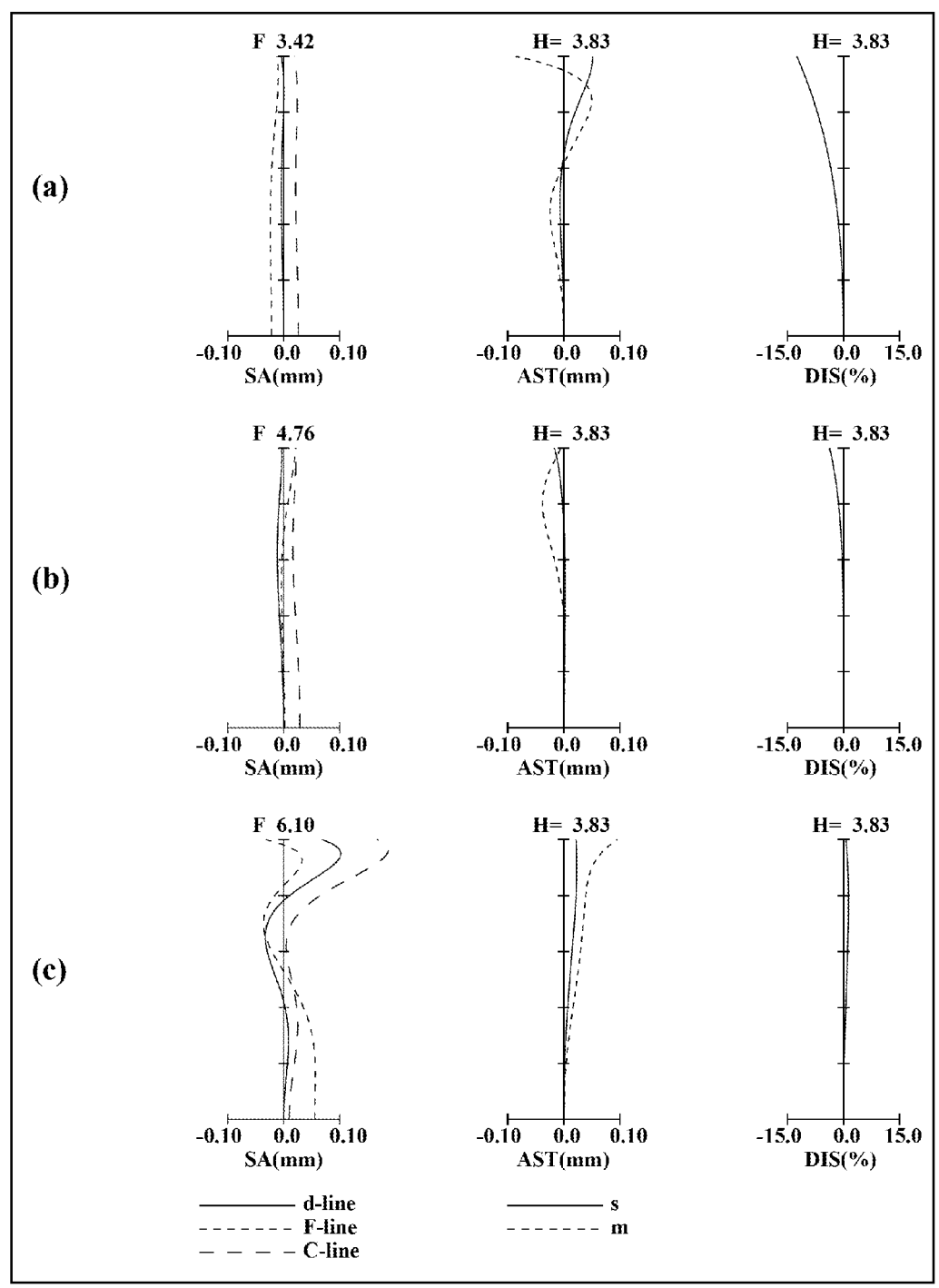
FIG. 18 is a longitudinal aberration diagram of an infinity in-focus condition of a zoom lens system according to Example II-2.
Figure 19:
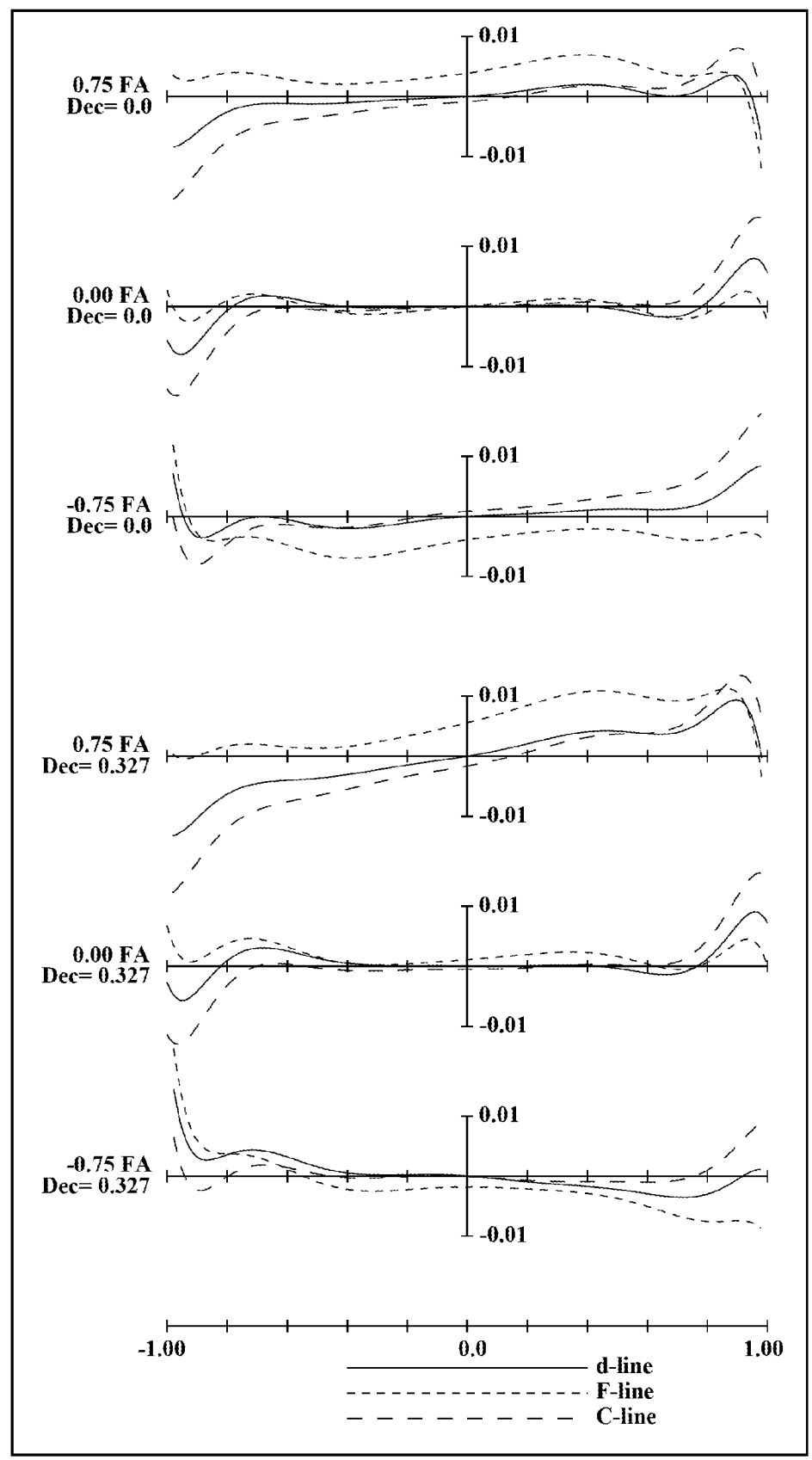
FIG. 19 is a lateral aberration diagram of a zoom lens system according to Example II-2 at a telephoto limit in a basic state where image blur compensation is not performed and in a blur compensation state.

As shown in FIG. 17, in the zoom lens system according to Embodiment II-2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has an aspheric image side surface.

Further, in the zoom lens system according to Embodiment II-2, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment II-2, the third lens unit G3 comprises solely a bi-concave ninth lens element L9. Further, the ninth lens element L9 has an aspheric object side surface.

Further, in the zoom lens system according to Embodiment II-2, the fourth lens unit G4 comprises solely a bi-convex tenth lens element L10. The tenth lens element L10 has two aspheric surfaces.

Here, in the zoom lens system according to Embodiment II-2, a plane parallel plate P is provided on the object side relative to the image surface S (between the image surface S and the tenth lens element L10).

In the zoom lens system according to Embodiment II-2, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 20:
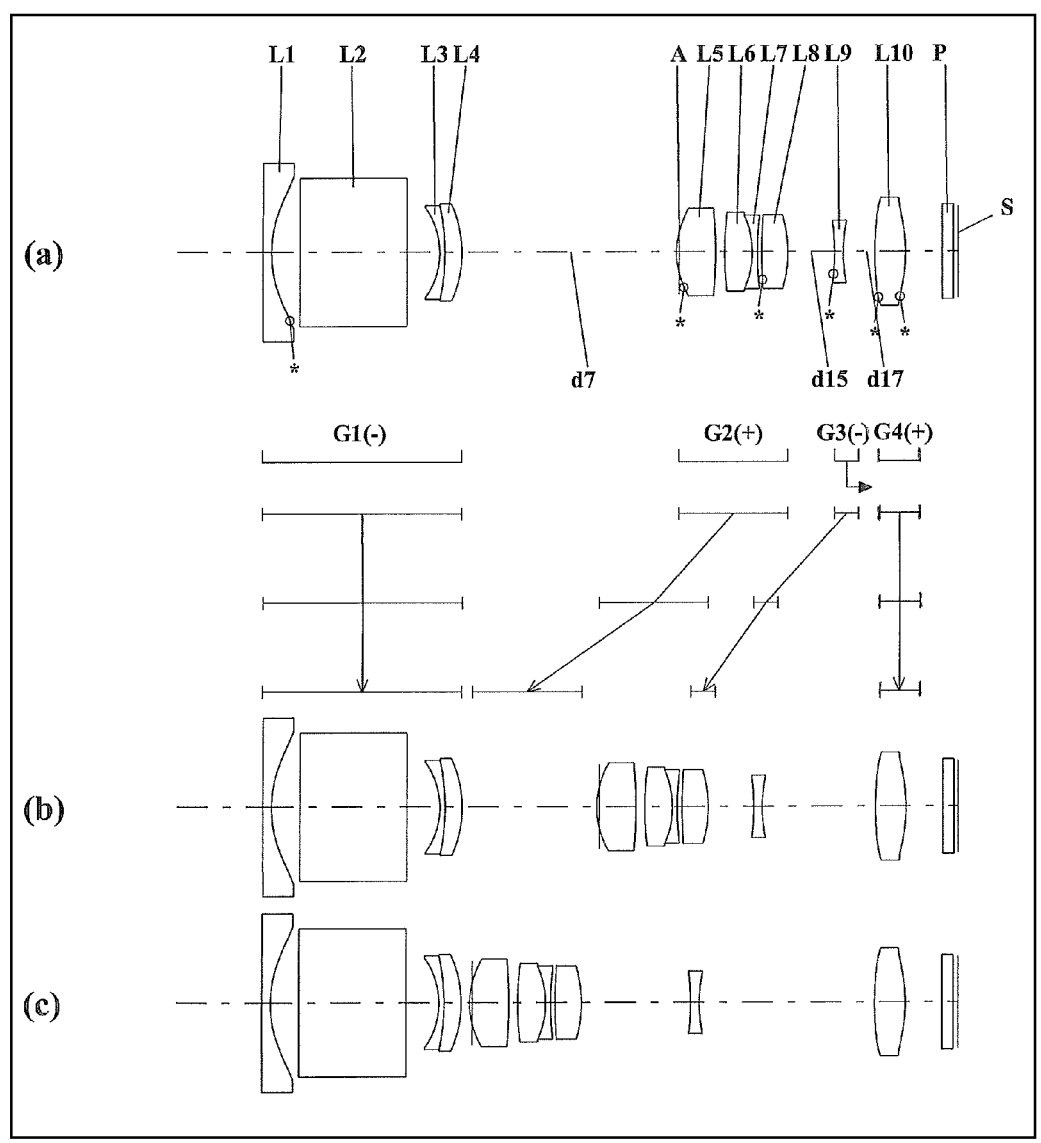
FIG. 20 is a lens arrangement diagram showing an infinity in-focus condition of a zoom lens system according to Embodiment II-3 (Example II-3)
Figure 21:
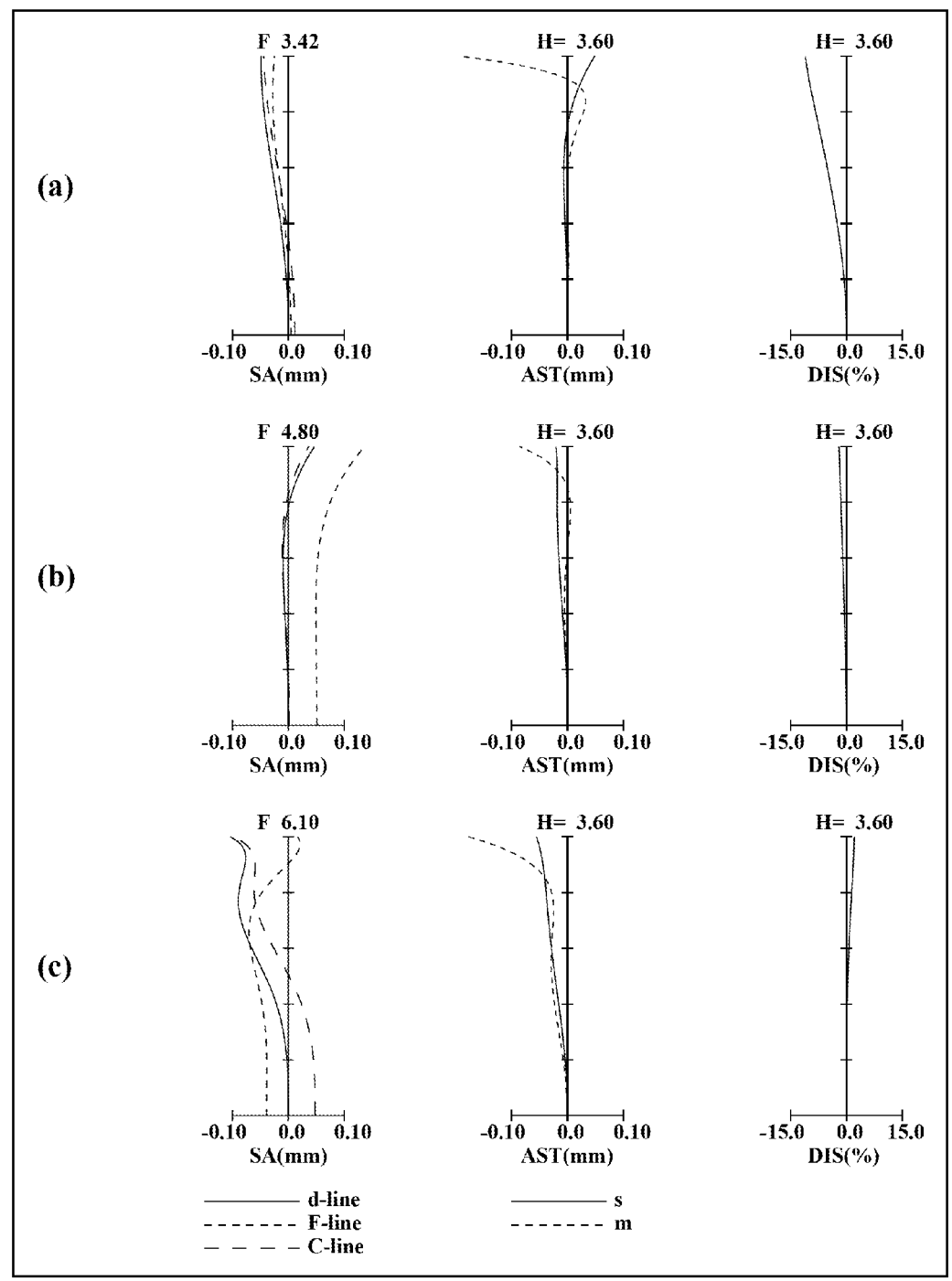
FIG. 21 is a longitudinal aberration diagram of an infinity in-focus condition of a zoom lens system according to Example II-3.
Figure 22:
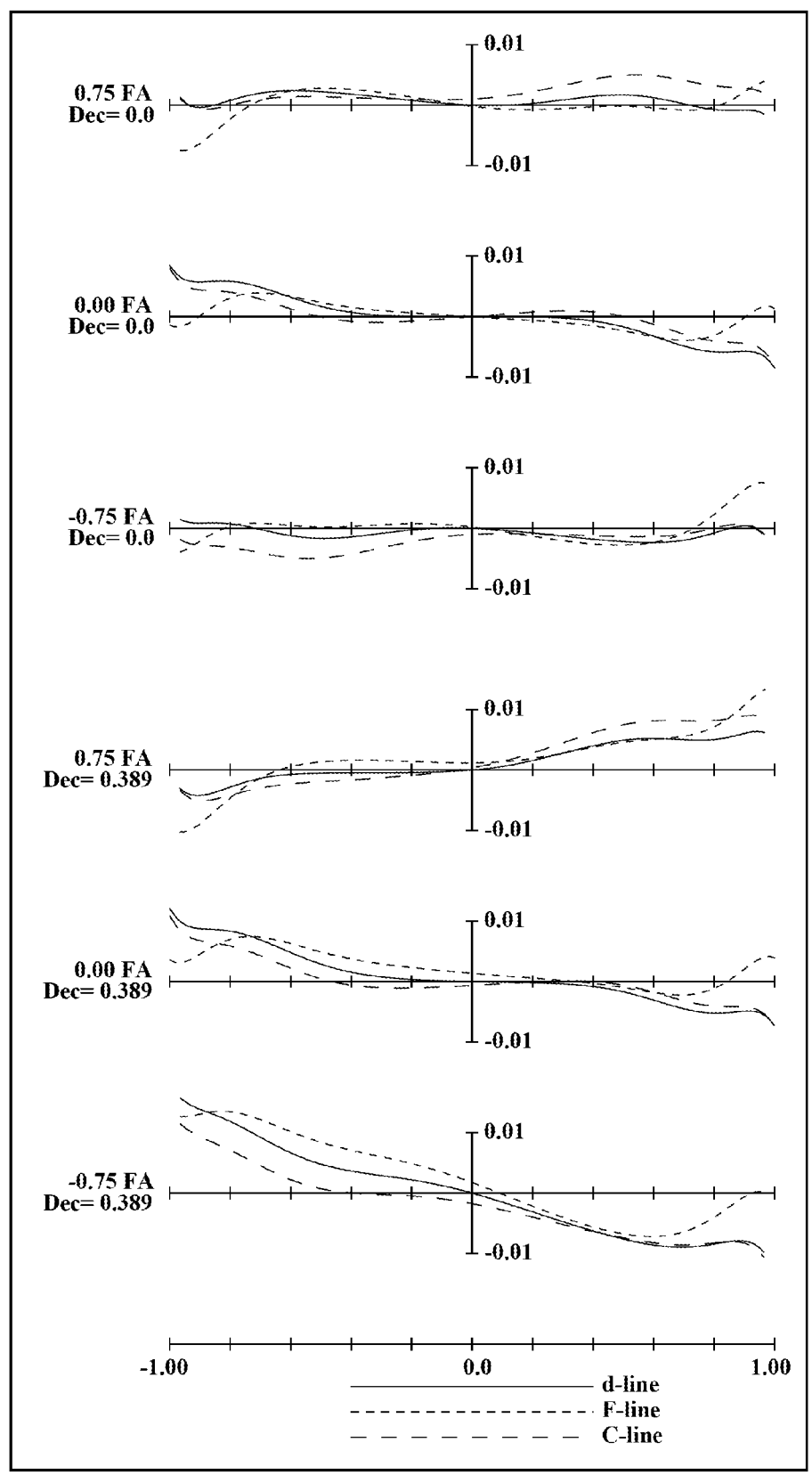
FIG. 22 is a lateral aberration diagram of a zoom lens system according to Example II-3 at a telephoto limit in a basic state where image blur compensation is not performed and in a blur compensation state.

As shown in FIG. 20, in the zoom lens system according to Embodiment II-3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment II-3, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment II-3, the third lens unit G3 comprises solely a bi-concave ninth lens element L9. Further, the ninth lens element L9 has an aspheric object side surface.

Further, in the zoom lens system according to Embodiment II-3, the fourth lens unit G4 comprises solely a bi-convex tenth lens element L10. The tenth lens element L10 has two aspheric surfaces.

Here, in the zoom lens system according to Embodiment II-3, a plane parallel plate P is provided on the object side relative to the image surface S (between the image surface S and the tenth lens element L10).

In the zoom lens system according to Embodiment II-3, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 23:
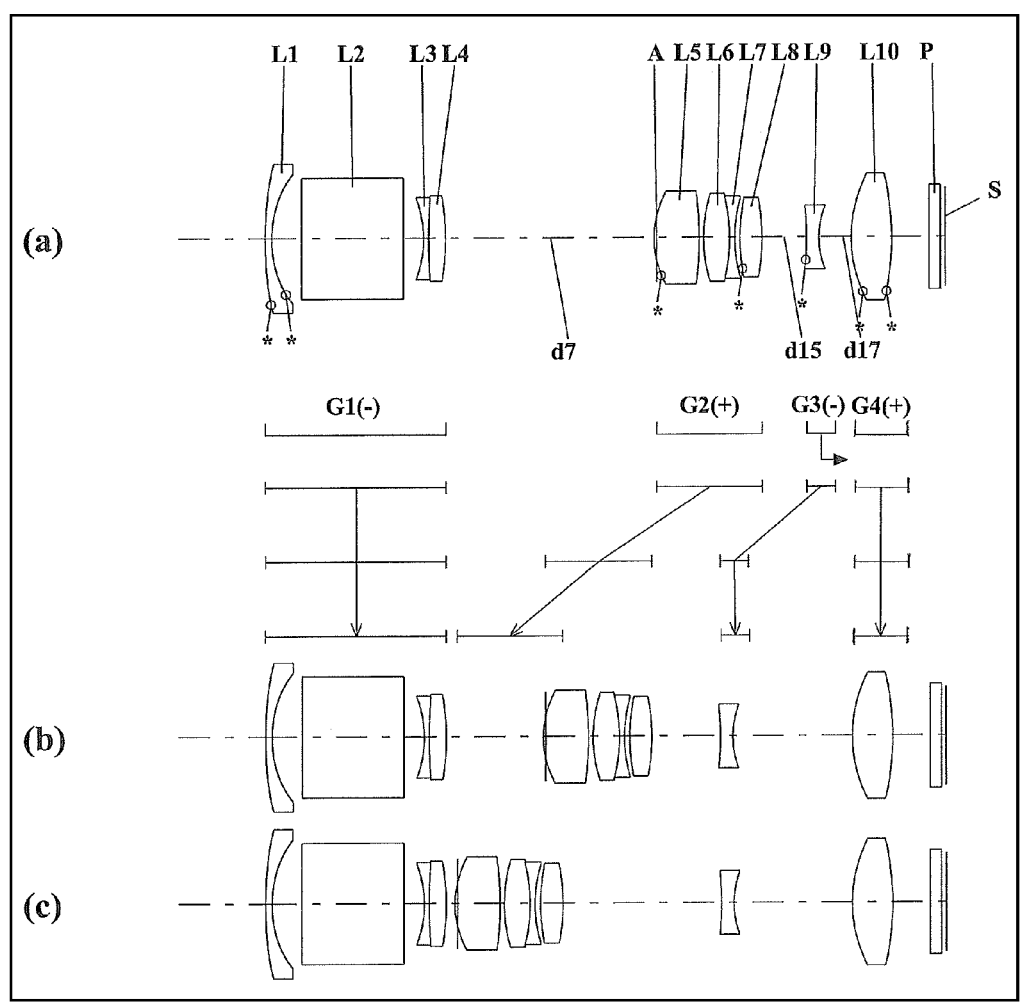
FIG. 23 is a lens arrangement diagram showing an infinity in-focus condition of a zoom lens system according to Embodiment II-4 (Example II-4)
Figure 24:
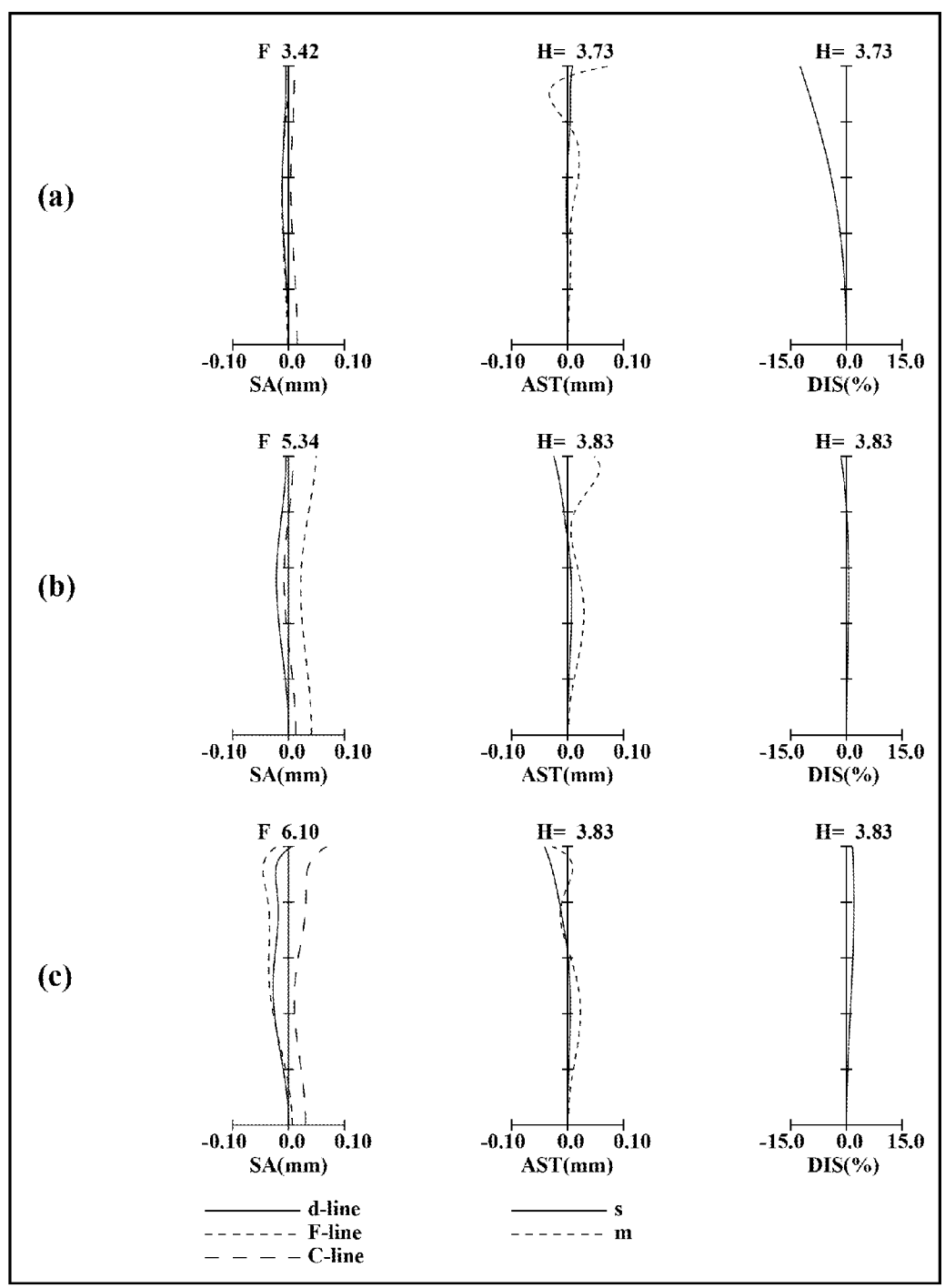
FIG. 24 is a longitudinal aberration diagram of an infinity in-focus condition of a zoom lens system according to Example II-4.
Figure 25:
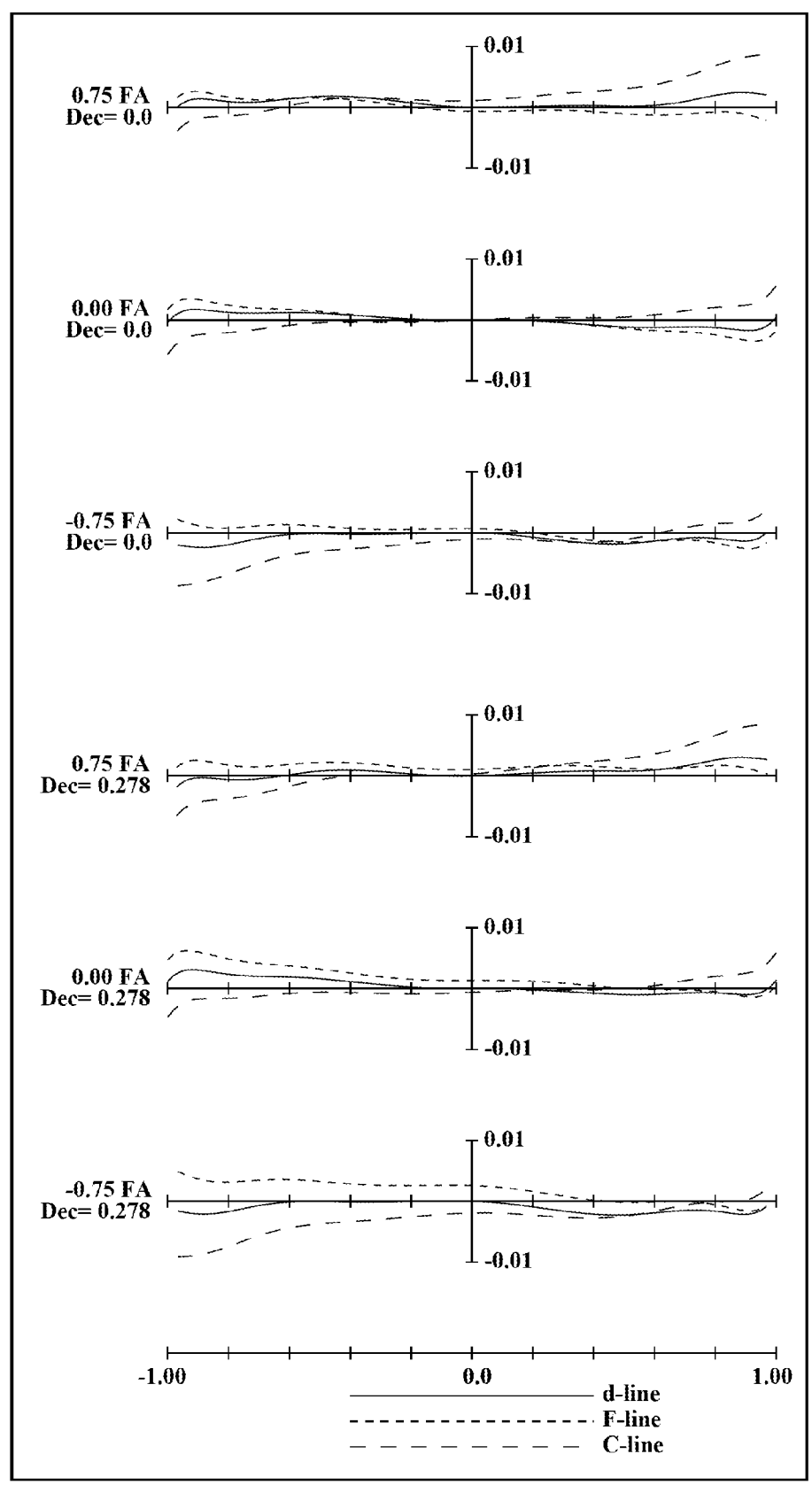
FIG. 25 is a lateral aberration diagram of a zoom lens system according to Example II-4 at a telephoto limit in a basic state where image blur compensation is not performed and in a blur compensation state.

As shown in FIG. 23, in the zoom lens system according to Embodiment II-4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment II-4, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment II-4, the third lens unit G3 comprises solely a bi-concave ninth lens element L9. Further, the ninth lens element L9 has an aspheric object side surface.

Further, in the zoom lens system according to Embodiment II-4, the fourth lens unit G4 comprises solely a bi-convex tenth lens element L10. The tenth lens element L10 has two aspheric surfaces.

Here, in the zoom lens system according to Embodiment II-4, a plane parallel plate P is provided on the object side relative to the image surface S (between the image surface S and the tenth lens element L10).

In the zoom lens system according to Embodiment II-4, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

In the zoom lens system according to Embodiments II-1 to II-4, the zoom lens system, in order from the object side to the image side, comprises a first lens unit G1 having negative optical power, a second lens unit G2 having positive optical power, and at least one subsequent lens unit having optical power. Then, in zooming from a wide-angle limit to a telephoto limit at the time of image taking, the first lens unit G1 does not move along the optical axis, while at least the second lens unit G2 moves along the optical axis so that variable magnification is achieved. As a result, in the zoom lens system according to Embodiments II-1 to II-4, size reduction is achieved, various kinds of aberration is compensated satisfactory, and a relatively high zooming ratio of 4 or greater is obtained.

In the zoom lens system according to Embodiments II-1 to II-4, the third lens unit G3 having negative optical power is included as a subsequent lens unit. Thus, in zooming from a wide-angle limit to a telephoto limit at the time of image taking, the third lens unit G3 having negative optical power is moved along the optical axis so as to contribute to magnification change. Accordingly, a high zooming ratio of 4 or greater is obtained in a state that a short overall length of lens system is achieved.

In the zoom lens system according to Embodiments II-1 to II-4, the first lens unit G1 includes the second lens element L2 (prism) having a reflecting surface capable of bending the light beam incident from the object, that is, bending the axial principal ray incident from the object, for example, by approximately 90°. Thus, the zoom lens system is constructed such that the thickness in the direction of the optical axis of the axial light beam incident from the object is satisfactorily small in an image taking state.

In the zoom lens system according to Embodiments II-1 to II-4, the second lens unit G2 includes at least two lens elements each having an aspheric surface. Thus, spherical aberration in the second lens unit G2 is compensated effectively, and hence satisfactory performance is ensured over the entire zooming range.

In the zoom lens system according to Embodiments II-1 to II-4, the aperture diaphragm A is located between the first lens unit G1 and the second lens unit G2. Thus, the lens diameters of the first lens unit G1 and the second lens unit G2 are allowed to be reduced. Further, in zooming from a wide-angle limit to a telephoto limit at the time of image taking, the aperture diaphragm A moves along the optical axis integrally with the second lens unit G2. This reduces the number of actuators necessary in zooming action.

Here, the zoom lens system according to Embodiments II-1 to II-4 has a four-unit construction consisting of the first lens unit G1, the second lens unit G2, the third lens unit G3 and the fourth lens unit G4. However, in the zoom lens system of the present invention, as long as the lens system comprises a first lens unit having negative optical power, a second lens unit having positive optical power, and at least one subsequent lens unit having optical power, the number of lens units is not limited to a particular value. That is, the zoom lens system may have a three-unit construction, a four-unit construction, or even another construction.

Further, as described above, it is preferable that the subsequent lens unit includes at least one lens unit having negative optical power. However, the optical power of each subsequent lens unit is not limited to a particular sign.

In the zoom lens system according to Embodiments II-1 to II-4, in zooming from a wide-angle limit to a telephoto limit at the time of image taking, the second lens unit G2 and the third lens unit G3 among the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the fourth lens unit G4 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Conditions preferably to be satisfied by a zoom lens system like the zoom lens system according to Embodiments II-1 to II-4 are described below. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

In a zoom lens system like the zoom lens system according to Embodiments II-1 to II-4, in order from the object side to the image side, comprising a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, while the first lens unit is not moved along the optical axis (this lens configuration is referred to as basic configuration II of the embodiment, hereinafter), the following condition (II-1) is satisfied.

$$2.45 < T_{G2}/f_W < 4.90 \qquad \text{(II-1)}$$

(here, $f_T/f_W \geqq 4.0$)

where, $T_{G2}$ is an amount of axial movement of the second lens unit in zooming from a wide-angle limit to a telephoto limit at the time of image taking, $f_T$ is a focal length of the entire system at a telephoto limit, and $f_W$ is a focal length of the entire system at a wide-angle limit.

The condition (II-1) relates to the amount of axial movement of the second lens unit and the focal length of the entire system at a wide-angle limit. When the value goes below the lower limit of the condition (II-1), the focal length of the second lens unit becomes short, and hence spherical aberration at a telephoto limit is degraded. In contrast, when the value exceeds the upper limit of the condition (II-1), the amount of movement of the second lens unit increases excessively, and hence size reduction is not achieved in the lens system.

When the following condition (II-1)' is satisfied, the above-mentioned effect is achieved more successfully.

$$T_{G2}/f_W < 4.50 \quad (\text{II-1})'$$

(here, $f_T/f_W \geq 4.0$)

Further, it is more preferable that the conditions (II-1) and (II-1)' are satisfied under the following condition.

$$f_T/f_W \geq 4.3$$

In a zoom lens system having basic configuration II like the zoom lens system according to Embodiments II-1 to II-4, it is preferable that the following condition (II-2) is satisfied.

$$2.5 < \beta_{2T}/\beta_{2W} < 4.4 \quad (\text{II-2})$$

(here, $f_T/f \, 4.0$)

where, $\beta_{2T}$ is a lateral magnification of the second lens unit at a telephoto limit in an infinity in-focus condition, $\beta_{2W}$ is a lateral magnification of the second lens unit at a wide-angle limit in an infinity in-focus condition, $f_T$ is a focal length of the entire system at a telephoto limit, and $f_W$ is a focal length of the entire system at a wide-angle limit.

The condition (II-2) relates to the lateral magnification of the second lens unit. When the value goes below the lower limit of the condition (II-2), the amount of movement of the second lens unit at the time of magnification change increases, and hence a possibility arises that size reduction in the lens system becomes difficult. In contrast, when the value exceeds the upper limit of the condition (II-2), the optical power of the second lens unit increases excessively, and hence a possibility arises that sufficient suppression of spherical aberration at a telephoto limit becomes difficult.

Here, when at least one of the following conditions (II-2)' and (II-2)" is satisfied, the above-mentioned effect is achieved more successfully.

$$2.8 < \beta_{2T}/\beta_{2W} \quad (\text{II-2})'$$

$$\beta_{2T}/\beta_{2W} < 3.9 \quad (\text{II-2})''$$

(here, $f_T/f_W \geq 4.0$)

Further, it is more preferable that the conditions (II-2), (II-2)' and (II-2)" are satisfied under the following condition.

$$f_T/f_W \geq 4.3$$

The lens units constituting the zoom lens system according to Embodiments II-1 to II-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment II-5)

Figure 26:
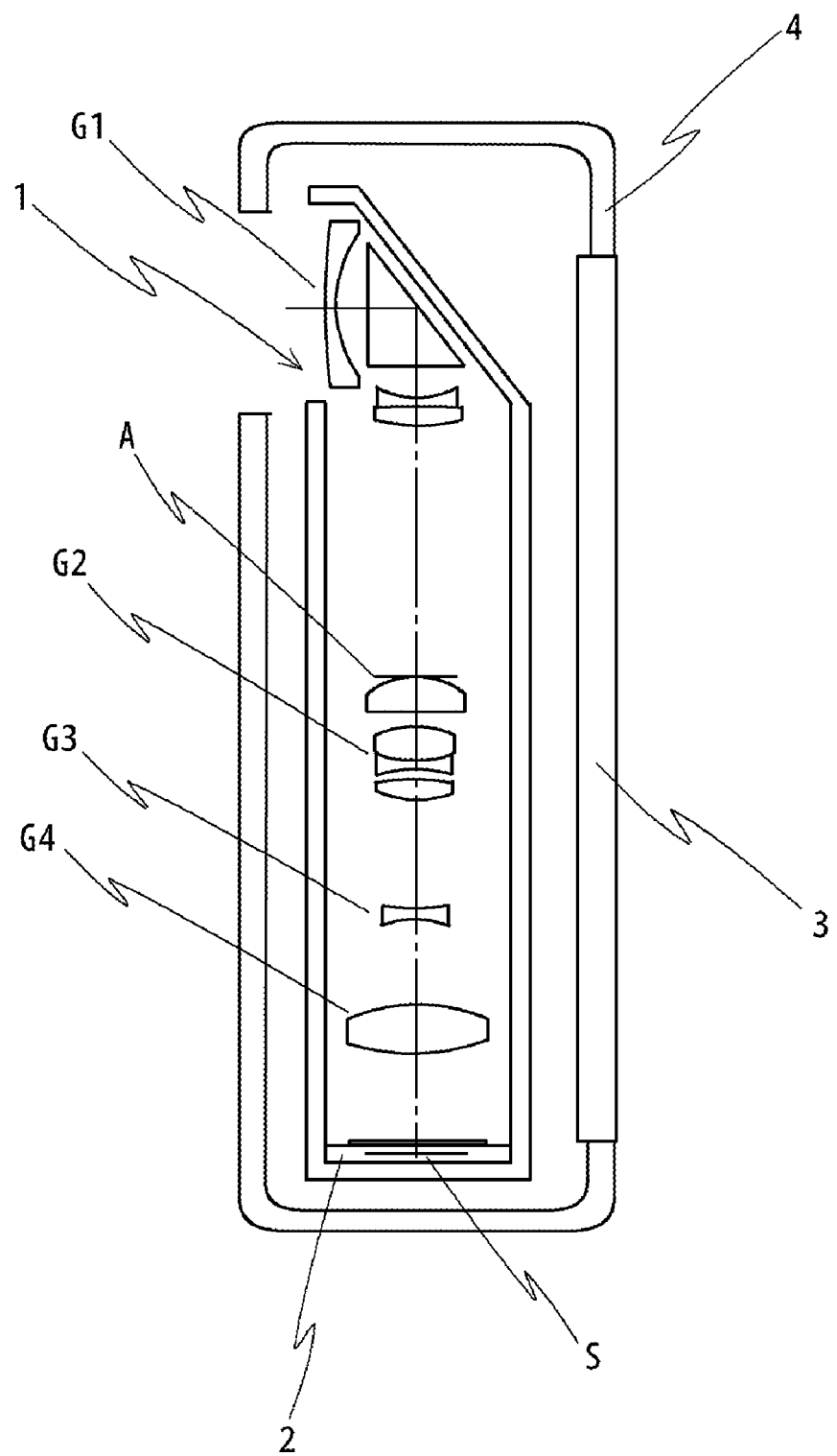
FIG. 26 is a schematic construction diagram of a digital still camera according to Embodiment II-5.

FIG. 26 is a schematic construction diagram of a digital still camera according to Embodiment II-5. In FIG. 26, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment II-1. In FIG. 26, the zoom lens system 1 comprises a first lens unit G1, an aperture diaphragm A, a second lens unit G2, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment II-1 is employed in a digital still camera, a small digital still camera is obtained that has a high resolution and high capability of compensating the curvature of field and that has a short overall length of lens system at the time of non-use. Here, in the digital still camera shown in FIG. 26, any one of the zoom lens systems according to Embodiments II-2 to II-4 may be employed in place of the zoom lens system according to Embodiment II-1. Further, the optical system of the digital still camera shown in FIG. 26 is applicable also to a digital video camera for moving images. In this case, moving images with high resolution can be acquired in addition to still images.

Here, the digital still camera according to the present Embodiment II-5 has been described for a case that the employed zoom lens system 1 is a zoom lens system according to Embodiments II-1 to II-4. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments II-1 to II-4.

Further, an imaging device comprising a zoom lens system according to Embodiments II-1 to II-4 described above and an image sensor such as a CCD or a CMOS may be applied to a mobile telephone, a PDA (Personal Digital Assistance), a surveillance camera in a surveillance system, a Web camera, a vehicle-mounted camera or the like.

Embodiments III-1 to III-4)

FIGS. 27, 30, 33 and 36 are lens arrangement diagrams of zoom lens systems according to Embodiments III-1 to III-4, respectively.

Each of FIGS. 27, 30, 33 and 36 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power, a second lens unit G2 having positive optical power, a third lens unit G3 having negative optical power; and a fourth lens unit G4 having positive optical power. The second lens element L2 (prism) in the first lens unit G1 corresponds to a lens element having a reflecting surface for bending the light beam incident from the object, that is, bending the axial principal ray incident from the object, for example, by approximately 90°. The position of the reflecting surface is not shown and omitted in the figure. Here, in the zoom lens system according to each embodiment, the lens element having a reflecting surface is composed of a prism. Instead, the lens element having a reflecting surface may be composed of, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the third lens unit G3 respectively move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, when these lens units are arranged in a desired optical power configuration, high optical performance is obtained and still size reduction is achieved in the entire lens system.

Further, in FIGS. 27, 30, 33 and 36, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 27, 30, 33 and 36, an aperture diaphragm A is provided on the most object side of the second lens unit G2, that is, between the first lens unit G1 and the second lens unit G2. Moreover, in zooming from a wide-angle limit to a telephoto limit at the time of image taking, the aperture diaphragm A moves along the optical axis integrally with the second lens unit G2.

Figure 27:
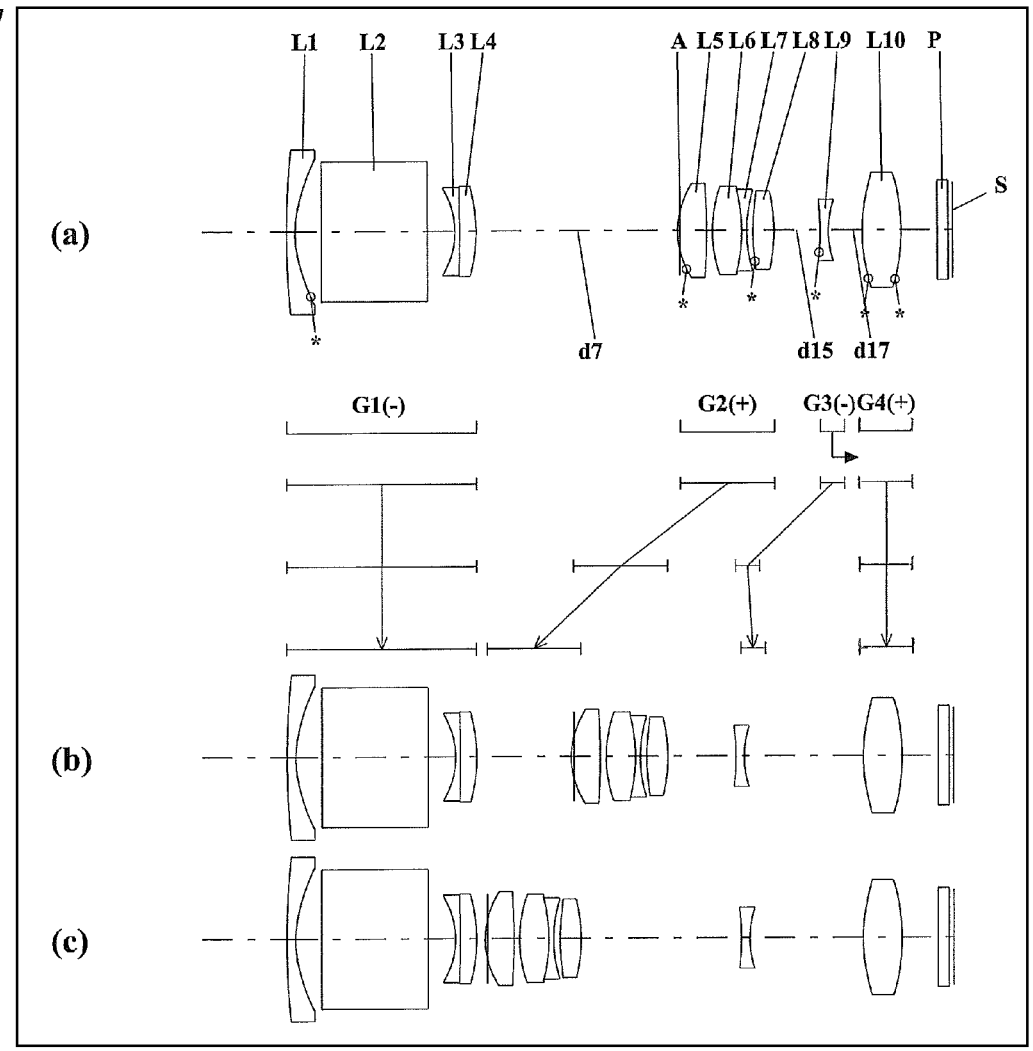
FIG. 27 is a lens arrangement diagram showing an infinity in-focus condition of a zoom lens system according to Embodiment III-1 (Example III-1)
Figure 28:
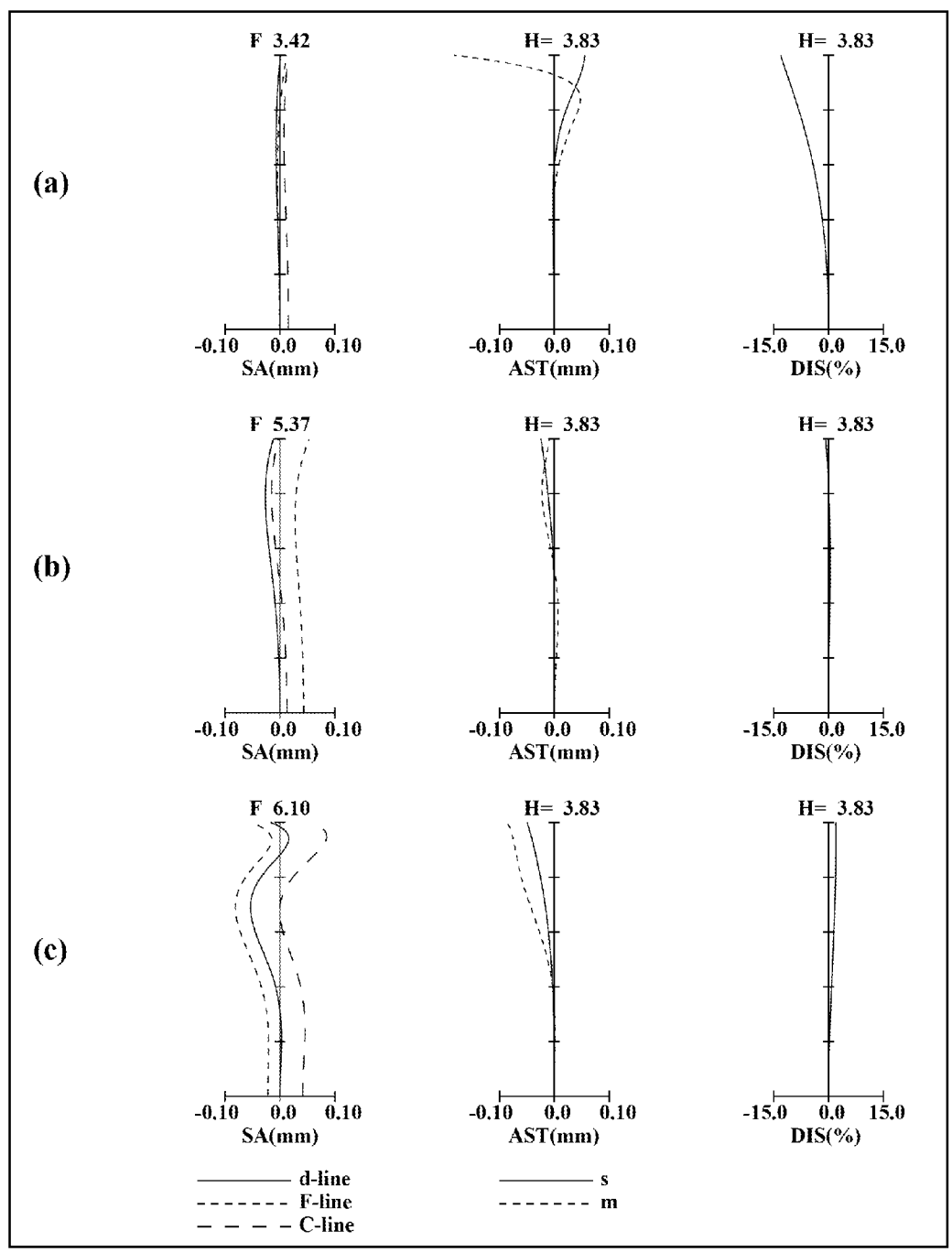
FIG. 28 is a longitudinal aberration diagram of an infinity in-focus condition of a zoom lens system according to Example III-1.
Figure 29:
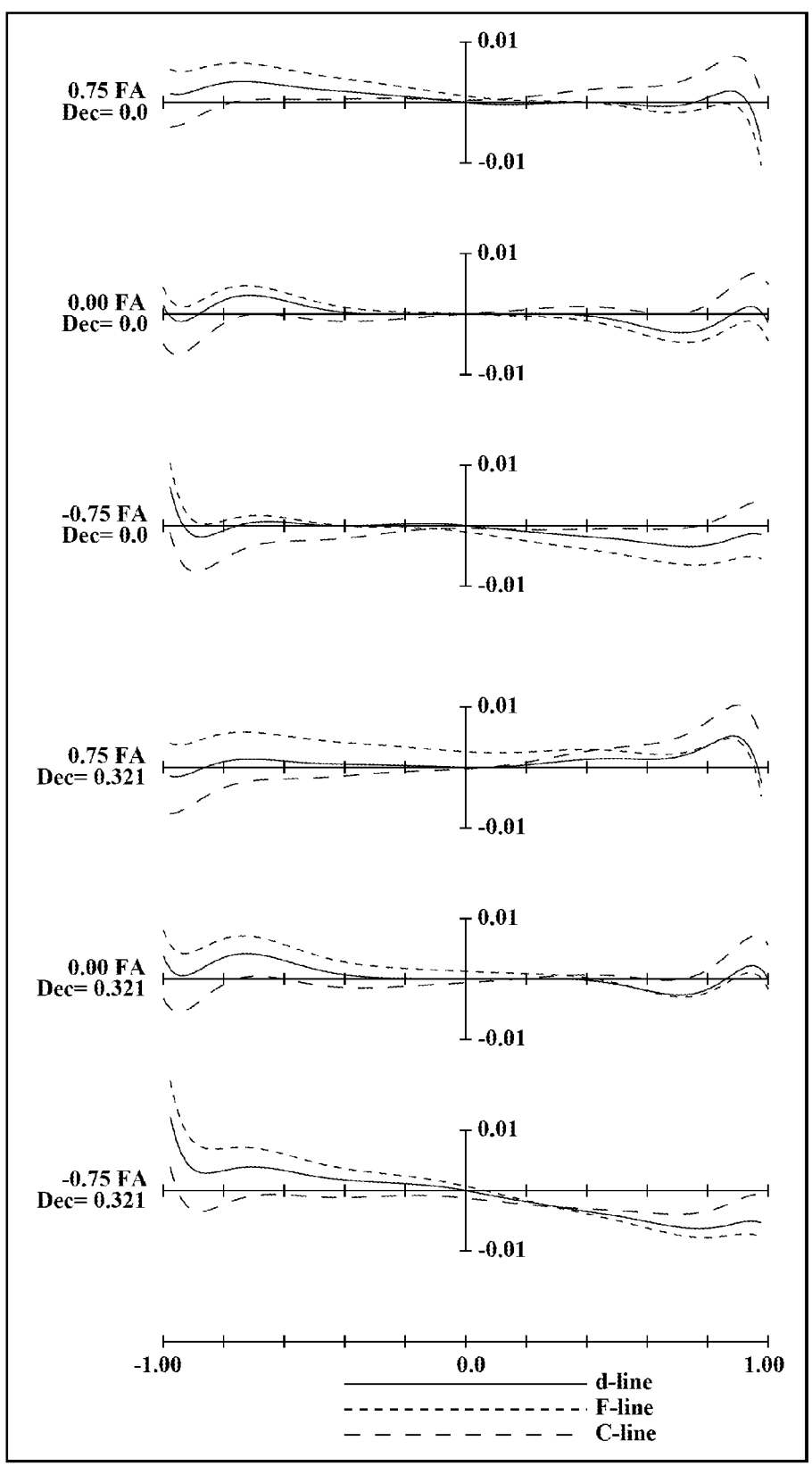
FIG. 29 is a lateral aberration diagram of a zoom lens system according to Example III-1 at a telephoto limit in a basic state where image blur compensation is not performed and in a blur compensation state.

As shown in FIG. 27, in the zoom lens system according to Embodiment III-1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment III-1, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment III-1, the third lens unit G3 comprises solely a bi-concave ninth lens element L9. Further, the ninth lens element L9 has an aspheric object side surface.

Further, in the zoom lens system according to Embodiment III-1, the fourth lens unit G4 comprises solely a bi-convex tenth lens element L10. The tenth lens element L10 has two aspheric surfaces.

Here, in the zoom lens system according to Embodiment III-1, a plane parallel plate P is provided on the object side relative to the image surface S (between the image surface S and the tenth lens element L10).

In the zoom lens system according to Embodiment III-1, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 30:
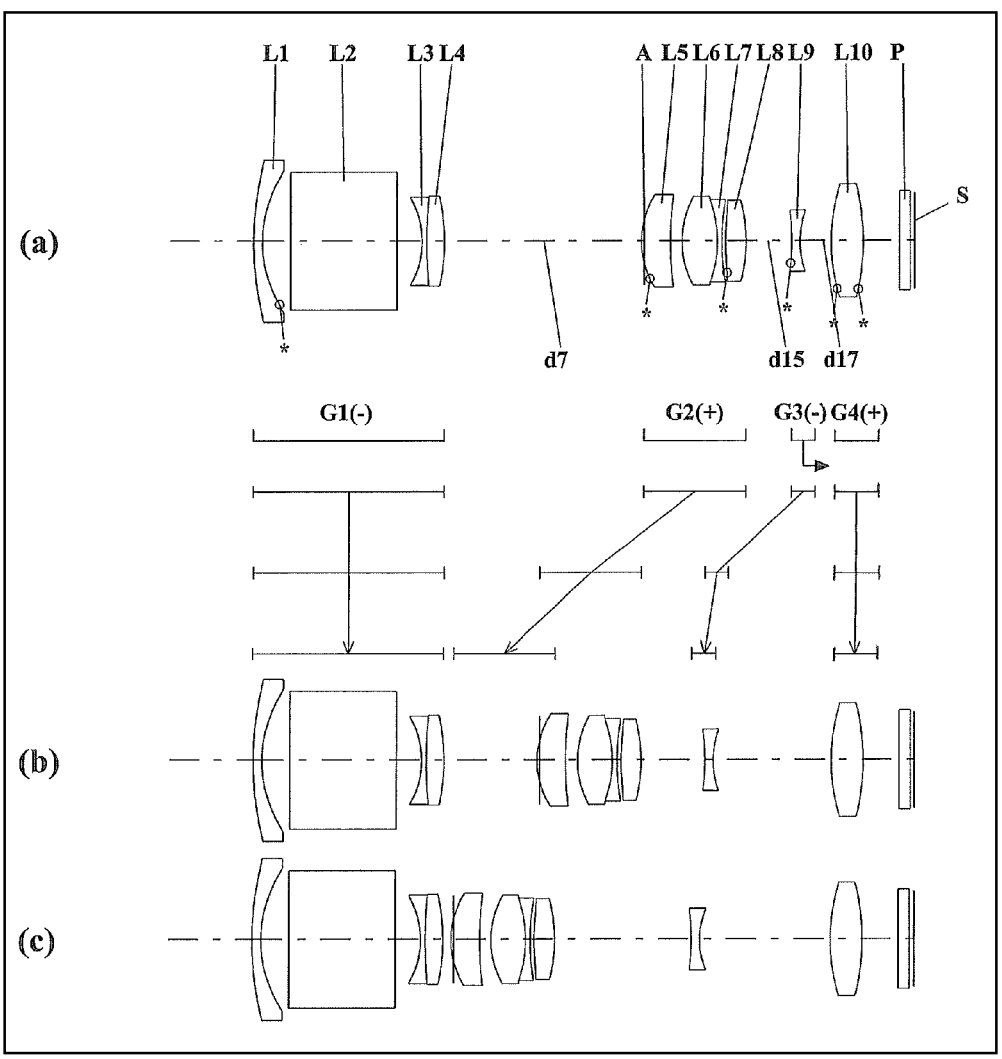
FIG. 30 is a lens arrangement diagram showing an infinity in-focus condition of a zoom lens system according to Embodiment III-2 (Example III-2)
Figure 31:
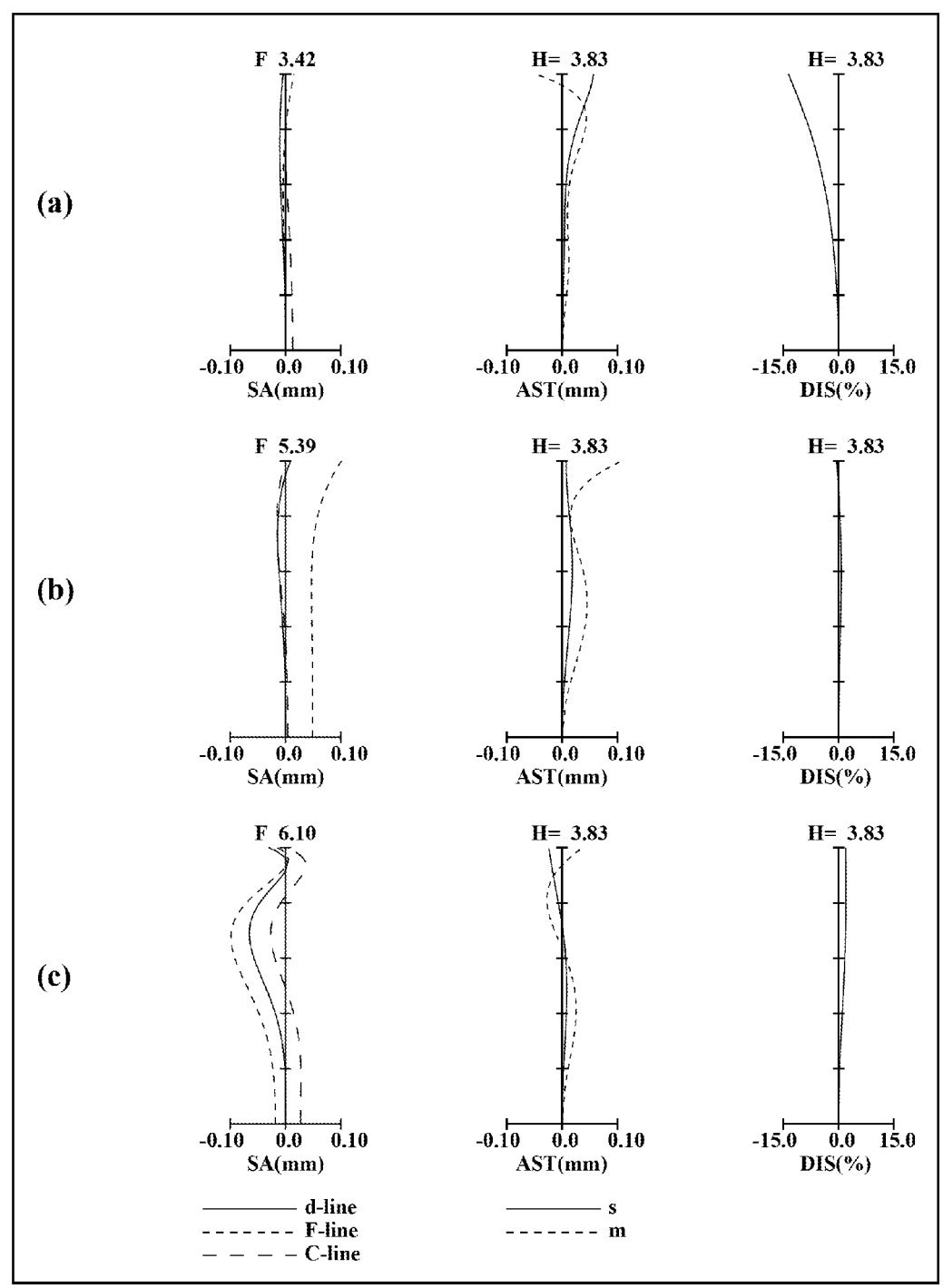
FIG. 31 is a longitudinal aberration diagram of an infinity in-focus condition of a zoom lens system according to Example III-2.
Figure 32:
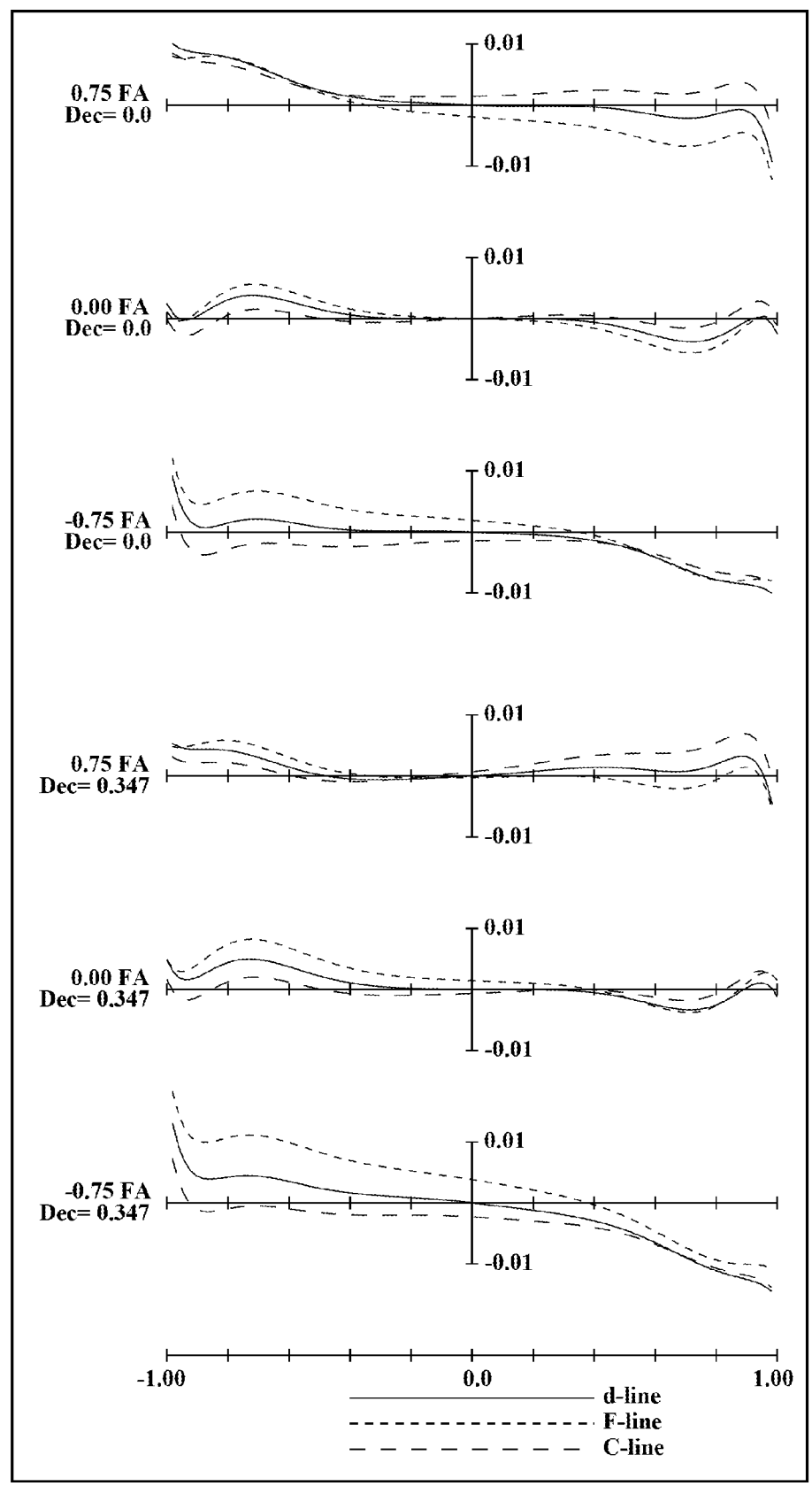
FIG. 32 is a lateral aberration diagram of a zoom lens system according to Example III-2 at a telephoto limit in a basic state where image blur compensation is not performed and in a blur compensation state.

As shown in FIG. 30, in the zoom lens system according to Embodiment III-2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has an aspheric image side surface.

Further, in the zoom lens system according to Embodiment III-2, the second lens unit G2, in order from the object side to the image side, comprises: a positive meniscus fifth lens element L5 with the convex surface facing the object side; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment III-2, the third lens unit G3 comprises solely a bi-concave ninth lens element L9. Further, the ninth lens element L9 has an aspheric object side surface.

Further, in the zoom lens system according to Embodiment III-2, the fourth lens unit G4 comprises solely a bi-convex tenth lens element L10. The tenth lens element L10 has two aspheric surfaces.

Here, in the zoom lens system according to Embodiment III-2, a plane parallel plate P is provided on the object side relative to the image surface S (between the image surface S and the tenth lens element L10).

In the zoom lens system according to Embodiment III-2, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 33:
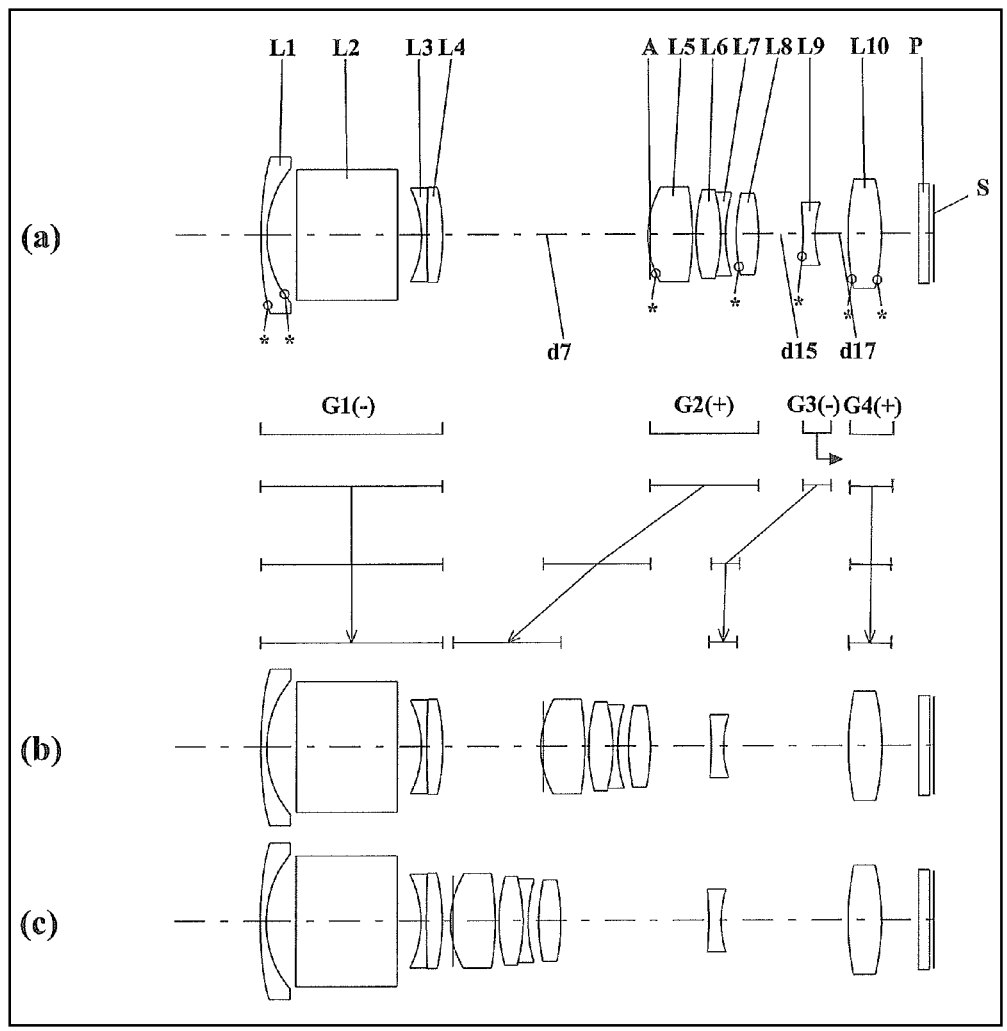
FIG. 33 is a lens arrangement diagram showing an infinity in-focus condition of a zoom lens system according to Embodiment III-3 (Example III-3)
Figure 34:
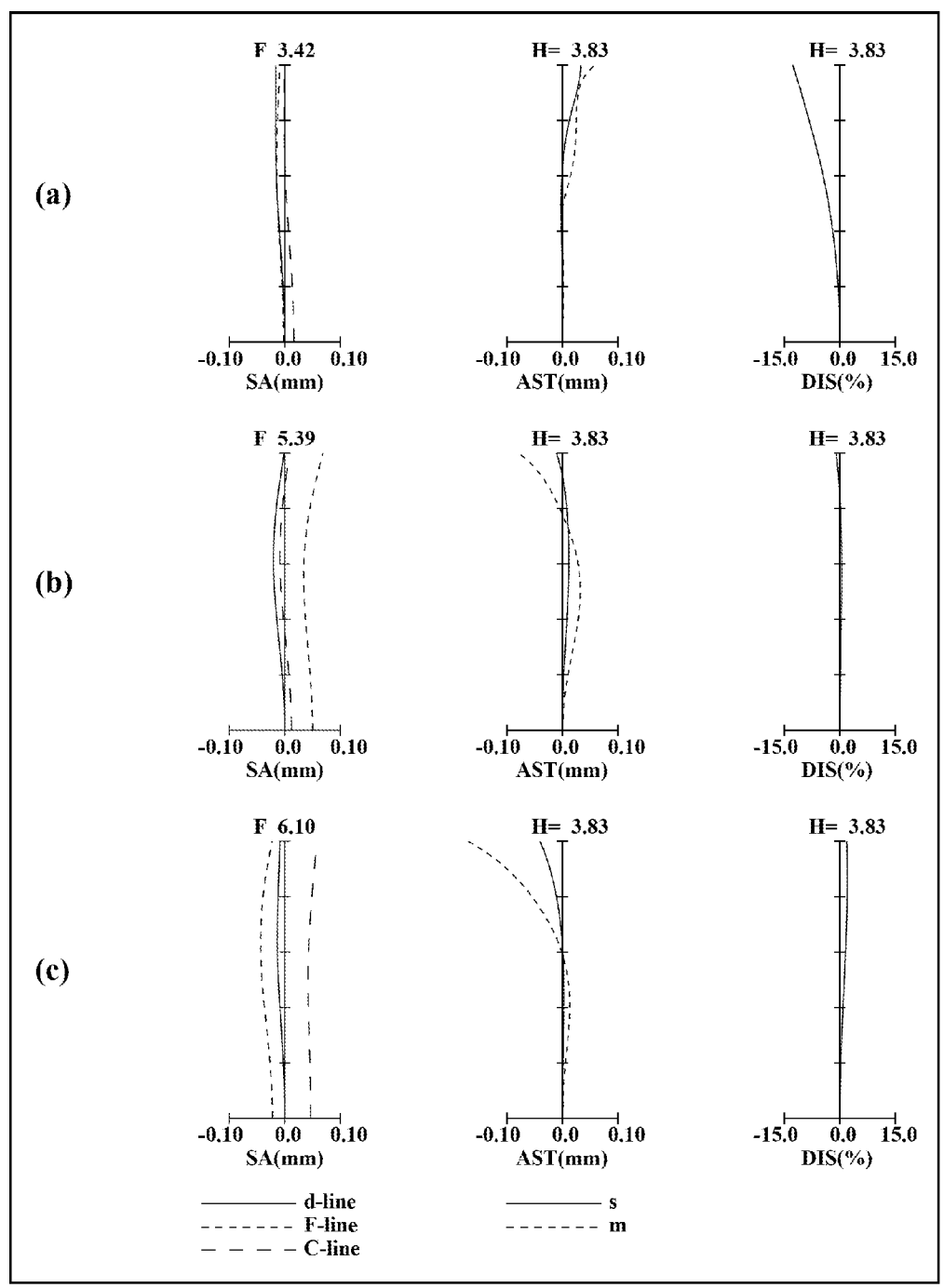
FIG. 34 is a longitudinal aberration diagram of an infinity in-focus condition of a zoom lens system according to Example III-3.
Figure 35:
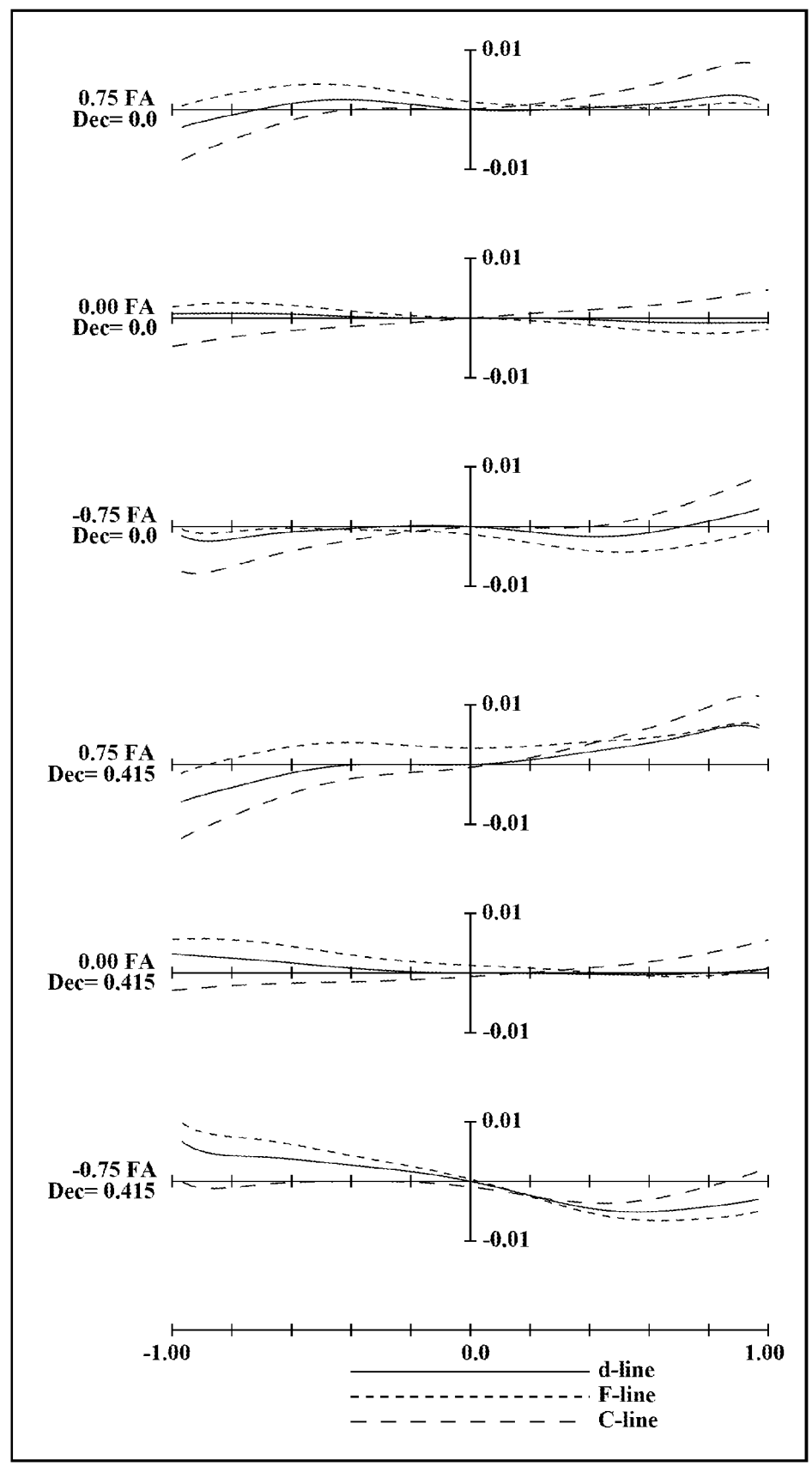
FIG. 35 is a lateral aberration diagram of a zoom lens system according to Example III-3 at a telephoto limit in a basic state where image blur compensation is not performed and in a blur compensation state.

As shown in FIG. 33, in the zoom lens system according to Embodiment III-3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment III-3, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment III-3, the third lens unit G3 comprises solely a bi-concave ninth lens element L9. Further, the ninth lens element L9 has an aspheric object side surface.

Further, in the zoom lens system according to Embodiment III-3, the fourth lens unit G4 comprises solely a bi-convex tenth lens element L10. The tenth lens element L10 has two aspheric surfaces.

Here, in the zoom lens system according to Embodiment III-3, a plane parallel plate P is provided on the object side relative to the image surface S (between the image surface S and the tenth lens element L10).

In the zoom lens system according to Embodiment III-3, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 36:
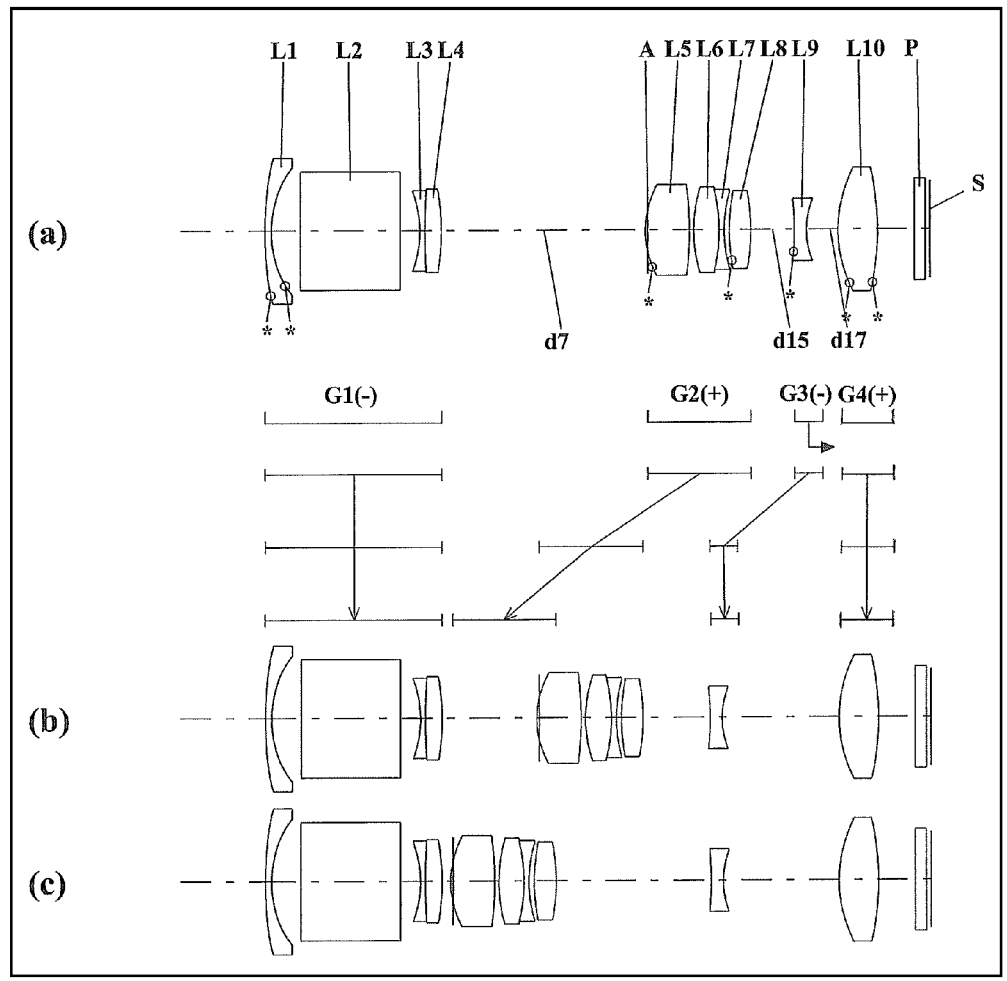
FIG. 36 is a lens arrangement diagram showing an infinity in-focus condition of a zoom lens system according to Embodiment III-4 (Example III-4)
Figure 37:
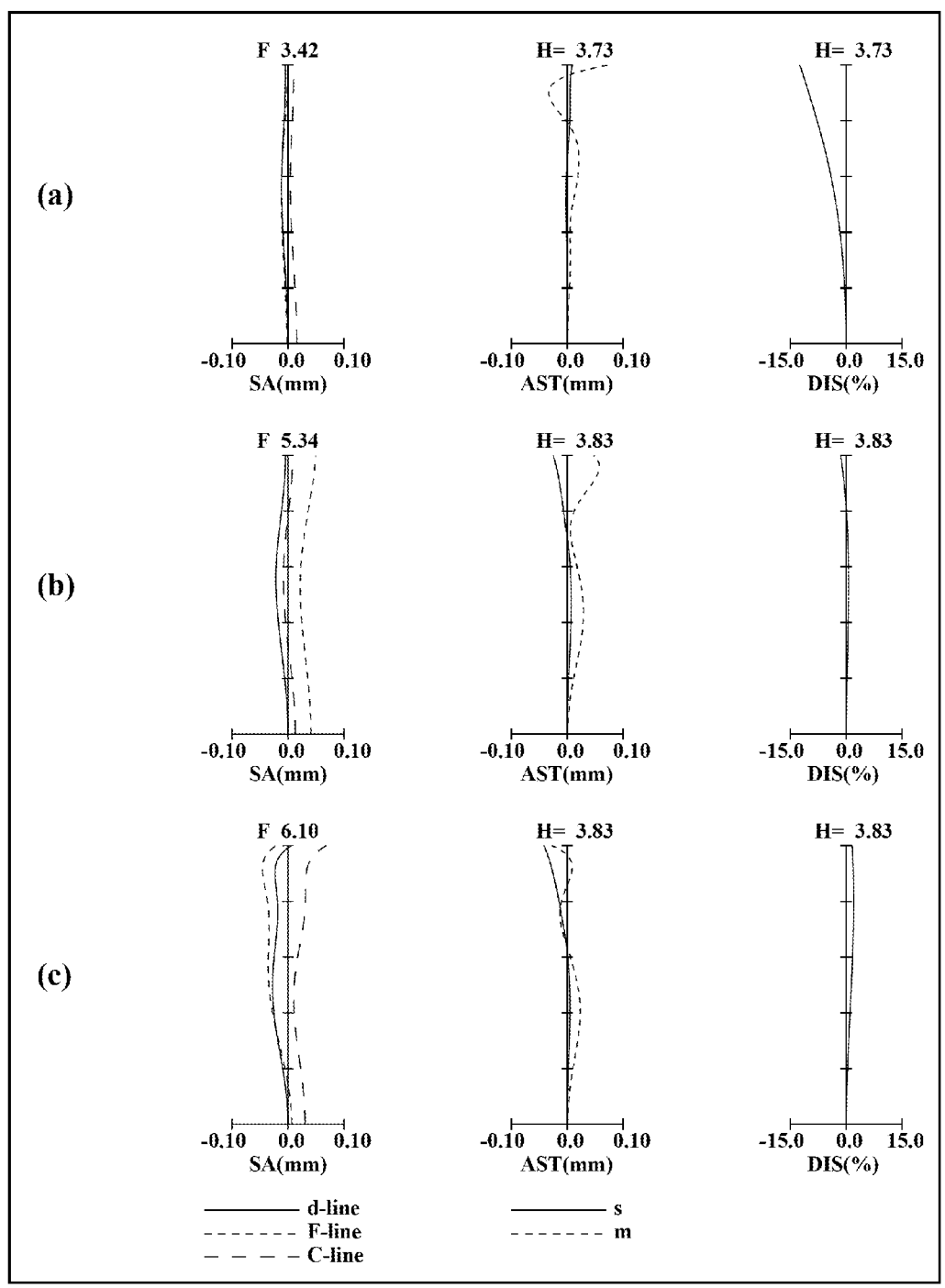
FIG. 37 is a longitudinal aberration diagram of an infinity in-focus condition of a zoom lens system according to Example III-4.
Figure 38:
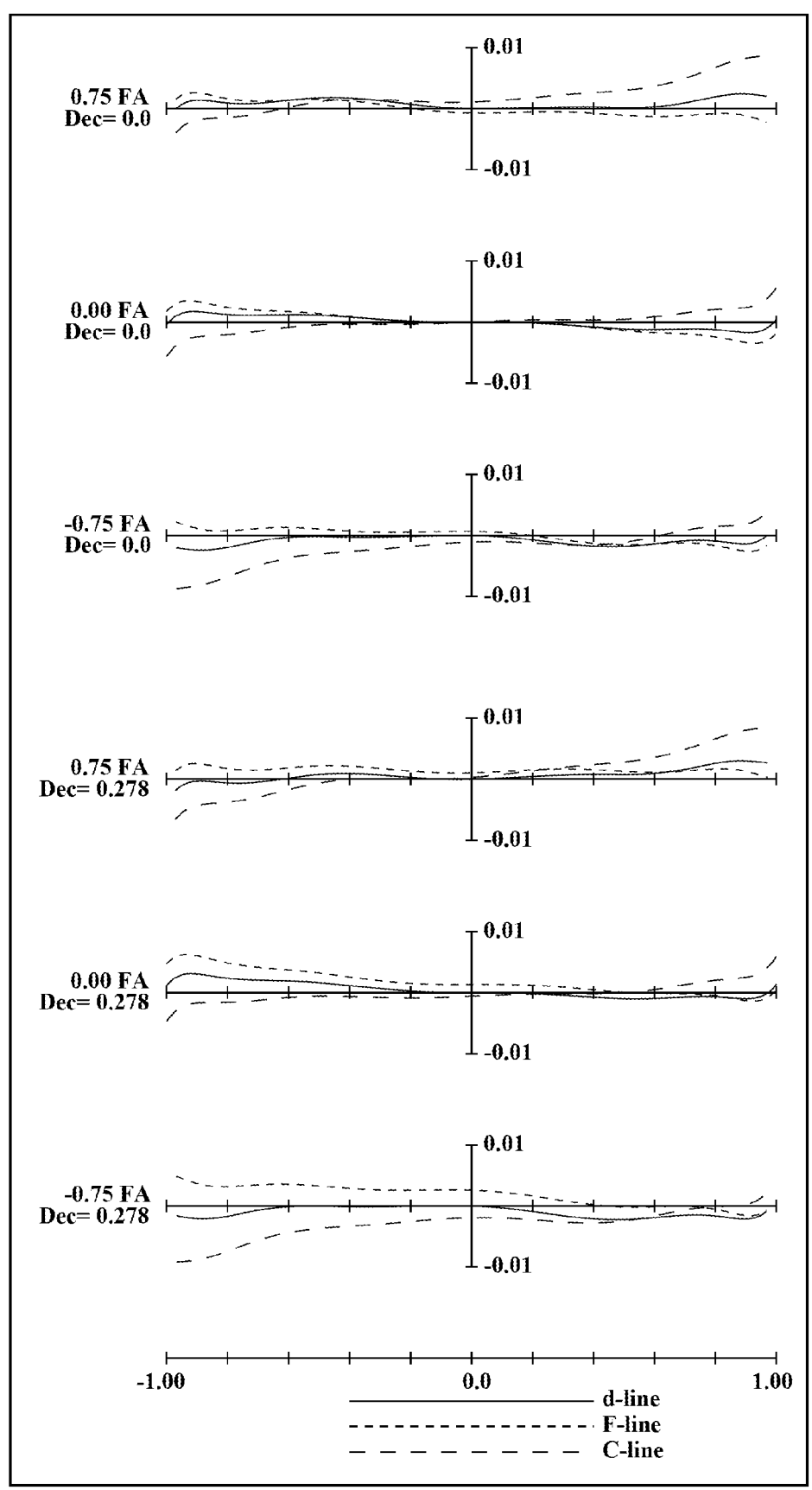
FIG. 38 is a lateral aberration diagram of a zoom lens system according to Example III-4 at a telephoto limit in a basic state where image blur compensation is not performed and in a blur compensation state.

As shown in FIG. 36, in the zoom lens system according to Embodiment III-4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment III-4, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment III-4, the third lens unit G3 comprises solely a bi-concave ninth lens element L9. Further, the ninth lens element L9 has an aspheric object side surface.

Further, in the zoom lens system according to Embodiment III-4, the fourth lens unit G4 comprises solely a bi-convex tenth lens element L10. The tenth lens element L10 has two aspheric surfaces.

Here, in the zoom lens system according to Embodiment III-4, a plane parallel plate P is provided on the object side relative to the image surface S (between the image surface S and the tenth lens element L10).

In the zoom lens system according to Embodiment III-4, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

In the zoom lens system according to Embodiments III-1 to III-4, the zoom lens system, in order from the object side to the image side, at least comprises a first lens unit G1 having negative optical power, a second lens unit G2 having positive optical power, and a third lens unit G3 having negative optical power. Then, in zooming from a wide-angle limit to a telephoto limit at the time of image taking, the lens units are moved along the optical axis such that the air space between the first lens unit G1 and the second lens unit G2 and the air space between the second lens unit G2 and the third lens unit G3 should vary, so that variable magnification is achieved. Thus, the zoom lens system according to Embodiments III-1 to III-4 has a small size and still is satisfactorily applicable in wide-angle image taking.

In the zoom lens system according to Embodiments III-1 to III-4, in zooming from a wide-angle limit to a telephoto limit at the time of image taking, the first lens unit G1 does not move along the optical axis. Thus, as the lens barrel for holding this zoom lens system, a lens barrel without a shape change associated with zooming can be employed. This permits fabrication of a camera having a high degree of freedom in the shape as well as an excellent shock resistance.

In the zoom lens system according to Embodiments III-1 to III-4, the first lens unit G1 includes the second lens element L2 (prism) having a reflecting surface capable of bending the light beam incident from the object, that is, bending the axial principal ray incident from the object, for example, by approximately 90°. Thus, the zoom lens system is constructed such that the thickness in the direction of the optical axis of the axial light beam incident from the object is satisfactorily small in an image taking state.

In the zoom lens system according to Embodiments III-1 to III-4, the aperture diaphragm A is located between the first lens unit G1 and the second lens unit G2. Thus, the effective lens diameter of the first lens unit G1 is allowed to be reduced, and hence the first lens unit G1 including the second lens element L2 having a reflecting surface can be constructed in a more compact form.

In the zoom lens system according to Embodiments III-1 to III-4, the third lens unit G3 is composed of one lens element having an aspheric surface. Thus, the number of lens elements in the entire lens system is reduced, and still image planarity is achieved satisfactory over the entire zooming range.

Here, the zoom lens system according to Embodiments III-1 to III-4 has a four-unit construction consisting of the first lens unit G1, the second lens unit G2, the third lens unit G3 and the fourth lens unit G4. However, as long as the lens system at least comprises a first lens unit having negative optical power, a second lens unit having positive optical power, and a third lens unit having negative optical power, the number of lens units in the zoom lens system of the present invention is not limited to a particular value. That is, the zoom lens system may have a three-unit construction. Alternatively, a four-unit construction may be employed that includes a subsequent lens unit on the image side relative to the third lens unit like in the embodiments given above. Further, even another construction may be employed.

Further, in a case that a subsequent lens unit is provided on the image side relative to the third lens unit, the optical power of the subsequent lens unit is not limited to a particular sign.

In the zoom lens system according to Embodiments III-1 to III-4, in zooming from a wide-angle limit to a telephoto limit at the time of image taking, the second lens unit G2 and the third lens unit G3 among the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the fourth lens unit G4 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Conditions preferably to be satisfied by a zoom lens system like the zoom lens system according to Embodiments III-1 to III-4 are described below. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

In a zoom lens system like the zoom lens system according to Embodiments III-1 to III-4, in order from the object side to the image side, at least comprising a first lens unit having negative optical power, a second lens unit having positive optical power, and a third lens unit having negative optical power, wherein in zooming from a wide-angle limit to a telephoto limit at the time of image taking, the lens units are moved along the optical axis such that the air space between the first lens unit and the second lens unit and the air space between the second lens unit and the third lens unit should vary, so that variable magnification is achieved (this lens configuration is referred to as basic configuration III of the embodiment, hereinafter), the following condition (III-1) is satisfied.

$$1.25 < \beta_{3T}/\beta_{3W} < 1.90 \qquad (III-1)$$

(here, $f_T/f_W \geq 4.0$)

where, $\beta_{3T}$ is a lateral magnification of the third lens unit at a telephoto limit in an infinity in-focus condition, $\beta_{3W}$ is a lateral magnification of the third lens unit at a wide-angle limit in an infinity in-focus condition, $f_T$ is a focal length of the entire system at a telephoto limit, and $f_W$ is a focal length of the entire system at a wide-angle limit.

The condition (III-1) relates to the lateral magnification of the third lens unit. When the value goes below the lower limit of the condition (III-1), contribution of the third lens unit to variable magnification becomes small, and hence the zooming ratio of the entire lens system cannot be made as high as 4 or greater. In contrast, when the value exceeds the upper limit of the condition (III-1), curvature of field is not maintained in a satisfactory state over the entire zooming range.

When the following condition (III-1)' is satisfied, the above-mentioned effect is achieved more successfully.

$$\beta_{3T}/\beta_{3W} < 1.56 \qquad (III-1)'$$

(here, $f_T/f_W \geq 4.0$)

Further, it is more preferable that the conditions (III-1) and (III-1)' are satisfied under the following condition.

$$f_T/f_W \geq 4.3$$

In a zoom lens system having basic configuration III like the zoom lens system according to Embodiments III-1 to III-4, it is preferable that the following condition (III-2) is satisfied.

$$1.1 < (M_{23T} - M_{23W})/f_W < 2.8 \qquad (\text{III-2})$$

(here, $f_T/f_W \geqq 4.0$)

where, $M_{23T}$ is an axial interval between the second lens unit and the third lens unit at a telephoto limit, $M_{23W}$ is an axial interval between the second lens unit and the third lens unit at a wide-angle limit, $f_T$ is a focal length of the entire system at a telephoto limit, and $f_W$ is a focal length of the entire system at a wide-angle limit.

The condition (III-2) relates to a change in the axial interval between the second lens unit and the third lens unit. When the value goes below the lower limit of the condition (III-2), contribution of the third lens unit to variable magnification becomes small, and hence a possibility arises that achievement of a zooming ratio as high as 4 or greater in the entire lens system becomes difficult. In contrast, when the value exceeds the upper limit of the condition (III-2), the overall length of lens system at a telephoto limit becomes long, and hence a possibility arises that size reduction in the lens system becomes difficult.

Here, when at least one of the following conditions (III-2)' and (III-2)" is satisfied, the above-mentioned effect is achieved more successfully.

$$1.3 < (M_{23T} - M_{23W})/f_W \qquad (\text{III-2})'$$

$$(M_{23T} - M_{23W})/f_W < 2.5 \qquad (\text{III-2})''$$

(here, $f_T/f_W \geqq 4.0$)

Further, it is more preferable that the conditions (III-2), (III-2)' and (III-2)" are satisfied under the following condition.

$$f_T/f_W \geqq 4.3$$

In a zoom lens system having basic configuration III like the zoom lens system according to Embodiments III-1 to III-4, it is preferable that the following condition (III-3) is satisfied.

$$2.5 < \beta_{2T}/\beta_{2W} < 4.2 \qquad (\text{III-3})$$

(here, $f_T/f_W \geqq 4.0$)

where, $\beta_{2T}$ is a lateral magnification of the second lens unit at a telephoto limit in an infinity in-focus condition, $\beta_{2W}$ is a lateral magnification of the second lens unit at a wide-angle limit in an infinity in-focus condition, $f_T$ is a focal length of the entire system at a telephoto limit, and $f_W$ is a focal length of the entire system at a wide-angle limit.

The condition (III-3) relates to the lateral magnification of the second lens unit. When the value goes below the lower limit of the condition (III-3), contribution of the second lens unit to variable magnification becomes small, and hence a possibility arises that achievement of a zooming ratio as high as 4 or greater in the entire lens system becomes difficult. In contrast, when the value exceeds the upper limit of the condition (III-3), the optical power of the second lens unit increases excessively, and hence a possibility arises that sufficient suppression of spherical aberration at a telephoto limit becomes difficult.

Here, when at least one of the following conditions (III-3)' and (III-3)" is satisfied, the above-mentioned effect is achieved more successfully.

$$2.8 < \beta_{2T}/\beta_{2W} \qquad (\text{III-3})'$$

$$\beta_{2T}/\beta_{2W} < 3.7 \qquad (\text{III-3})''$$

(here, $f_T/f_W \geqq 4.0$)

Further, it is more preferable that the conditions (III-3), (III-3)' and (III-3)" are satisfied under the following condition.

$$f_T/f_W \geqq 4.3$$

The lens units constituting the zoom lens system according to Embodiments III-1 to III-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment III-5)

Figure 39:
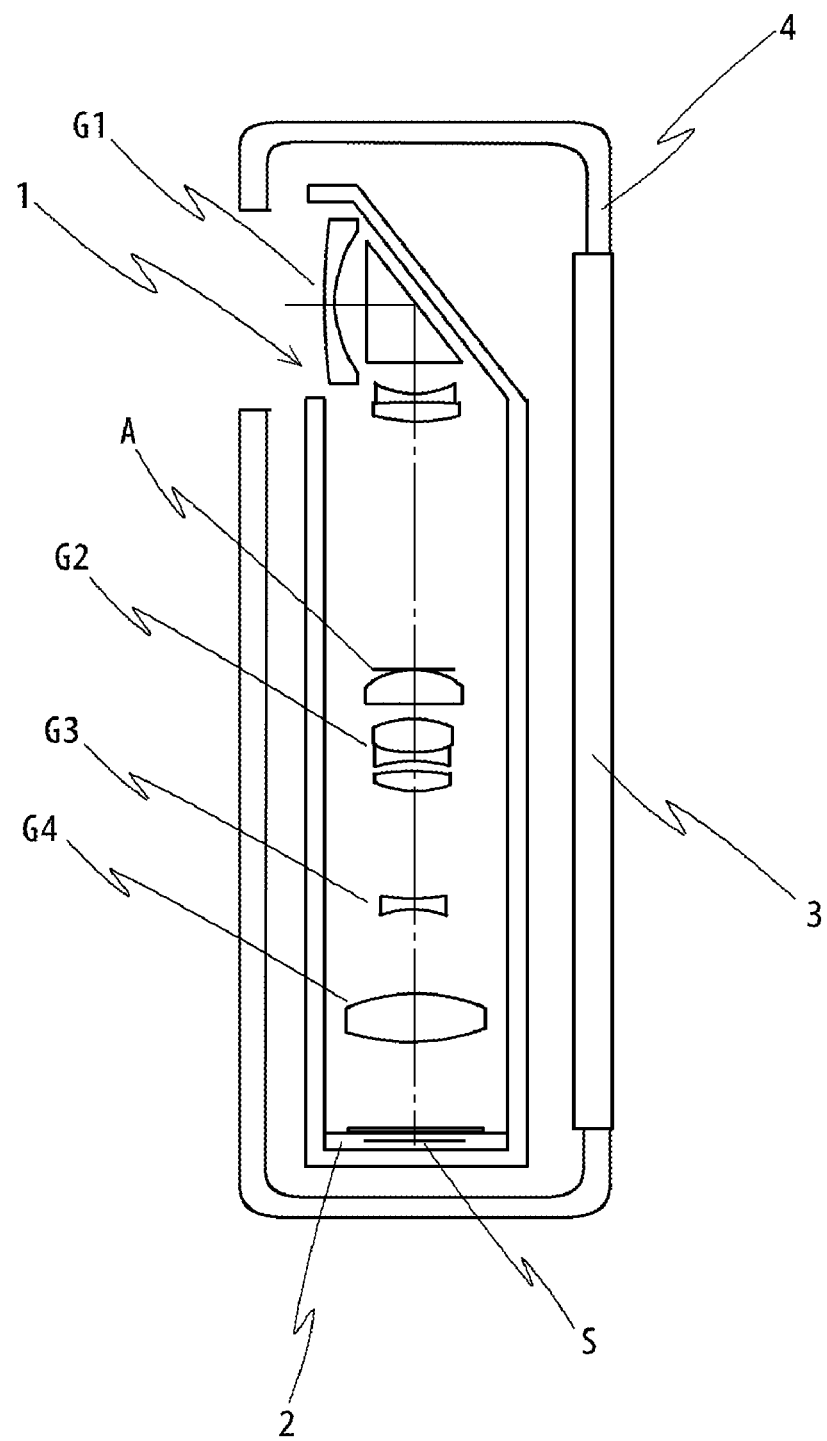
FIG. 39 is a schematic construction diagram of a digital still camera according to Embodiment III-5.

FIG. 39 is a schematic construction diagram of a digital still camera according to Embodiment III-5. In FIG. 39, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment III-1. In FIG. 39, the zoom lens system 1 comprises a first lens unit G1, an aperture diaphragm A, a second lens unit G2, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment III-1 is employed in a digital still camera, a small digital still camera is obtained that has a high resolution and high capability of compensating the curvature of field and that has a short overall length of lens system at the time of non-use. Here, in the digital still camera shown in FIG. 39, any one of the zoom lens systems according to Embodiments III-2 to III-4 may be employed in place of the zoom lens system according to Embodiment III-1. Further, the optical system of the digital still camera shown in FIG. 39 is applicable also to a digital video camera for moving images. In this case, moving images with high resolution can be acquired in addition to still images.

Here, the digital still camera according to the present Embodiment III-5 has been described for a case that the employed zoom lens system 1 is a zoom lens system according to Embodiments III-1 to III-4. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments III-1 to III-4.

Further, an imaging device comprising a zoom lens system according to Embodiments III-1 to III-4 described above and an image sensor such as a CCD or a CMOS may be applied to a mobile telephone, a PDA (Personal Digital Assistance), a surveillance camera in a surveillance system, a Web camera, a vehicle-mounted camera or the like.

(Embodiments IV-1 to IV-4)

FIGS. 40, 43, 46 and 49 are lens arrangement diagrams of zoom lens systems according to Embodiments IV-1 to IV-4, respectively.

Each of FIGS. 40, 43, 46 and 49 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M = \sqrt{(f_W * f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power, a second lens unit G2 having positive optical power, a third lens unit G3 having negative optical power; and a fourth lens unit G4 having positive optical power. The second lens element L2 (prism) in the first lens unit G1 corresponds to a lens element having a reflecting surface for bending the light beam incident from the object, that is, bending the axial principal ray incident from the object, for example, by approximately 90°. The position of the reflecting surface is not shown and omitted in the figure. Here, in the zoom lens system according to each embodiment, the lens element having a reflecting surface is composed of a prism. Instead, the lens element having a reflecting surface may be composed of, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the third lens unit G3 respectively move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, when these lens units are arranged in a desired optical power configuration, high optical performance is obtained and still size reduction is achieved in the entire lens system.

Further, in FIGS. 40, 43, 46 and 49, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 40, 43, 46 and 49, an aperture diaphragm A is provided on the most object side of the second lens unit G2, that is, between the first lens unit G1 and the second lens unit G2. Moreover, in zooming from a wide-angle limit to a telephoto limit at the time of image taking, the aperture diaphragm A moves along the optical axis integrally with the second lens unit G2.

Figure 40:
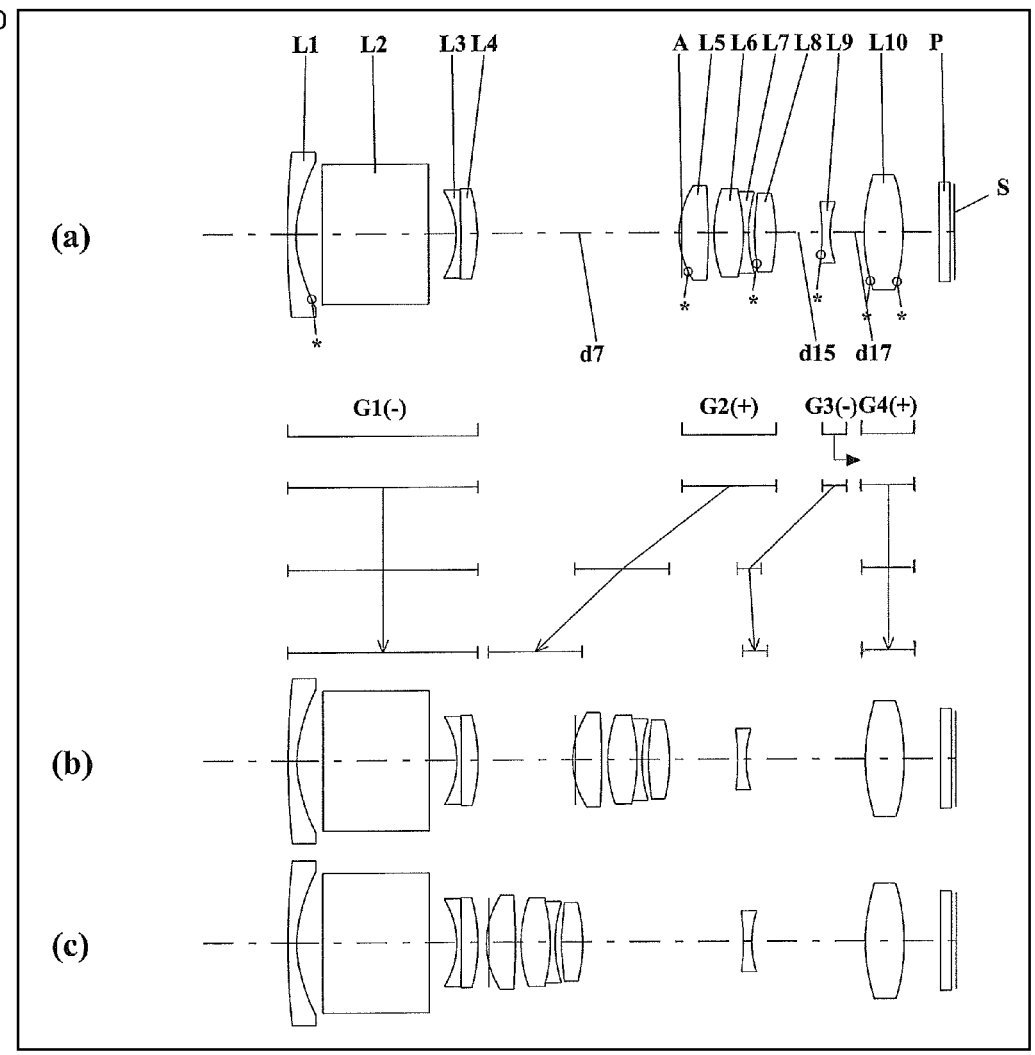
FIG. 40 is a lens arrangement diagram showing an infinity in-focus condition of a zoom lens system according to Embodiment IV-1 (Example IV-1)
Figure 41:
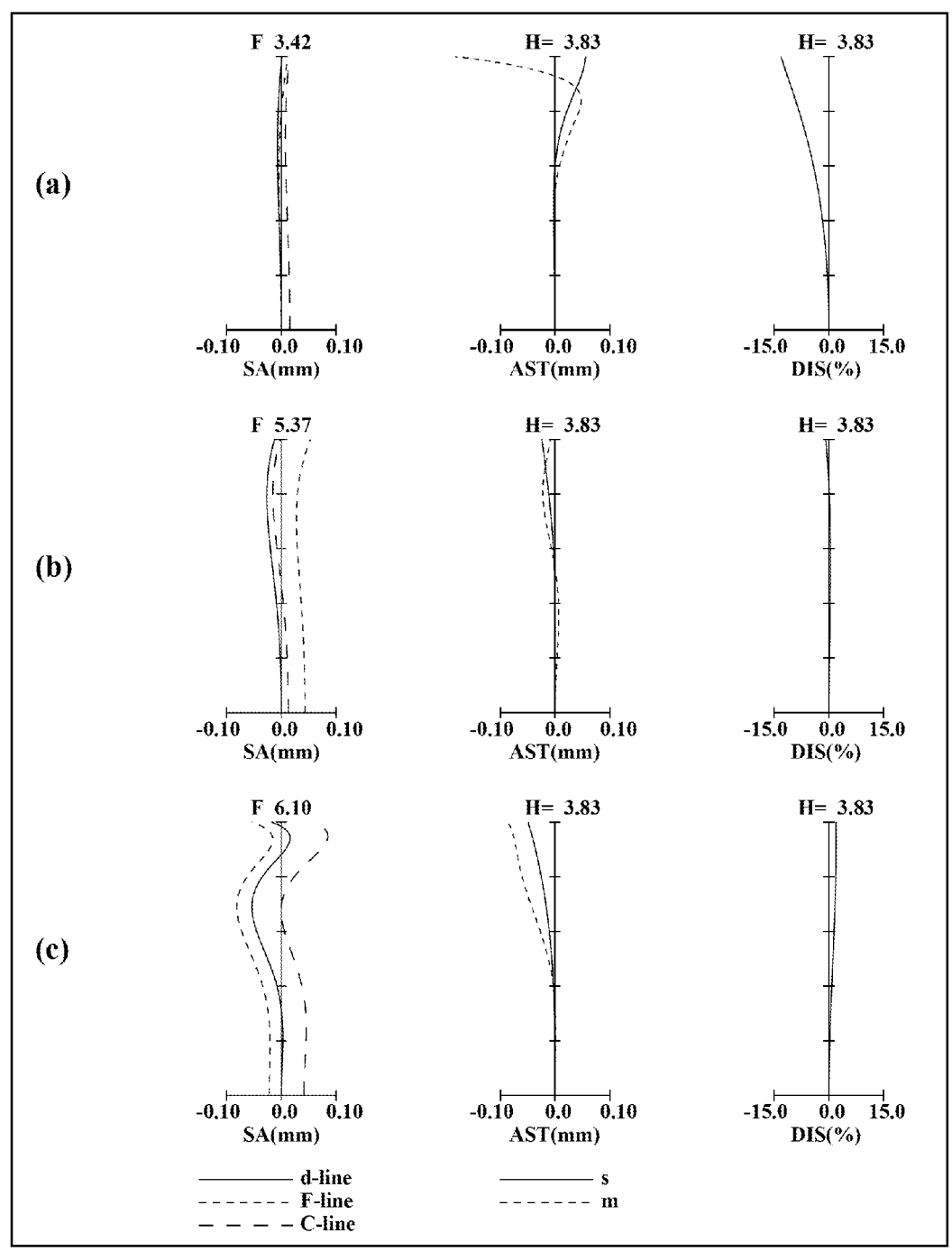
FIG. 41 is a longitudinal aberration diagram of an infinity in-focus condition of a zoom lens system according to Example IV-1.
Figure 42:
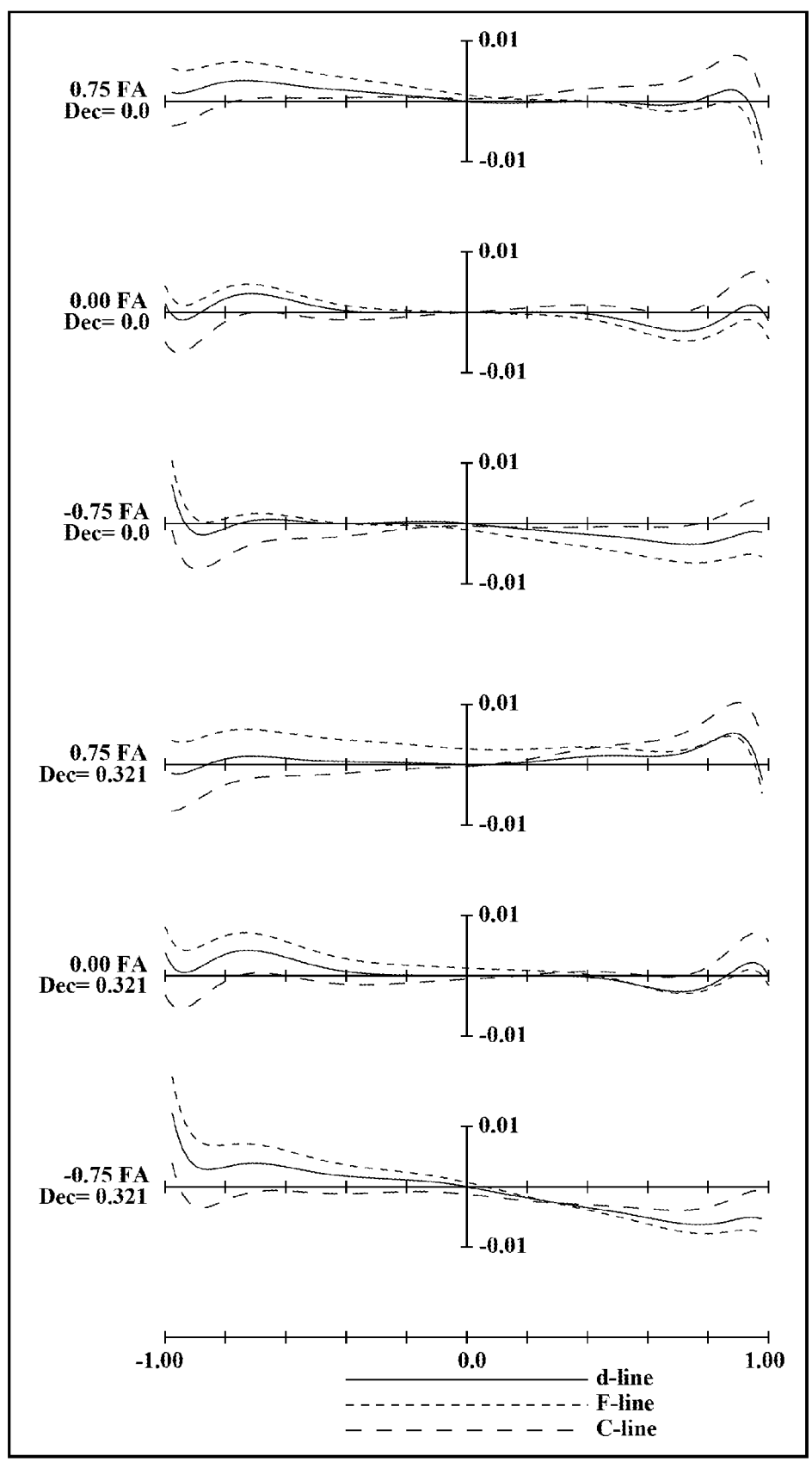
FIG. 42 is a lateral aberration diagram of a zoom lens system according to Example IV-1 at a telephoto limit in a basic state where image blur compensation is not performed and in a blur compensation state.

As shown in FIG. 40, in the zoom lens system according to Embodiment IV-1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment IV-1, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment IV-1, the third lens unit G3 comprises solely a bi-concave ninth lens element L9. Further, the ninth lens element L9 has an aspheric object side surface.

Further, in the zoom lens system according to Embodiment IV-1, the fourth lens unit G4 comprises solely a bi-convex tenth lens element L10. The tenth lens element L10 has two aspheric surfaces.

Here, in the zoom lens system according to Embodiment IV-1, a plane parallel plate P is provided on the object side relative to the image surface S (between the image surface S and the tenth lens element L10).

In the zoom lens system according to Embodiment IV-1, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 43:
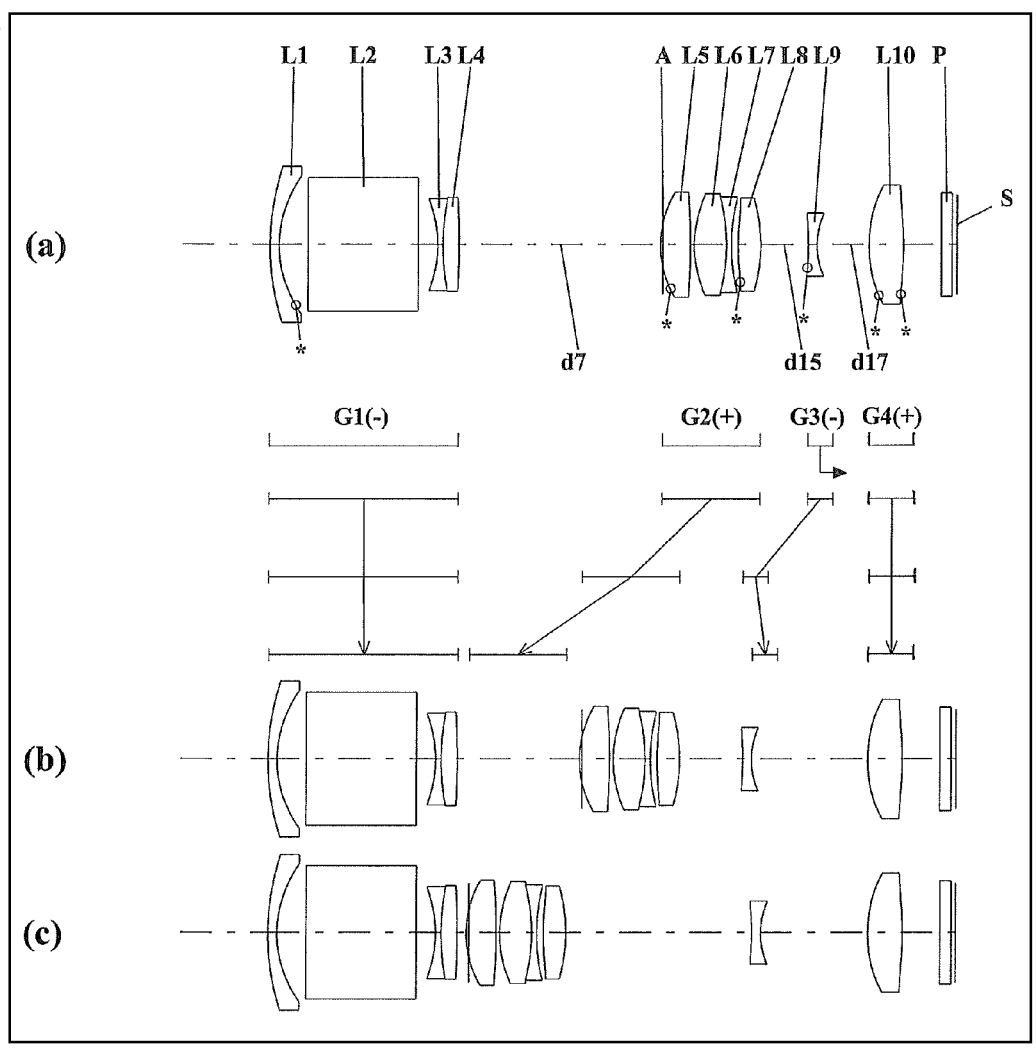
FIG. 43 is a lens arrangement diagram showing an infinity in-focus condition of a zoom lens system according to Embodiment IV-2 (Example IV-2)
Figure 44:
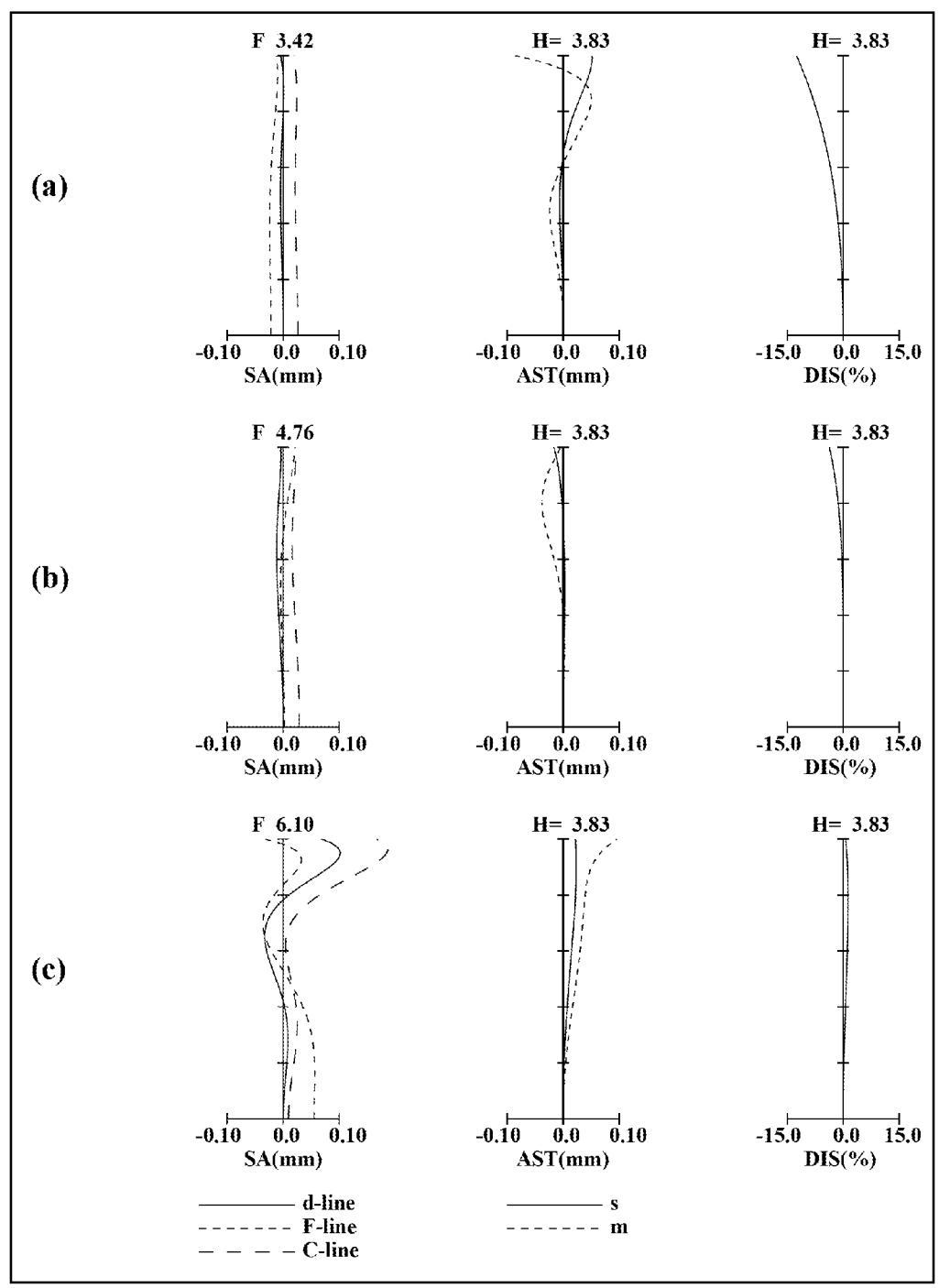
FIG. 44 is a longitudinal aberration diagram of an infinity in-focus condition of a zoom lens system according to Example IV-2.
Figure 45:
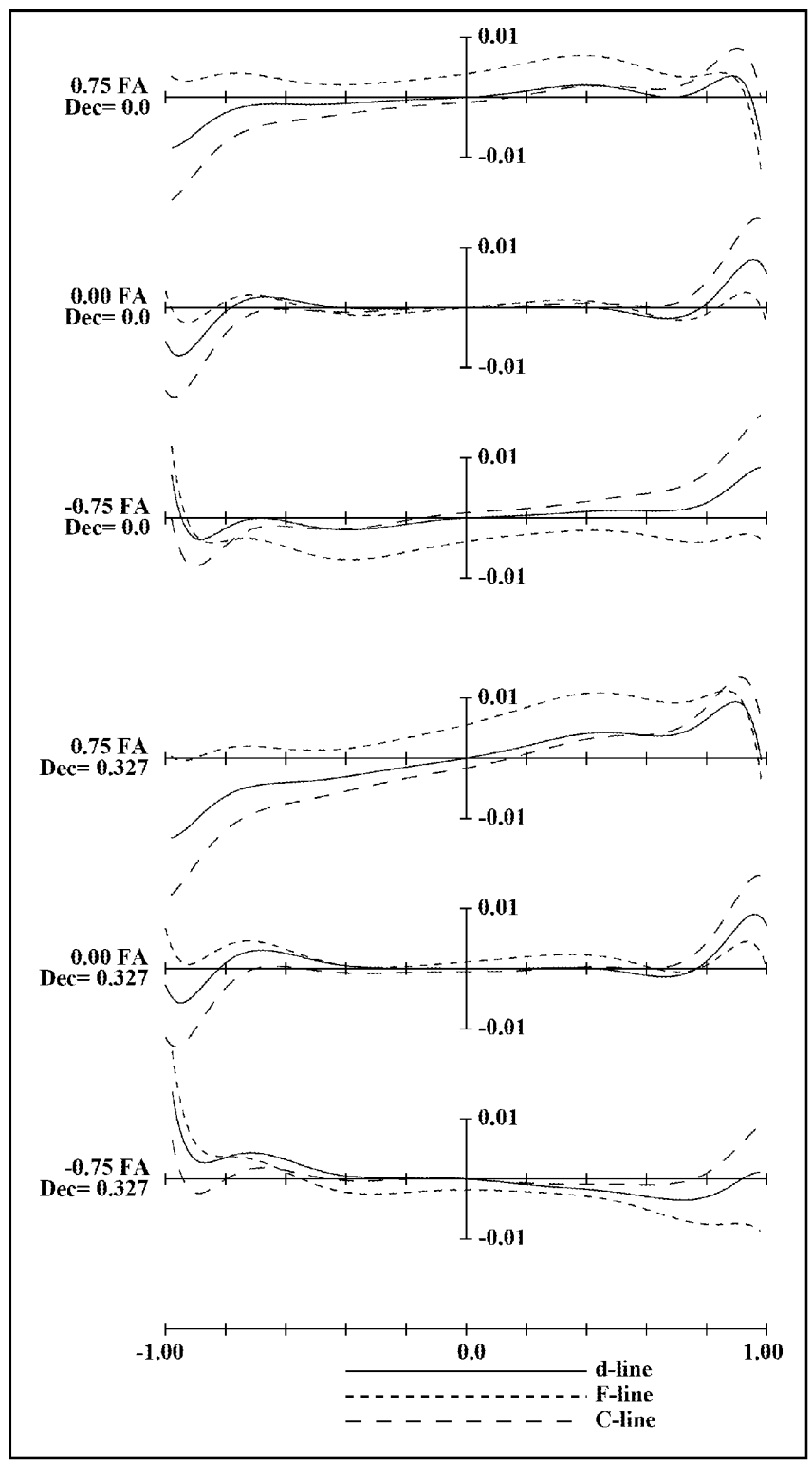
FIG. 45 is a lateral aberration diagram of a zoom lens system according to Example IV-2 at a telephoto limit in a basic state where image blur compensation is not performed and in a blur compensation state.

As shown in FIG. 43, in the zoom lens system according to Embodiment IV-2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has an aspheric image side surface.

Further, in the zoom lens system according to Embodiment IV-2, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment IV-2, the third lens unit G3 comprises solely a bi-concave ninth lens element L9. Further, the ninth lens element L9 has an aspheric object side surface.

Further, in the zoom lens system according to Embodiment IV-2, the fourth lens unit G4 comprises solely a bi-convex tenth lens element L10. The tenth lens element L10 has two aspheric surfaces.

Here, in the zoom lens system according to Embodiment IV-2, a plane parallel plate P is provided on the object side relative to the image surface S (between the image surface S and the tenth lens element L10).

In the zoom lens system according to Embodiment IV-2, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 46:
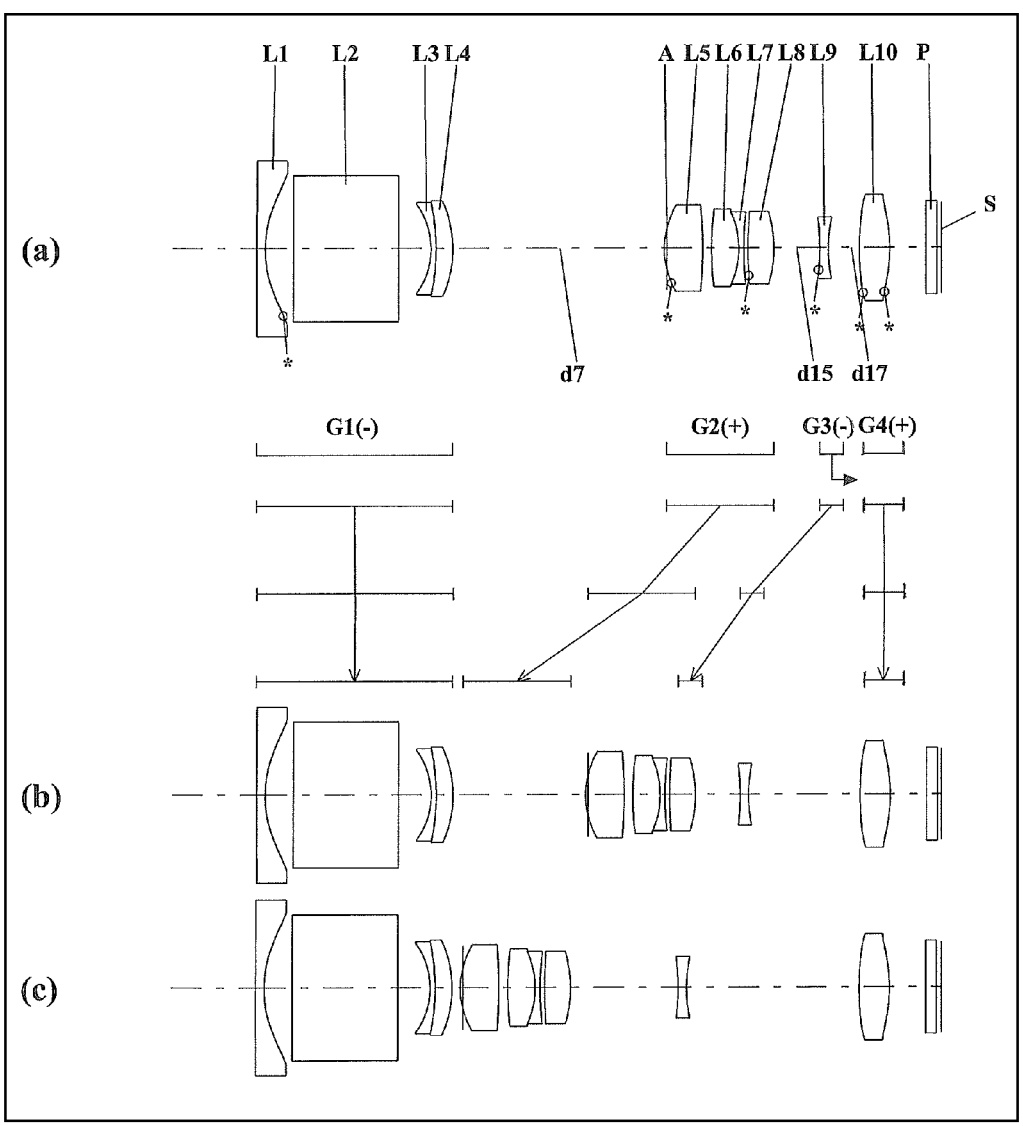
FIG. 46 is a lens arrangement diagram showing an infinity in-focus condition of a zoom lens system according to Embodiment IV-3 (Example IV-3)
Figure 47:
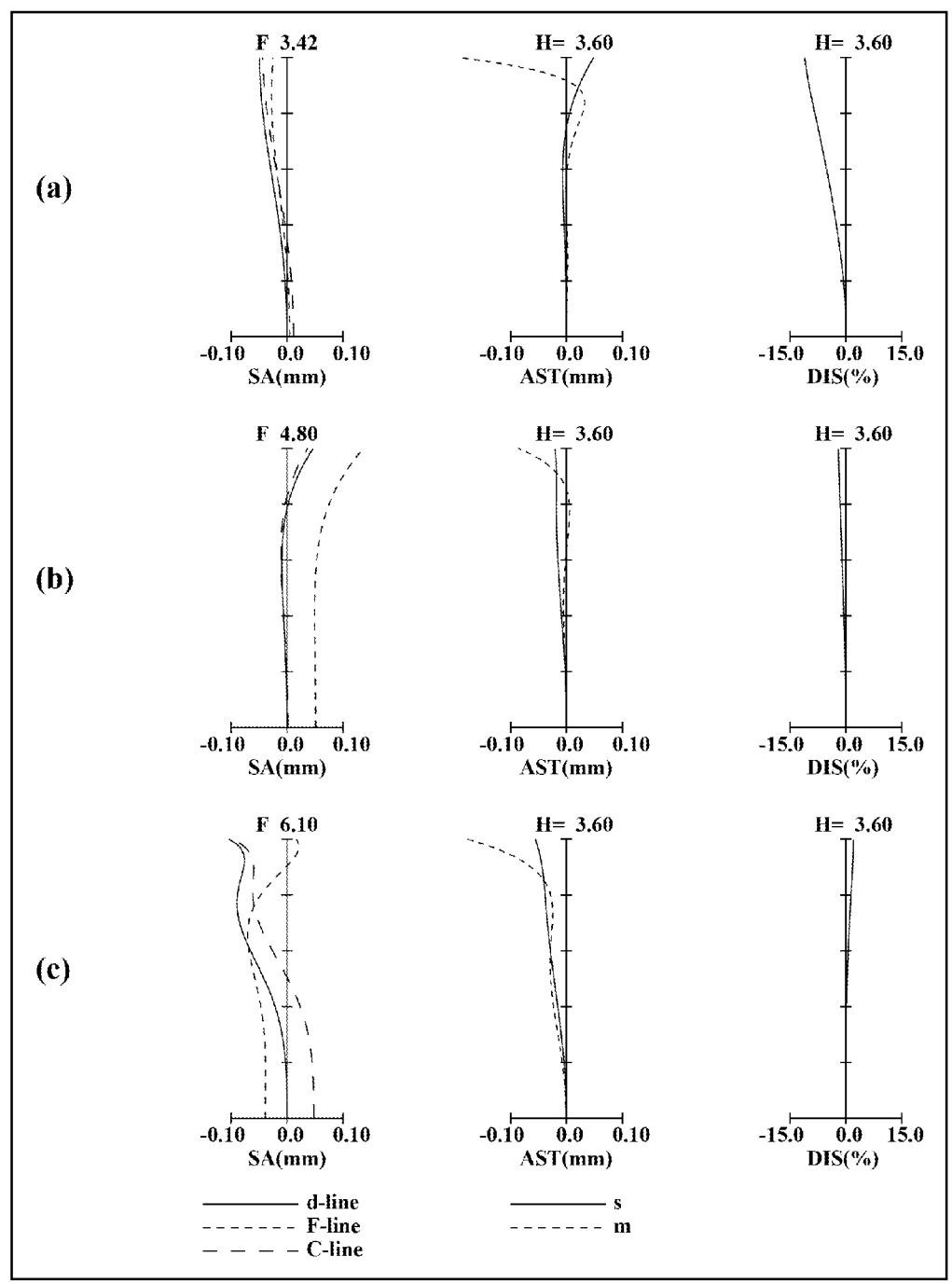
FIG. 47 is a longitudinal aberration diagram of an infinity in-focus condition of a zoom lens system according to Example W-3.
Figure 48:
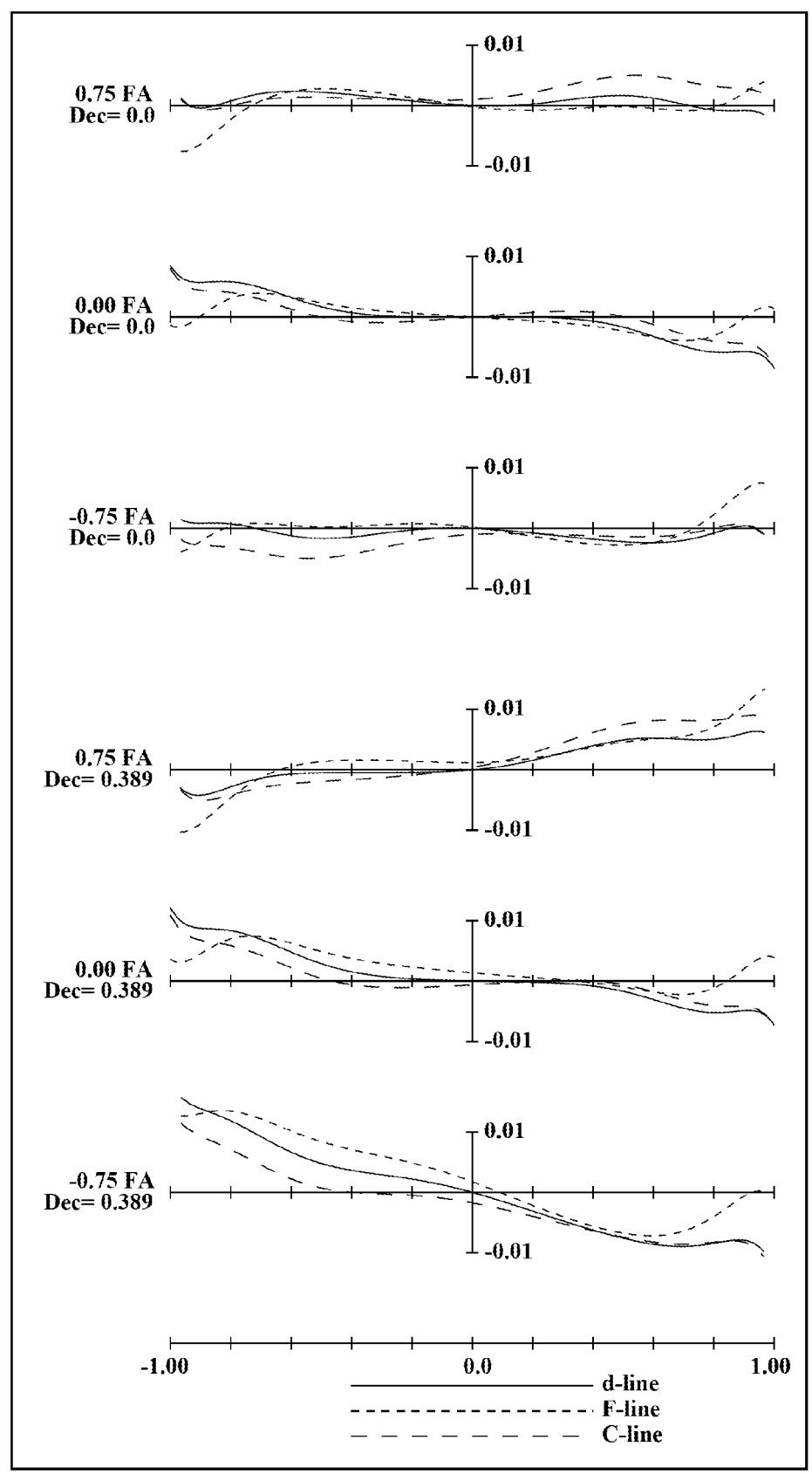
FIG. 48 is a lateral aberration diagram of a zoom lens system according to Example IV-3 at a telephoto limit in a basic state where image blur compensation is not performed and in a blur compensation state.

As shown in FIG. 46, in the zoom lens system according to Embodiment IV-3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a negative meniscus third lens element L3 with the convex surface facing the image side; and a positive meniscus fourth lens element L4 with the convex surface facing the image side. Among these, the third lens element L3 and the fourth lens element L4 are cemented with each other. Further, the first lens element L1 has an aspheric image side surface.

Further, in the zoom lens system according to Embodiment IV-3, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment IV-3, the third lens unit G3 comprises solely a bi-concave ninth lens element L9. Further, the ninth lens element L9 has an aspheric object side surface.

Further, in the zoom lens system according to Embodiment IV-3, the fourth lens unit G4 comprises solely a bi-convex tenth lens element L10. The tenth lens element L10 has two aspheric surfaces.

Here, in the zoom lens system according to Embodiment IV-3, a plane parallel plate P is provided on the object side relative to the image surface S (between the image surface S and the tenth lens element L10).

In the zoom lens system according to Embodiment IV-3, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 49:
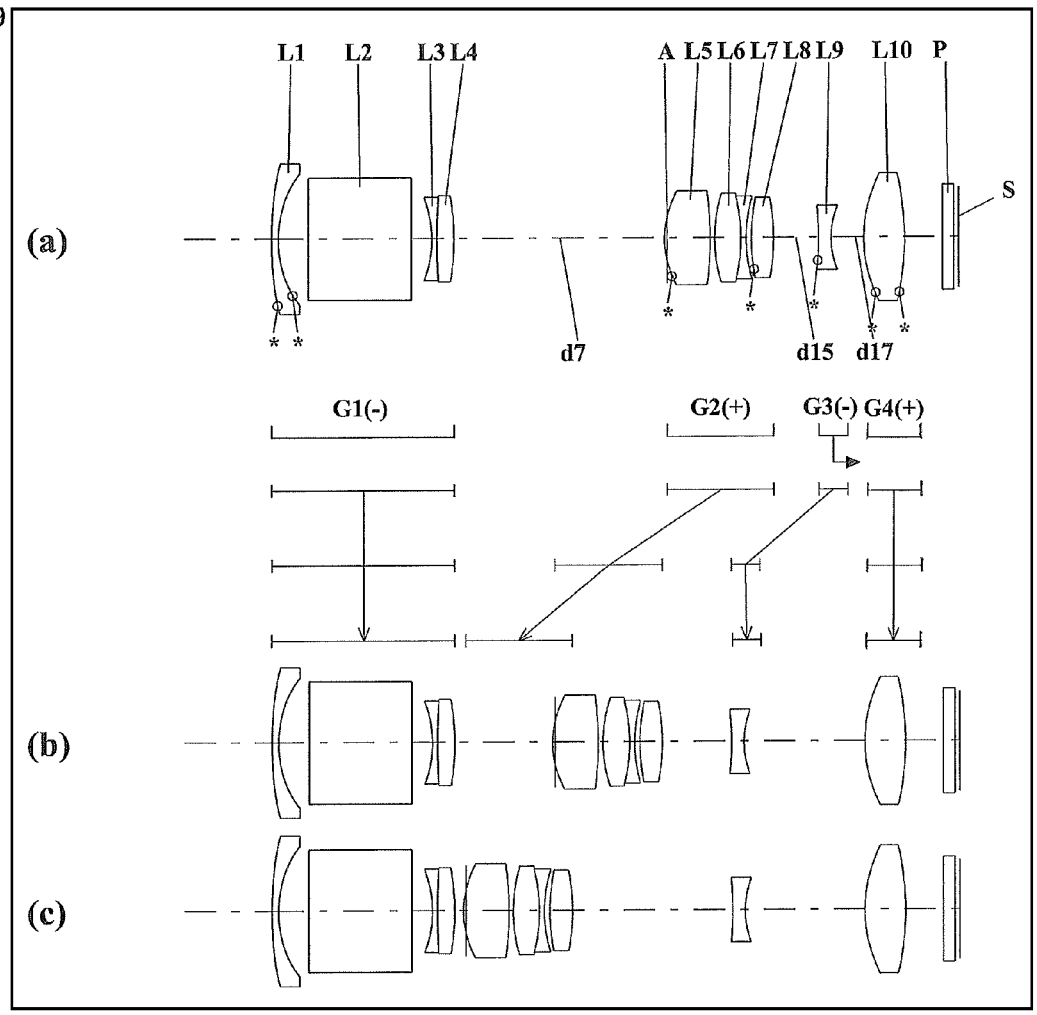
FIG. 49 is a lens arrangement diagram showing an infinity in-focus condition of a zoom lens system according to Embodiment IV-4 (Example IV-4)
Figure 50:
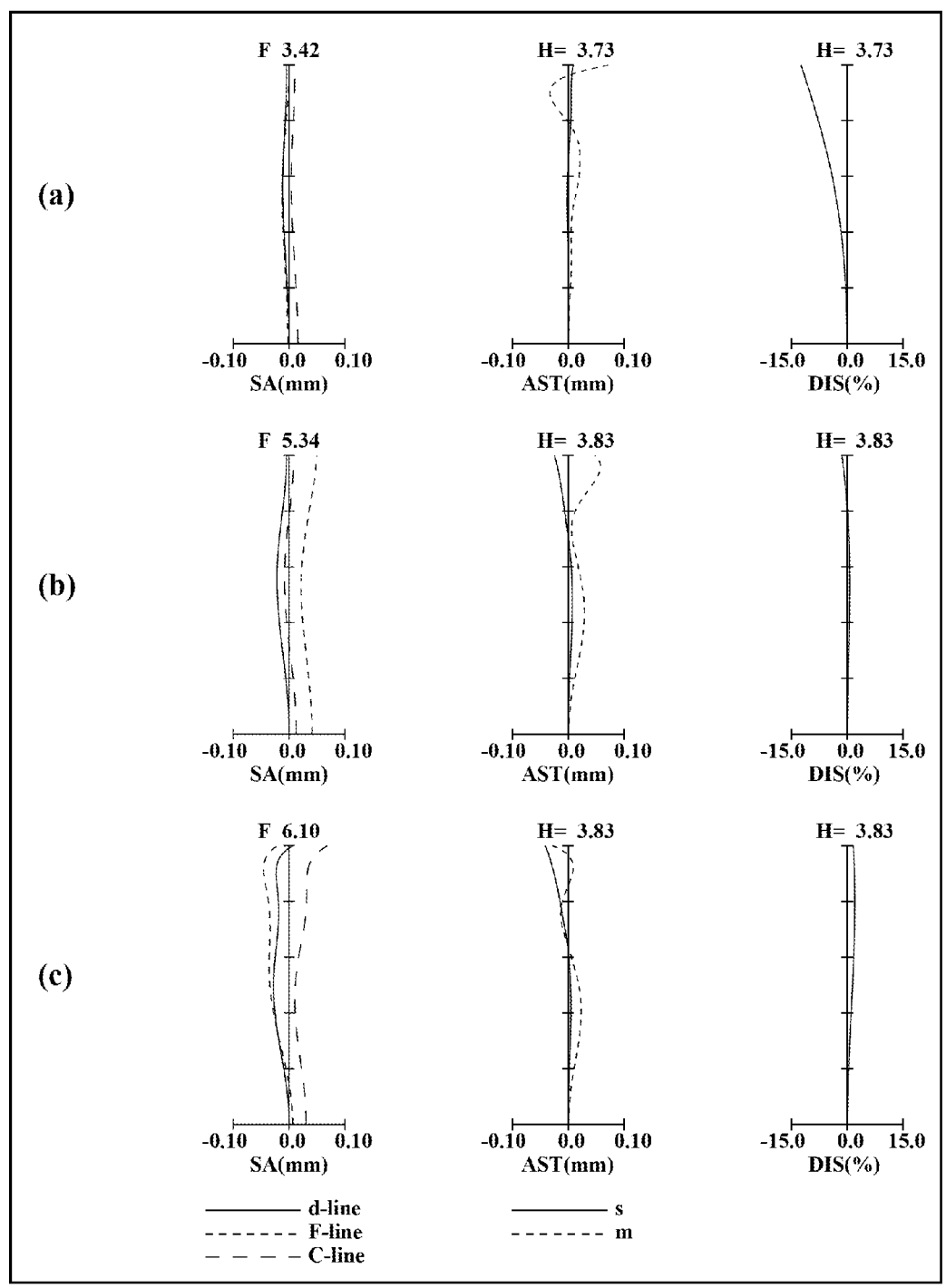
FIG. 50 is a longitudinal aberration diagram of an infinity in-focus condition of a zoom lens system according to Example IV-4.
Figure 51:
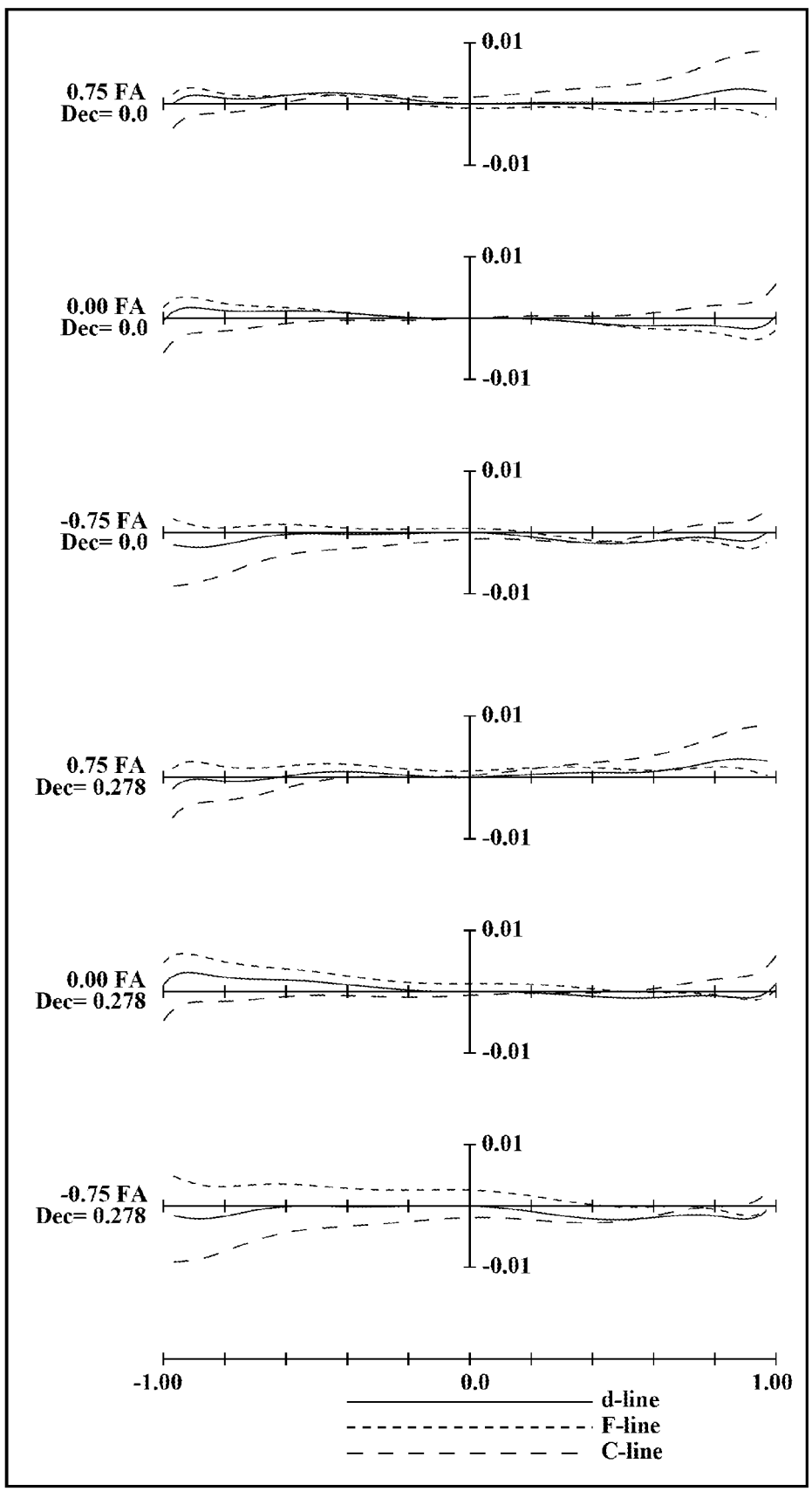
FIG. 51 is a lateral aberration diagram of a zoom lens system according to Example IV-4 at a telephoto limit in a basic state where image blur compensation is not performed and in a blur compensation state.

As shown in FIG. 49, in the zoom lens system according to Embodiment IV-4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment IV-4, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment IV-4, the third lens unit G3 comprises solely a bi-concave ninth lens element L9. Further, the ninth lens element L9 has an aspheric object side surface.

Further, in the zoom lens system according to Embodiment IV-4, the fourth lens unit G4 comprises solely a bi-convex tenth lens element L10. The tenth lens element L10 has two aspheric surfaces.

Here, in the zoom lens system according to Embodiment IV-4, a plane parallel plate P is provided on the object side relative to the image surface S (between the image surface S and the tenth lens element L10).

In the zoom lens system according to Embodiment IV-4, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

In the zoom lens system according to Embodiments IV-1 to IV-4, the zoom lens system, in order from the object side to the image side, comprises a first lens unit G1 having negative optical power, a second lens unit G2 having positive optical power, and at least one subsequent lens unit having optical power. Then, in zooming from a wide-angle limit to a telephoto limit at the time of image taking, at least the second lens unit G2 moves along the optical axis so that variable magnification is achieved. Further, the ratio of the diameter of the aperture diaphragm A is adjusted within a predetermined range. Thus, despite that the zoom lens system according to Embodiments IV-1 to IV-4 has a bending configuration in the first lens unit G1, a compact lens system is realized in which a zooming ratio of 3 to 5 is achieved while various kinds of aberration is compensated satisfactory.

In the zoom lens system according to Embodiments IV-1 to IV-4, the first lens unit G1 includes the second lens element L2 (prism) having a reflecting surface capable of bending the light beam incident from the object, that is, bending the axial principal ray incident from the object, for example, by approximately 90°. Thus, the zoom lens system is constructed such that the thickness in the direction of the optical axis of the axial light beam incident from the object is satisfactorily small in an image taking state.

In the zoom lens system according to Embodiments IV-1 to IV-4, the aperture diaphragm A is located between the first lens unit G1 and the second lens unit G2. Thus, the lens diameters of the first lens unit G1 and the second lens unit G2 are allowed to be reduced.

In the zoom lens system according to Embodiments IV-1 to IV-4, in zooming from a wide-angle limit to a telephoto limit at the time of image taking, the first lens unit G1 does not move along the optical axis. Thus, as the lens barrel for holding this zoom lens system, a lens barrel without a shape change associated with zooming can be employed. This permits fabrication of a camera having a high degree of freedom in the shape as well as an excellent shock resistance.

In the zoom lens system according to Embodiments IV-1 to IV-4, the third lens unit G3 having negative optical power is included as a subsequent lens unit. Then, in zooming from a wide-angle limit to a telephoto limit at the time of image taking, the third lens unit G3 having negative optical power moves along the optical axis. Thus, the third lens unit G3 also contributes to magnification change. Thus, the overall length of lens system is reduced.

Here, the zoom lens system according to Embodiments IV-1 to IV-4 has a four-unit construction consisting of the first lens unit G1, the second lens unit G2, the third lens unit G3 and the fourth lens unit G4. However, in the zoom lens system of the present invention, as long as the lens system comprises a first lens unit having negative optical power, a second lens unit having positive optical power, and at least one subsequent lens unit having optical power, the number of lens units is not limited to a particular value. That is, the zoom lens system may have a three-unit construction, a four-unit construction, or even another construction.

Further, as described above, it is preferable that a third lens unit having negative optical power is included as a subsequent lens unit. However, the optical power of each subsequent lens unit is not limited to a particular sign.

In the zoom lens system according to Embodiments IV-1 to IV-4, in zooming from a wide-angle limit to a telephoto limit at the time of image taking, the second lens unit G2 and the third lens unit G3 among the first lens unit G1, the second lens unit G2, the third lens unit G3 and the fourth lens unit G4 are moved individually along the optical axis so that zooming is achieved. Then, any lens unit among the first lens unit G1, the second lens unit G2, the third lens unit G3 and the fourth lens unit G4, or alternatively a sub lens unit consisting of a part of a lens unit is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, for example, the fourth lens unit G4 is moved in a direction perpendicular to the optical axis, so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements.

Conditions preferably to be satisfied by a zoom lens system like the zoom lens system according to Embodiments IV-1 to IV-4 are described below. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

In a zoom lens system like the zoom lens system according to Embodiments IV-1 to IV-4, in order from the object side to the image side, comprising a first lens unit having negative optical power, a second lens unit having positive optical power, and at least one subsequent lens unit having optical power, wherein in zooming from a wide-angle limit to a telephoto limit at the time of image taking, at least the second lens unit among the first lens unit, the second lens unit and the subsequent lens unit is moved along the optical axis so that variable magnification is achieved, and wherein the first lens unit includes a lens element having a reflecting surface for bending the light beam incident from the object (this lens configuration is referred to as basic configuration IV of the embodiment, hereinafter), the following condition (IV-1) is satisfied.

$$0.08 < (D_T - D_W)/f_W < 0.18 \qquad (IV\text{-}1)$$

(here, $f_T/f_W \geq 3.0$)

where, $D_T$ is a diameter of the aperture diaphragm at a telephoto limit, $D_W$ is a diameter of the aperture diaphragm at a wide-angle limit, $f_T$ is a focal length of the entire system at a telephoto limit, and $f_W$ is a focal length of the entire system at a wide-angle limit.

The condition (IV-1) relates to a change in the magnitude of the aperture diaphragm. When the value goes below the lower limit of the condition (IV-1), the F-number at a telephoto limit becomes high and the lens system becomes dark, and hence the high-frequency MTF value is reduced owing to diffraction. In contrast, when the value exceeds the upper limit of the condition (IV-1), spherical aberration at a telephoto limit is degraded.

Here, when at least one of the following conditions (IV-1)' and (IV-1)" is satisfied, the above-mentioned effect is achieved more successfully.

$$0.10 < (D_T - D_W)/f_W \quad \text{(IV-1)'}$$

$$(D_T - D_W)/f_W \geq 0.15 \quad \text{(IV-1)"}$$

(here, $f_T/f_W \geq 3.0$)

Further, it is more preferable that the conditions (IV-1), (IV-1)' and (IV-1)" are satisfied under the following condition.

$$f_T/f_W \geq 4.0$$

In a zoom lens system having basic configuration IV like the zoom lens system according to Embodiments IV-1 to IV-4, it is preferable that the following condition (IV-2) is satisfied.

$$0.20 < |f_{G1}|/f_T < 0.52 \quad \text{(IV-2)}$$

(here, $f_T/f_W \geq 3.0$)
where,
$f_{G1}$ is a composite focal length of the first lens unit,
$f_T$ is a focal length of the entire system at a telephoto limit, and
$f_W$ is a focal length of the entire system at a wide-angle limit.

The condition (IV-2) relates to the focal length of the first lens unit and the focal length of the entire system at a telephoto limit. When the value goes below the lower limit of the condition (IV-2), the focal length of the first lens unit becomes short, and hence a possibility arises that image planarity at a wide-angle limit is degraded. In contrast, when the value exceeds the upper limit of the condition (IV-2), the amount of movement of the second lens unit at the time of magnification change increases, and hence a possibility arises that size reduction in the lens system becomes difficult.

Here, when at least one of the following conditions (IV-2)' and (IV-2)" is satisfied, the above-mentioned effect is achieved more successfully.

$$0.27 < |f_{G1}|/f_T \quad \text{(IV-2)'}$$

$$|f_{G1}|/f_T < 0.50 \quad \text{(IV-2)"}$$

(here, $f_T/f_W \geq 3.0$)

Further, it is more preferable that the conditions (IV-2), (IV-2)' and (IV-2)" are satisfied under the following condition.

$$f_T/f_W \geq 4.0$$

In a zoom lens system like the zoom lens system according to Embodiments IV-1 to IV-4 having the basic configuration IV, wherein in zooming from a wide-angle limit to a telephoto limit at the time of image taking, the second lens unit moves monotonically such that the position at a telephoto limit should be located on the object side relative to the position at a wide-angle limit, it is preferable that the following condition (IV-3) is satisfied.

$$2.00 < T_{G2}/f_W < 5.00 \quad \text{(IV-3)}$$

(here, $f_T/f_W \geq 3.0$)

where,
$T_G$, is an amount of axial movement of the second lens unit in zooming from a wide-angle limit to a telephoto limit at the time of image taking,
$f_T$ is a focal length of the entire system at a telephoto limit, and
$f_W$ is a focal length of the entire system at a wide-angle limit.

The condition (IV-3) relates to the amount of axial movement of the second lens unit and the focal length of the entire system at a wide-angle limit. When the value goes below the lower limit of the condition (IV-3), the focal length of the second lens unit becomes short, and hence a possibility arises that spherical aberration at a telephoto limit is degraded. In contrast, when the value exceeds the upper limit of the condition (IV-3), the amount of movement of the second lens unit increases excessively, and hence a possibility arises that size reduction in the lens system becomes difficult.

Here, when at least one of the following conditions (IV-3)' and (IV-3)" is satisfied, the above-mentioned effect is achieved more successfully.

$$2.45 < T_{G2}/f_W \quad \text{(IV-3)'}$$

$$T_{G2}/f_W < 4.20 \quad \text{(IV-3)"}$$

(here, $f_T/f_W \geq 3.0$)

Further, it is more preferable that the conditions (IV-3), (IV-3)' and (IV-3)" are satisfied under the following condition.

$$f_T/f_W \geq 4.0$$

The lens units constituting the zoom lens system according to Embodiments IV-1 to IV-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment IV-5)

Figure 52:
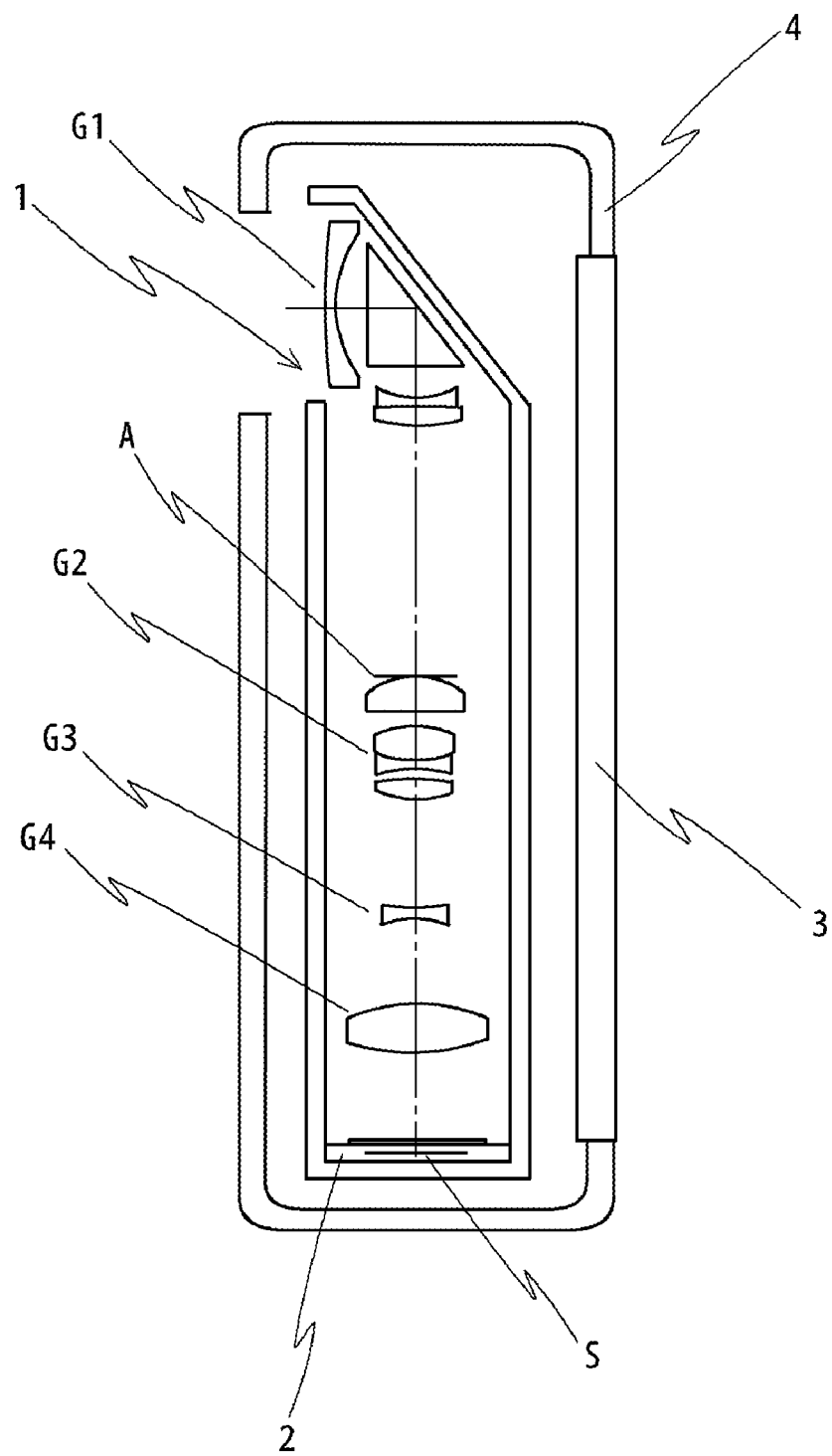
FIG. 52 is a schematic construction diagram of a digital still camera according to Embodiment IV-5.

FIG. 52 is a schematic construction diagram of a digital still camera according to Embodiment IV-5. In FIG. 52, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment IV-1. In FIG. 52, the zoom lens system 1 comprises a first lens unit G1, an aperture diaphragm A, a second lens unit G2, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment IV-1 is employed in a digital still camera, a small digital still camera is obtained that has a high resolution and high capability of compensating the curvature of field and that has a short overall length of lens system at the time of non-use. Here, in the digital still camera shown in FIG. 52, any one of the zoom lens systems according to Embodiments IV-2 to IV-4 may be employed in place of the zoom lens system according to Embodiment IV-1. Further, the optical system of the digital still camera shown in FIG. 52 is applicable also to a digital video camera for moving images. In this case, moving images with high resolution can be acquired in addition to still images.

Here, the digital still camera according to the present Embodiment IV-5 has been described for a case that the employed zoom lens system 1 is a zoom lens system according to Embodiments IV-1 to IV-4. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments IV-1 to IV-4.

Further, an imaging device comprising a zoom lens system according to Embodiments IV-1 to IV-4 described above and an image sensor such as a CCD or a CMOS may be applied to a mobile telephone, a PDA (Personal Digital Assistance), a surveillance camera in a surveillance system, a Web camera, a vehicle-mounted camera or the like.

(Embodiments V-1 to V-4)

FIGS. 53, 56, 59 and 62 are lens arrangement diagrams of zoom lens systems according to Embodiments V-1 to V-4, respectively.

Each of FIGS. 53, 56, 59 and 62 shows a zoom lens system in an infinity in-focus condition. In each Fig., part (a) shows a lens configuration at a wide-angle limit (in the minimum focal length condition: focal length $f_W$), part (b) shows a lens configuration at a middle position (in an intermediate focal length condition: focal length $f_M=\sqrt{(f_W*f_T)}$), and part (c) shows a lens configuration at a telephoto limit (in the maximum focal length condition: focal length $f_T$). Further, in each Fig., each bent arrow located between part (a) and part (b) indicates a line obtained by connecting the positions of each lens unit respectively at a wide-angle limit, a middle position and a telephoto limit. Thus, in the part between the wide-angle limit and the middle position and the part between the middle position and the telephoto limit, the positions are connected simply with a straight line, and hence this line does not indicate actual motion of each lens unit. Moreover, in each Fig., an arrow imparted to a lens unit indicates focusing from an infinity in-focus condition to a close-object in-focus condition. That is, the arrow indicates the moving direction at the time of focusing from an infinity in-focus condition to a close-object in-focus condition.

The zoom lens system according to each embodiment, in order from the object side to the image side, comprises: a first lens unit G1 having negative optical power, a second lens unit G2 having positive optical power, a third lens unit G3 having negative optical power; and a fourth lens unit G4 having positive optical power. The second lens element L2 (prism) in the first lens unit G1 corresponds to a lens element having a reflecting surface for bending the light beam incident from the object, that is, bending the axial principal ray incident from the object, for example, by approximately 90°. The position of the reflecting surface is not shown and omitted in the figure. Here, in the zoom lens system according to each embodiment, the lens element having a reflecting surface is composed of a prism. Instead, the lens element having a reflecting surface may be composed of, for example, a mirror element. Further, the prism employed in the zoom lens system according to each embodiment has a planar incident surface and a planar exiting surface as described later. Instead, depending on the lens configuration, at least one of the incident surface and the exiting surface may be convex or concave.

In zooming, the second lens unit G2 and the third lens unit G3 respectively move in a direction along the optical axis such that intervals between the lens units, that is, the interval between the first lens unit G1 and the second lens unit G2, the interval between the second lens unit G2 and the third lens unit G3, and the interval between the third lens unit G3 and the fourth lens unit G4 should all vary. In the zoom lens system according to each embodiment, when these lens units are arranged in a desired optical power configuration, high optical performance is obtained and still size reduction is achieved in the entire lens system.

Further, in FIGS. 53, 56, 59 and 62, an asterisk "*" imparted to a particular surface indicates that the surface is aspheric. In each Fig., symbol (+) or (−) imparted to the symbol of each lens unit corresponds to the sign of the optical power of the lens unit. In each Fig., the straight line located on the most right-hand side indicates the position of the image surface S. On the object side relative to the image surface S (that is, between the image surface S and the most image side lens surface of the fourth lens unit G4), a plane parallel plate P such as an optical low-pass filter and a face plate of an image sensor is provided.

Further, in FIGS. 53, 56, 59 and 62, an aperture diaphragm A is provided on the most object side of the second lens unit G2, that is, between the first lens unit G1 and the second lens unit G2. Moreover, in zooming from a wide-angle limit to a telephoto limit at the time of image taking, the aperture diaphragm A moves along the optical axis integrally with the second lens unit G2.

Figure 53:
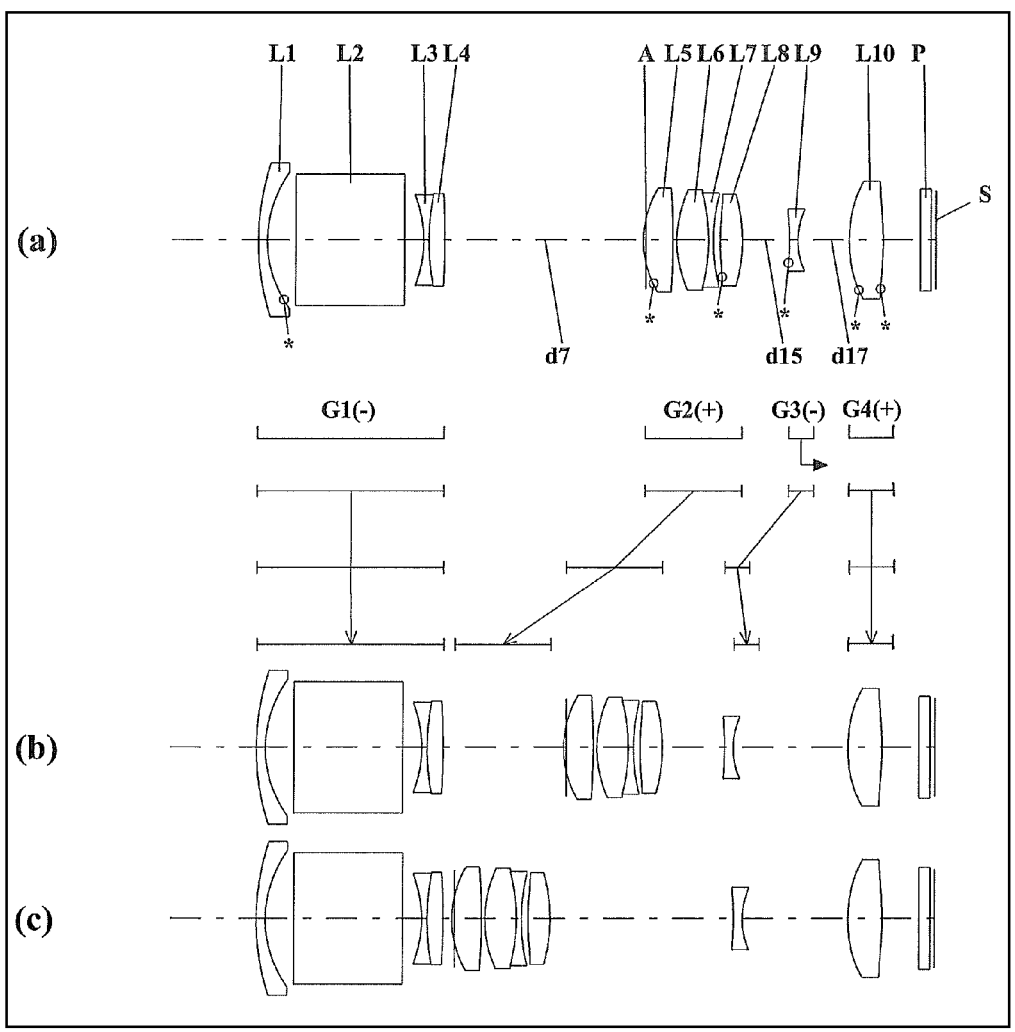
FIG. 53 is a lens arrangement diagram showing an infinity in-focus condition of a zoom lens system according to Embodiment V-1 (Example V-1)
Figure 54:
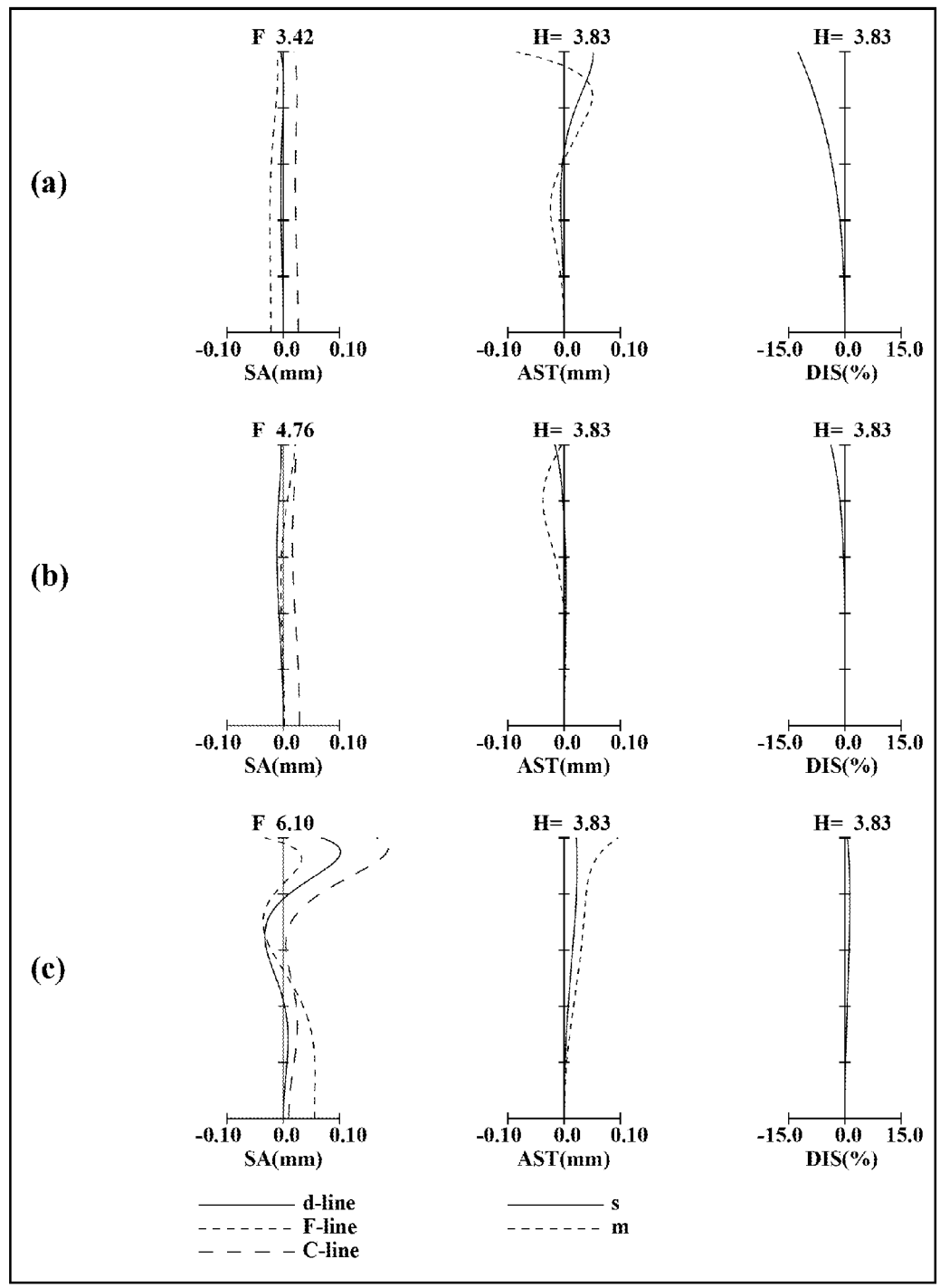
FIG. 54 is a longitudinal aberration diagram of an infinity in-focus condition of a zoom lens system according to Example V-1.
Figure 55:
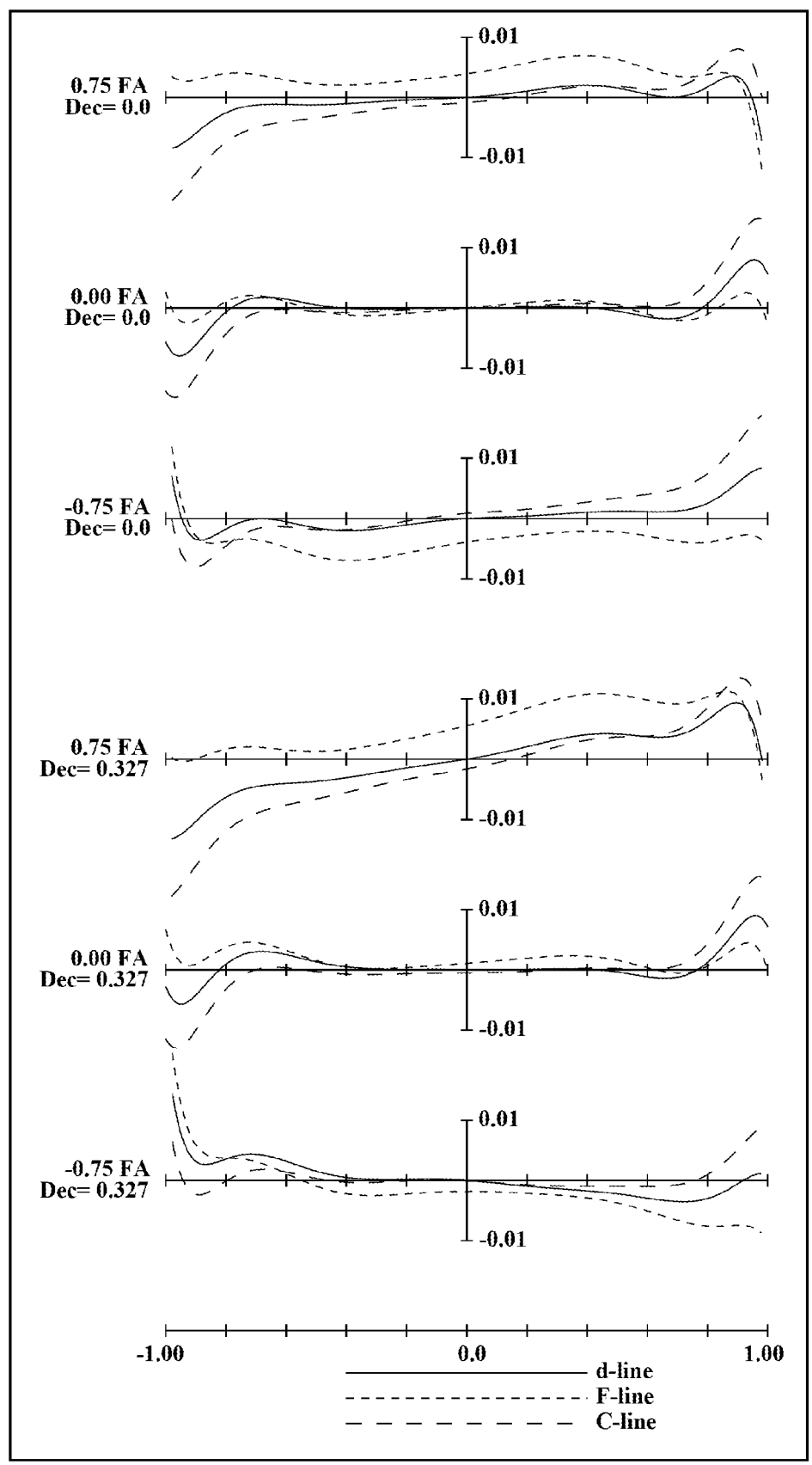
FIG. 55 is a lateral aberration diagram of a zoom lens system according to Example V-1 at a telephoto limit in a basic state where image blur compensation is not performed and in a blur compensation state.

As shown in FIG. 53, in the zoom lens system according to Embodiment V-1, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has an aspheric image side surface.

Further, in the zoom lens system according to Embodiment V-1, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment V-1, the third lens unit G3 comprises solely a bi-concave ninth lens element L9. Further, the ninth lens element L9 has an aspheric object side surface.

Further, in the zoom lens system according to Embodiment V-1, the fourth lens unit G4 comprises solely a bi-convex tenth lens element L10. The tenth lens element L10 has two aspheric surfaces.

Here, in the zoom lens system according to Embodiment V-1, a plane parallel plate P is provided on the object side relative to the image surface S (between the image surface S and the tenth lens element L10).

In the zoom lens system according to Embodiment V-1, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 56:
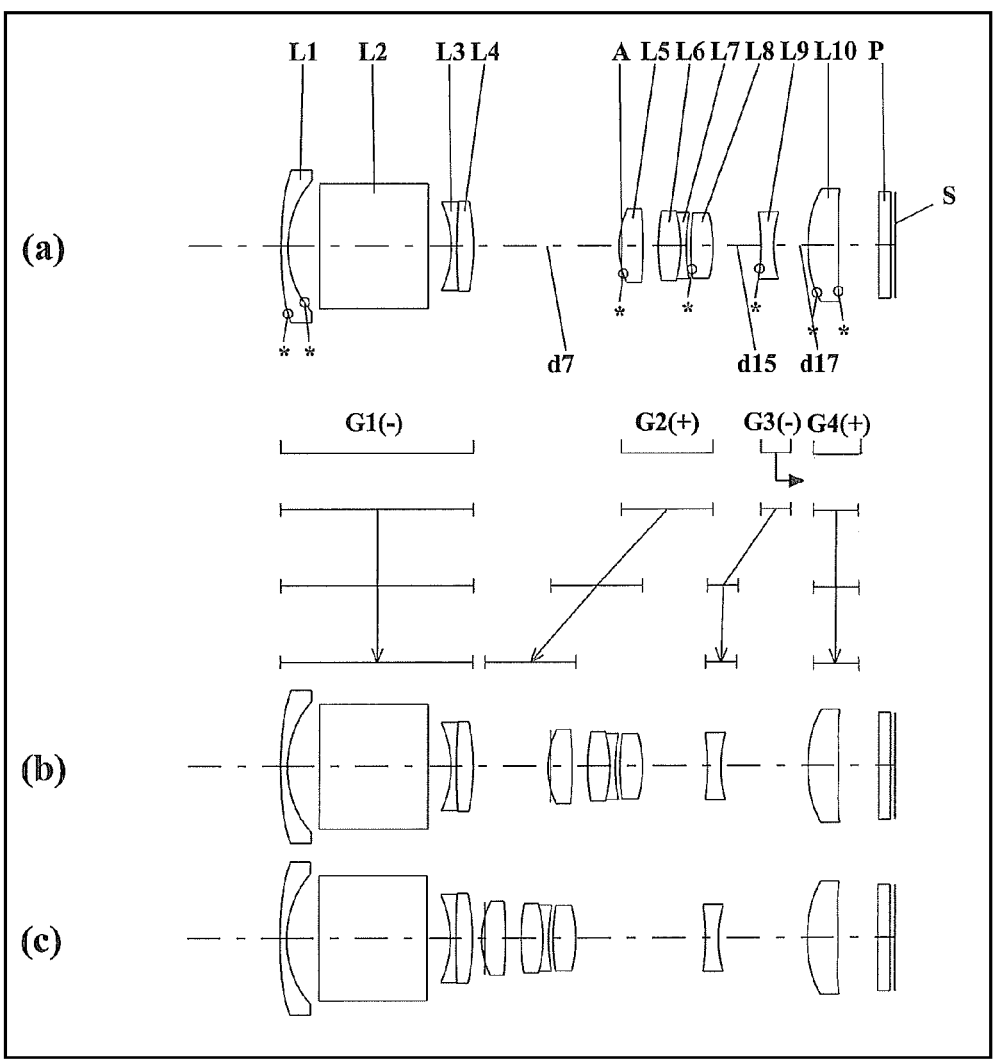
FIG. 56 is a lens arrangement diagram showing an infinity in-focus condition of a zoom lens system according to Embodiment V-2 (Example V-2)
Figure 57:
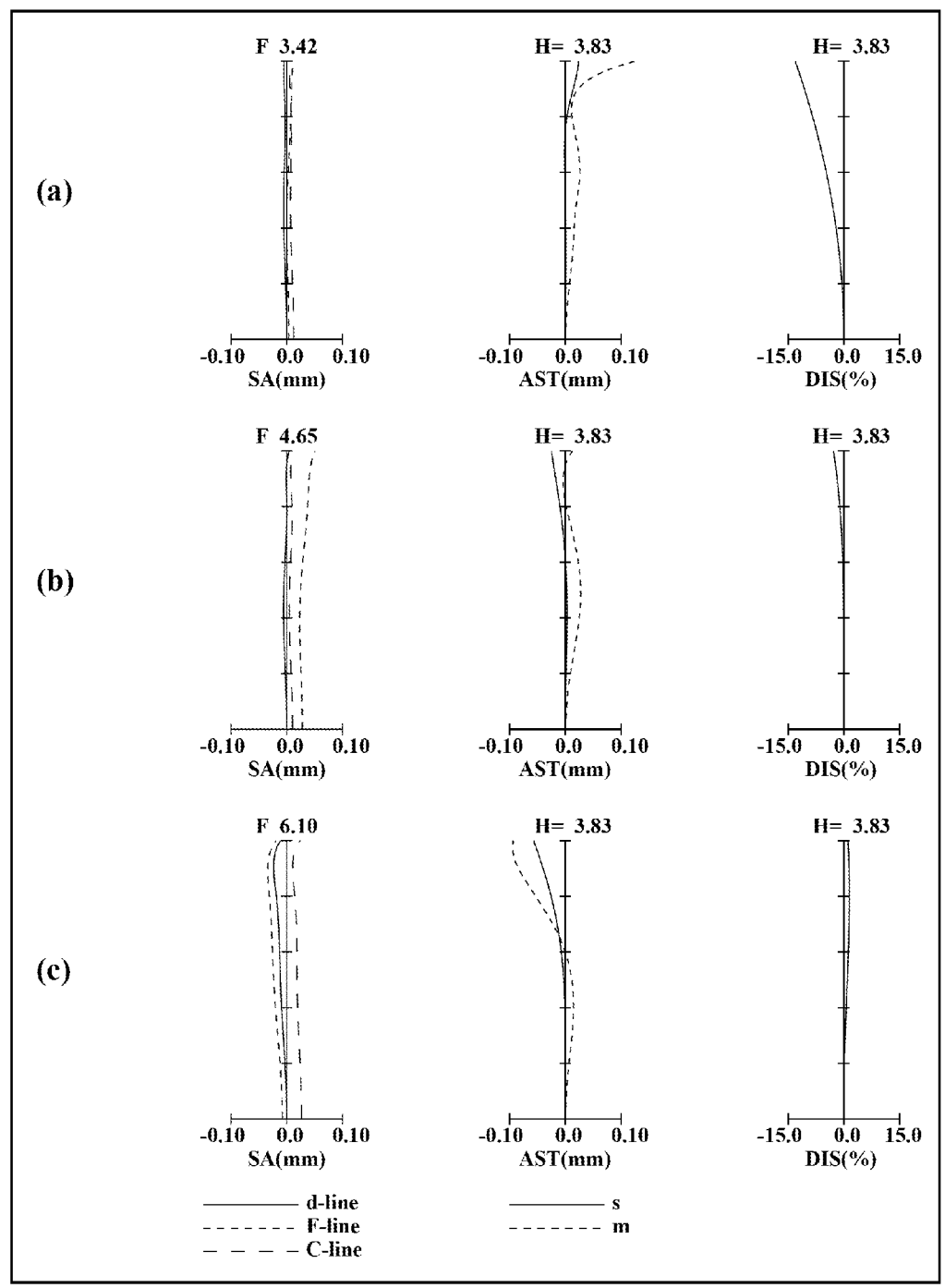
FIG. 57 is a longitudinal aberration diagram of an infinity in-focus condition of a zoom lens system according to Example V-2.
Figure 58:
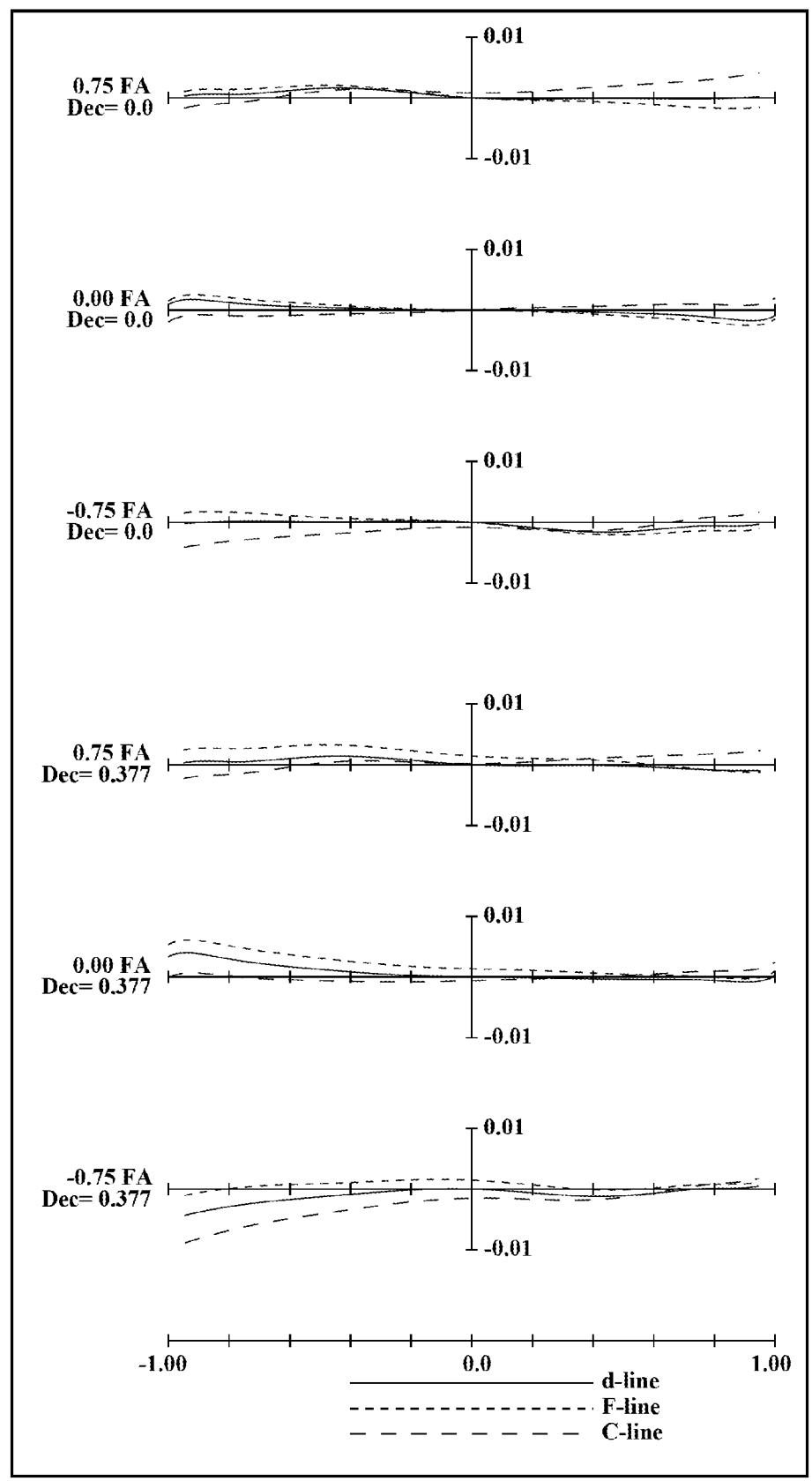
FIG. 58 is a lateral aberration diagram of a zoom lens system according to Example V-2 at a telephoto limit in a basic state where image blur compensation is not performed and in a blur compensation state.

As shown in FIG. 56, in the zoom lens system according to Embodiment V-2, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment V-2, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment V-2, the third lens unit G3 comprises solely a bi-concave ninth lens element L9. Further, the ninth lens element L9 has an aspheric object side surface.

Further, in the zoom lens system according to Embodiment V-2, the fourth lens unit G4 comprises solely a bi-convex tenth lens element L10. The tenth lens element L10 has two aspheric surfaces.

Here, in the zoom lens system according to Embodiment V-2, a plane parallel plate P is provided on the object side relative to the image surface S (between the image surface S and the tenth lens element L10).

In the zoom lens system according to Embodiment V-2, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 59:
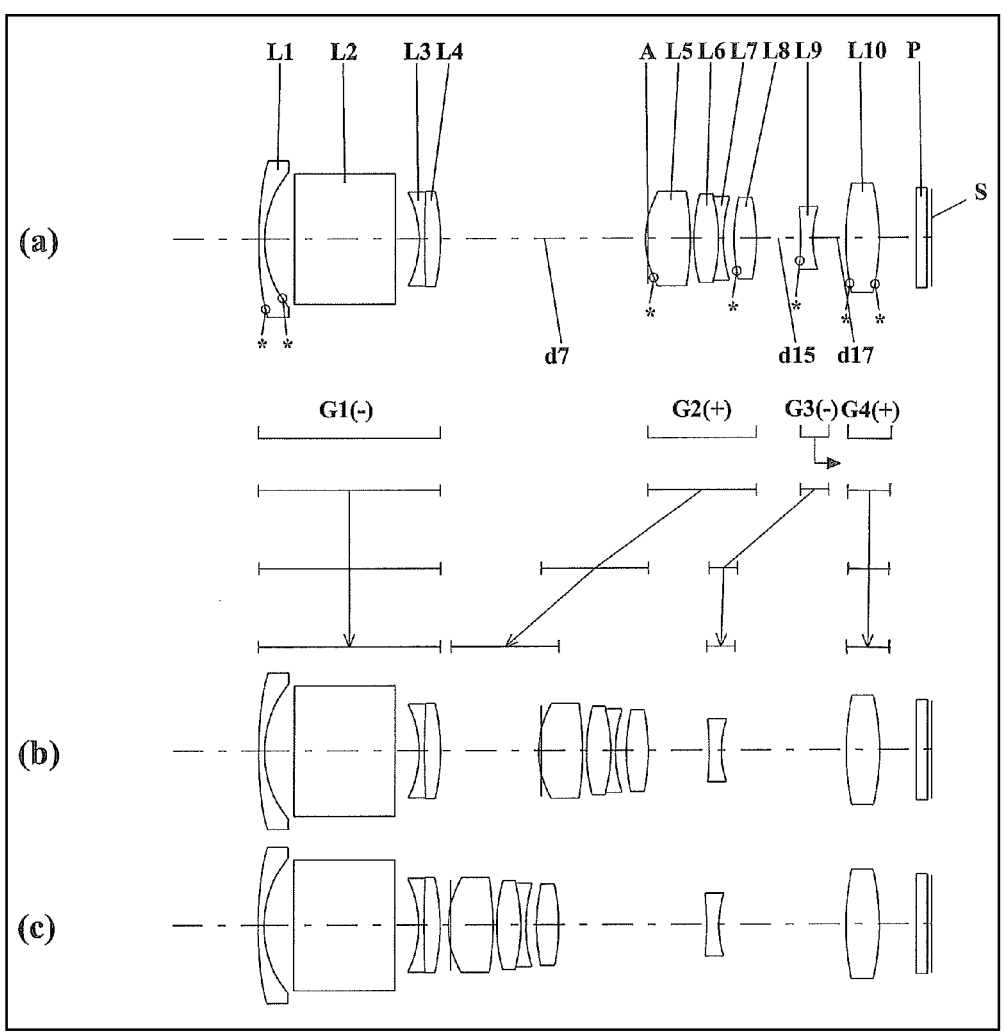
FIG. 59 is a lens arrangement diagram showing an infinity in-focus condition of a zoom lens system according to Embodiment V-3 (Example V-3)
Figure 60:
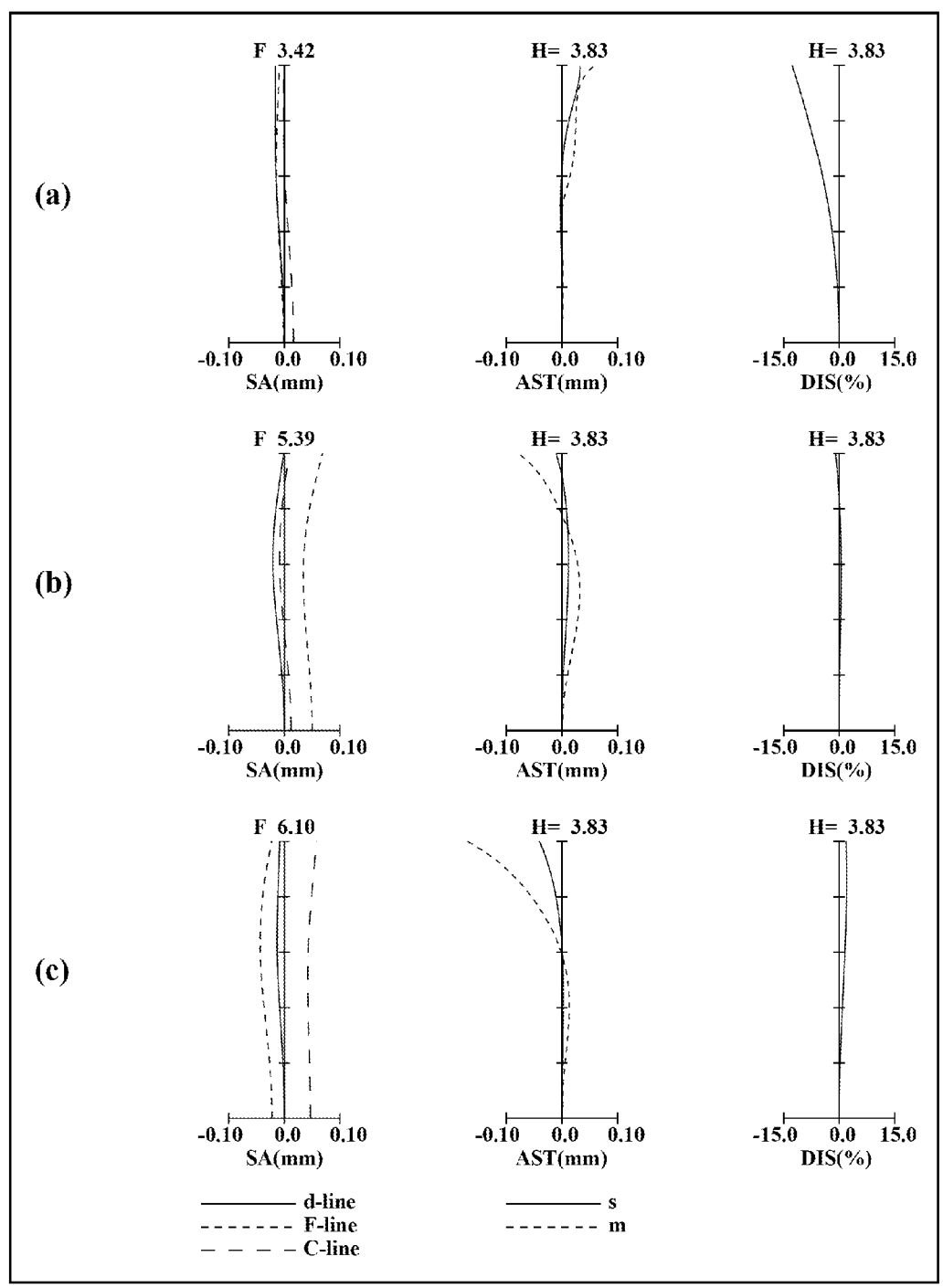
FIG. 60 is a longitudinal aberration diagram of an infinity in-focus condition of a zoom lens system according to Example V-3.
Figure 61:
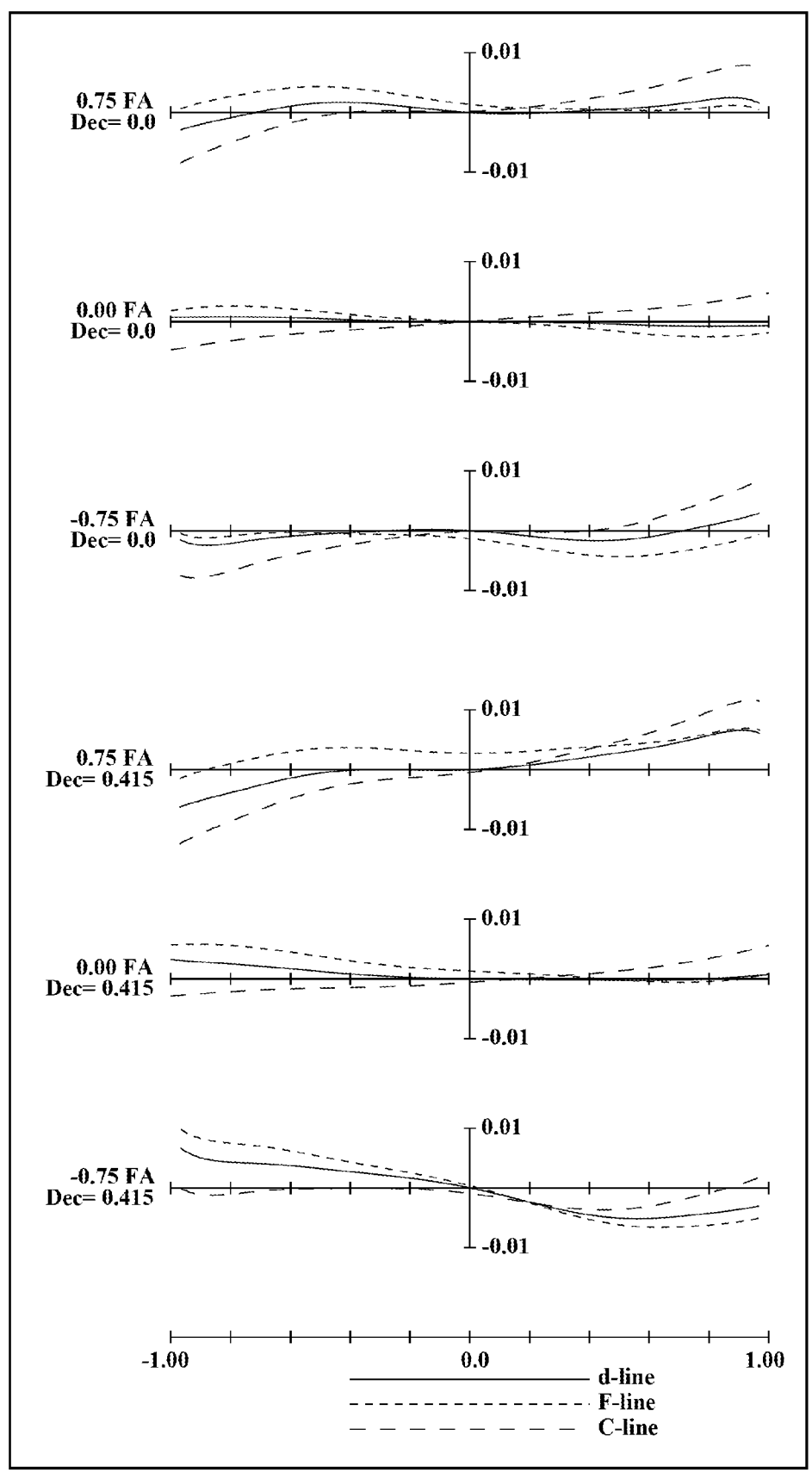
FIG. 61 is a lateral aberration diagram of a zoom lens system according to Example V-3 at a telephoto limit in a basic state where image blur compensation is not performed and in a blur compensation state.

As shown in FIG. 59, in the zoom lens system according to Embodiment V-3, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment V-3, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment V-3, the third lens unit G3 comprises solely a bi-concave ninth lens element L9. Further, the ninth lens element L9 has an aspheric object side surface.

Further, in the zoom lens system according to Embodiment V-3, the fourth lens unit G4 comprises solely a bi-convex tenth lens element L10. The tenth lens element L10 has two aspheric surfaces.

Here, in the zoom lens system according to Embodiment V-3, a plane parallel plate P is provided on the object side relative to the image surface S (between the image surface S and the tenth lens element L10).

In the zoom lens system according to Embodiment V-3, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

Figure 62:
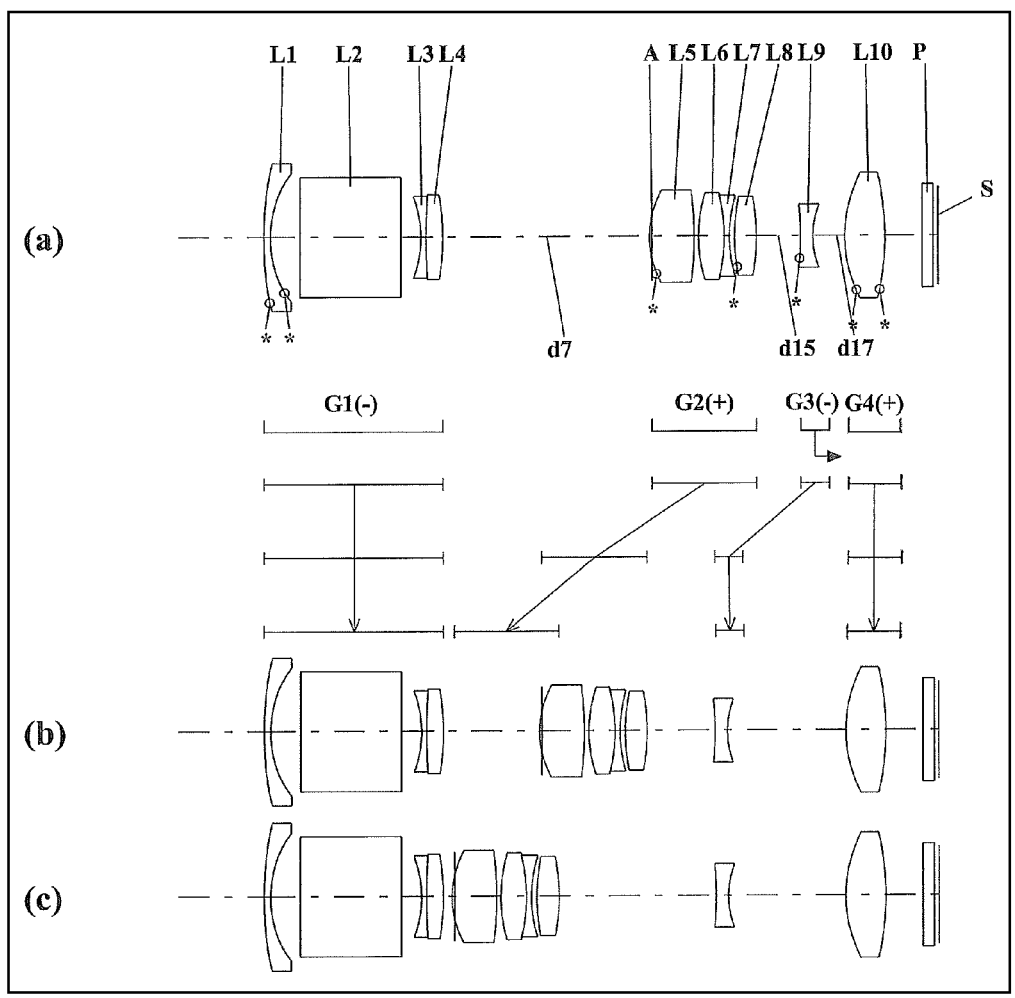
FIG. 62 is a lens arrangement diagram showing an infinity in-focus condition of a zoom lens system according to Embodiment V-4 (Example V-4)
Figure 63:
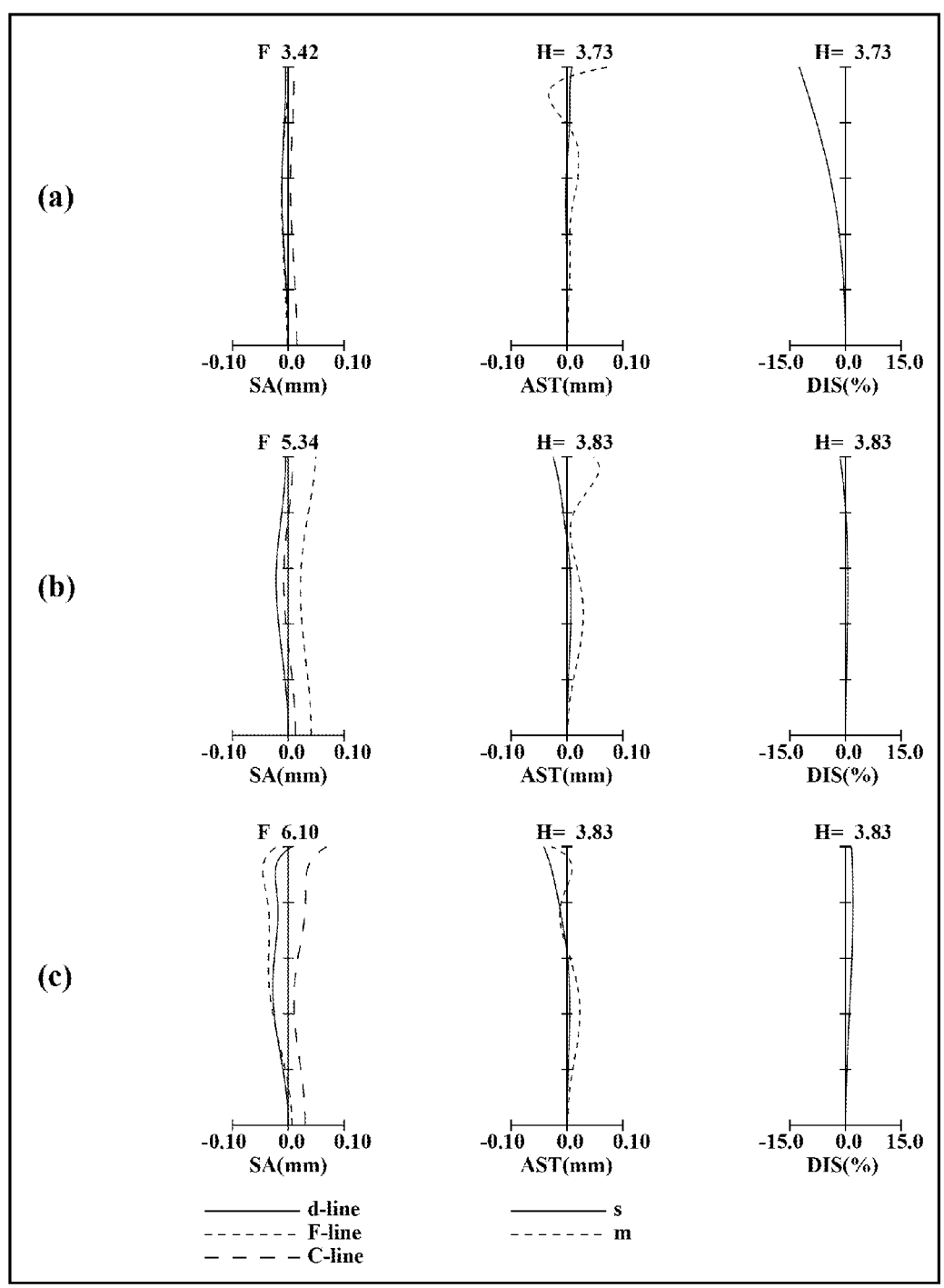
FIG. 63 is a longitudinal aberration diagram of an infinity in-focus condition of a zoom lens system according to Example V-4.
Figure 64:
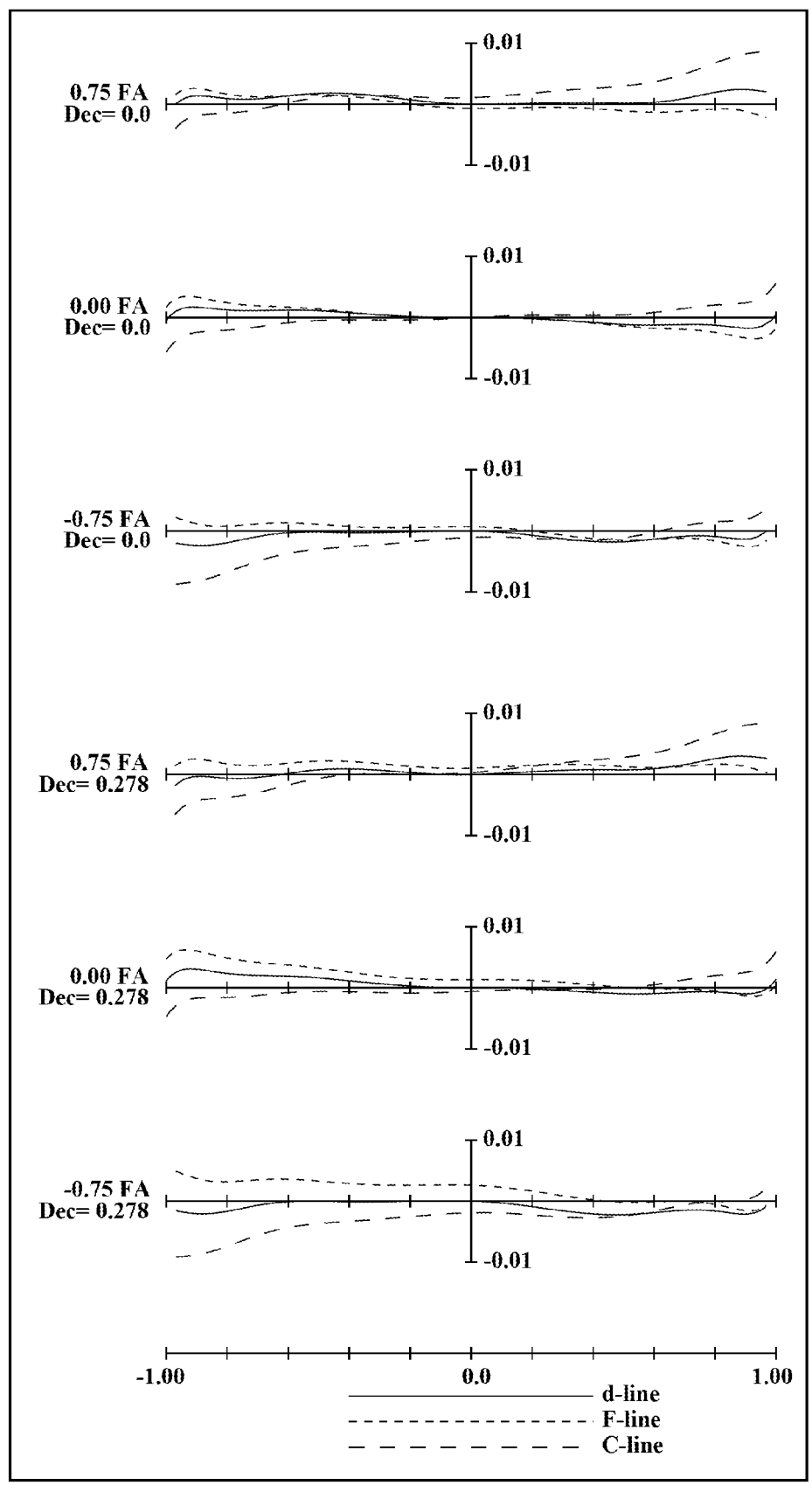
FIG. 64 is a lateral aberration diagram of a zoom lens system according to Example V-4 at a telephoto limit in a basic state where image blur compensation is not performed and in a blur compensation state.

As shown in FIG. 62, in the zoom lens system according to Embodiment V-4, the first lens unit G1, in order from the object side to the image side, comprises: a negative meniscus first lens element L1 with the convex surface facing the object side; a second lens element L2 (prism) that has a planar incident surface and a planar exiting surface and that has a reflecting surface; a bi-concave third lens element L3; and a bi-convex fourth lens element L4. Among these, the third lens element L3 and the fourth lens element L4 are cemented with each other. Further, the first lens element L1 has two aspheric surfaces.

Further, in the zoom lens system according to Embodiment V-4, the second lens unit G2, in order from the object side to the image side, comprises: a bi-convex fifth lens element L5; a bi-convex sixth lens element L6; a bi-concave seventh lens element L7; and a bi-convex eighth lens element L8. Among these, the sixth lens element L6 and the seventh lens element L7 are cemented with each other. Further, each of the fifth lens element L5 and the eighth lens element L8 has an aspheric object side surface.

Further, in the zoom lens system according to Embodiment V-4, the third lens unit G3 comprises solely a bi-concave ninth lens element L9. Further, the ninth lens element L9 has an aspheric object side surface.

Further, in the zoom lens system according to Embodiment V-4, the fourth lens unit G4 comprises solely a bi-convex tenth lens element L10. The tenth lens element L10 has two aspheric surfaces.

Here, in the zoom lens system according to Embodiment V-4, a plane parallel plate P is provided on the object side relative to the image surface S (between the image surface S and the tenth lens element L10).

In the zoom lens system according to Embodiment V-4, in zooming from a wide-angle limit to a telephoto limit at the time of image taking, the second lens unit G2 and the third lens unit G3 move such that the position at a telephoto limit should be located on the object side relative to the position at a wide-angle limit, while the first lens unit G1 and the fourth lens unit G4 are fixed relative to the image surface S. That is, in zooming, the second lens unit G2 and the third lens unit G3 individually move along the optical axis such that the interval between the first lens unit G1 and the second lens unit G2 should decrease, the interval between the second lens unit G2 and the third lens unit G3 should increase, and the interval between the third lens unit G3 and the fourth lens unit G4 should vary.

In the zoom lens system according to Embodiment V-1 to V-4, the zoom lens system, in order from the object side to the image side, comprises a first lens unit G1 having negative optical power, a second lens unit G2 having positive optical power, a third lens unit G3 having negative optical power, and a fourth lens unit G4 having positive optical power. Then, in zooming from a wide-angle limit to a telephoto limit at the time of image taking, at least the second lens unit G2 and the third lens unit G3 move along the optical axis so that magnification is achieved, while the fourth lens unit G4 or a sub lens unit consisting of a part of the fourth lens unit G4 moves in a direction perpendicular to the optical axis. Thus, in the zoom lens system according to Embodiment V-1 to V-4, a compact zoom lens system is realized with a small number of lenses, and further image blur caused by hand blurring, vibration and the like is compensated optically.

In the zoom lens system according to Embodiments V-1 to V-4, in zooming from a wide-angle limit to a telephoto limit at the time of image taking, the first lens unit G1 and the fourth lens unit G4 do not move along the optical axis. Thus, as the lens barrel for holding this zoom lens system, a lens barrel without a shape change associated with zooming can be employed. This permits fabrication of a camera having a high degree of freedom in the shape as well as an excellent shock resistance.

In the zoom lens system according to Embodiments V-1 to V-4, the first lens unit G1 includes the second lens element L2 (prism) having a reflecting surface capable of bending the light beam incident from the object, that is, bending the axial principal ray incident from the object, for example, by approximately 90°. Thus, the zoom lens system is constructed such that the thickness in the direction of the optical axis of the axial light beam incident from the object is satisfactorily small in an image taking state.

In the zoom lens system according to Embodiments V-1 to V-4, the aperture diaphragm A is located between the first lens unit G1 and the second lens unit G2. Thus, the lens diameters of the first lens unit G1 and the second lens unit G2 are allowed to be reduced.

In the zoom lens system according to Embodiment V-1 to V-4, the fourth lens unit G4 is composed of one lens element having an aspheric surface. Thus, a compact configuration having a short overall length of lens system is realized. Further, this single lens element satisfactorily suppresses a degradation in image planarity when image blur caused by hand blurring, vibration and the like is compensated optically.

In the zoom lens system according to Embodiments V-1 to V-4, in zooming from a wide-angle limit to a telephoto limit at the time of image taking, the second lens unit G2 and the third lens unit G3 among the first lens unit G1, the second lens unit G2, the third lens unit G3 and the fourth lens unit G4 are moved individually along the optical axis so that zooming is achieved. Then, as described above, among the first lens unit G1, the second lens unit G2, the third lens unit G3 and the fourth lens unit G4, the fourth lens unit G4 or alternatively a sub lens unit consisting of a part of the fourth lens unit G4 is moved in a direction perpendicular to the optical axis so that image point movement caused by vibration of the entire system is compensated, that is, image blur caused by hand blurring, vibration and the like can be compensated optically.

When image point movement caused by vibration of the entire system is to be compensated, the fourth lens unit G4 is moved in a direction perpendicular to the optical axis so that image blur is compensated in a state that size increase in the entire zoom lens system is suppressed and a compact construction is realized and that excellent imaging characteristics such as small decentering coma aberration and decentering astigmatism are satisfied.

Here, in a case that a lens unit is composed of a plurality of lens elements, the above-mentioned sub lens unit consisting of a part of a lens unit indicates any one lens element or alternatively a plurality of adjacent lens elements among the plurality of lens elements. In the zoom lens system according to Embodiment V-1 to V-4, the fourth lens unit G4 comprises solely a tenth lens element L10. Thus, the tenth lens element L10 moves in a direction perpendicular to the optical axis.

Conditions preferably to be satisfied by a zoom lens system like the zoom lens system according to Embodiments V-1 to V-4 are described below. Here, a plurality of preferable conditions are set forth for the zoom lens system according to each embodiment. A construction that satisfies all the plural conditions is most desirable for the zoom lens system. However, when an individual condition is satisfied, a zoom lens system having the corresponding effect can be obtained.

In a zoom lens system like the zoom lens system according to Embodiments V-1 to V-4, in order from the object side to the image side, comprising a first lens unit having negative optical power, a second lens unit having positive optical power, a third lens unit having negative optical power, and a fourth lens unit having positive optical power, wherein in zooming from a wide-angle limit to a telephoto limit at the time of image taking, at least the second lens unit and the third lens unit among the first lens unit, the second lens unit, the third lens unit and the fourth lens unit are moved along the optical axis so that variable magnification is achieved, and wherein the fourth lens unit or a sub lens unit consisting of a part of the fourth lens unit is moved in a direction perpendicular to the optical axis (this lens configuration is referred to as basic configuration V of the embodiment, hereinafter), it is preferable that the following condition (V-1) is satisfied.

$$-2.1 < f_{G4}/f_{G3} < 1.0 \tag{V-1}$$

(here, $f_T/f_W \geq 3.0$)

where, $f_{G3}$ is a composite focal length of the third lens unit, $f_{G4}$ is a composite focal length of the fourth lens unit, $f_T$ is a focal length of the entire system at a telephoto limit, and $f_W$ is a focal length of the entire system at a wide-angle limit.

The condition (V-1) relates to the focal length of the third lens unit and the focal length of the fourth lens unit. When the value goes below the lower limit of the condition (V-1), a possibility arises that image planarity is degraded when image blur caused by hand blurring, vibration and the like is compensated optically by moving the fourth lens unit or a sub lens unit consisting of a part of the fourth lens unit in a direction perpendicular to the optical axis. In contrast, when the value exceeds the upper limit of the condition (V-1), the amount of movement of the fourth lens unit necessary when image blur caused by hand blurring, vibration and the like is to be compensated optically by moving the fourth lens unit or a sub lens unit consisting of a part of the fourth lens unit in a direction perpendicular to the optical axis increases, and hence a possibility arises that size reduction in the lens system becomes difficult.

Here, when at least one of the following conditions (V-1)' and (V-1)" is satisfied, the above-mentioned effect is achieved more successfully.

$$-1.9 < f_{G4}/f_{G3} \quad (V\text{-}1)'$$

$$f_{G4}/f_{G3} < -1.2 \quad (V\text{-}1)''$$

(here, $f_T/f_W \geq 3.0$)

Further, it is more preferable that the conditions (V-1), (V-1)' and (V-1)" are satisfied under the following condition.

$$f_T/f_W \geq 4.0$$

In a zoom lens system having basic configuration V like the zoom lens system according to Embodiments V-1 to V-4, it is preferable that the following condition (V-2) is satisfied.

$$0.25 < 1-\beta_{4T} < 0.55 \quad (V\text{-}2)$$

(here, $f_T/f_W \geq 3.0$)

where, $\beta_{4T}$ is a lateral magnification of the fourth lens unit at a telephoto limit in an infinity in-focus condition, $f_T$ is a focal length of the entire system at a telephoto limit, and $f_W$ is a focal length of the entire system at a wide-angle limit.

The condition (V-2) sets forth the ratio of the shift of the image in a direction perpendicular to the optical axis relative to the amount of movement of the fourth lens unit in a direction perpendicular to the optical axis. When the value goes below the lower limit of the condition (V-2), the amount of movement of the fourth lens unit necessary for shifting the image by a predetermined amount increases. Thus, a larger drive system for shifting the fourth lens unit becomes necessary, and hence a possibility arises that size reduction in the lens system becomes difficult. In contrast, when the value exceeds the upper limit of the condition (V-2), the optical power of the fourth lens unit becomes excessively strong. Thus, a possibility arises that curvature of field is degraded when image blur caused by hand blurring, vibration and the like is to be compensated optically by moving the fourth lens unit or a sub lens unit consisting of a part of the fourth lens unit in a direction perpendicular to the optical axis increases, and hence.

Here, when at least one of the following conditions (V-2)' and (V-2)" is satisfied, the above-mentioned effect is achieved more successfully.

$$0.28 < 1-\beta_{4T} \quad (V\text{-}2)'$$

$$1-\beta_{4T} < 0.49 \quad (V\text{-}2)''$$

(here, $f_T/f_W \geq 3.0$)

Further, it is more preferable that the conditions (V-2), (V-2)' and (V-2)" are satisfied under the following condition.

$$f_T/f_W \geq 4.0$$

The lens units constituting the zoom lens system according to Embodiments V-1 to V-4 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium. In particular, in refractive-diffractive hybrid type lens elements, when a diffraction structure is formed in the interface between media having mutually different refractive indices, wavelength dependence in the diffraction efficiency is improved. Thus, such a configuration is preferable.

Moreover, in each embodiment, a configuration has been described that on the object side relative to the image surface S (that is, between the image surface S and the most image side lens surface of the fourth lens unit G4), a plane parallel plate P such as an optical low-pass filter and a face plate of an image sensor is provided. This low-pass filter may be: a birefringent type low-pass filter made of, for example, a crystal whose predetermined crystal orientation is adjusted; or a phase type low-pass filter that achieves required characteristics of optical cut-off frequency by diffraction.

(Embodiment V-5)

Figure 65:
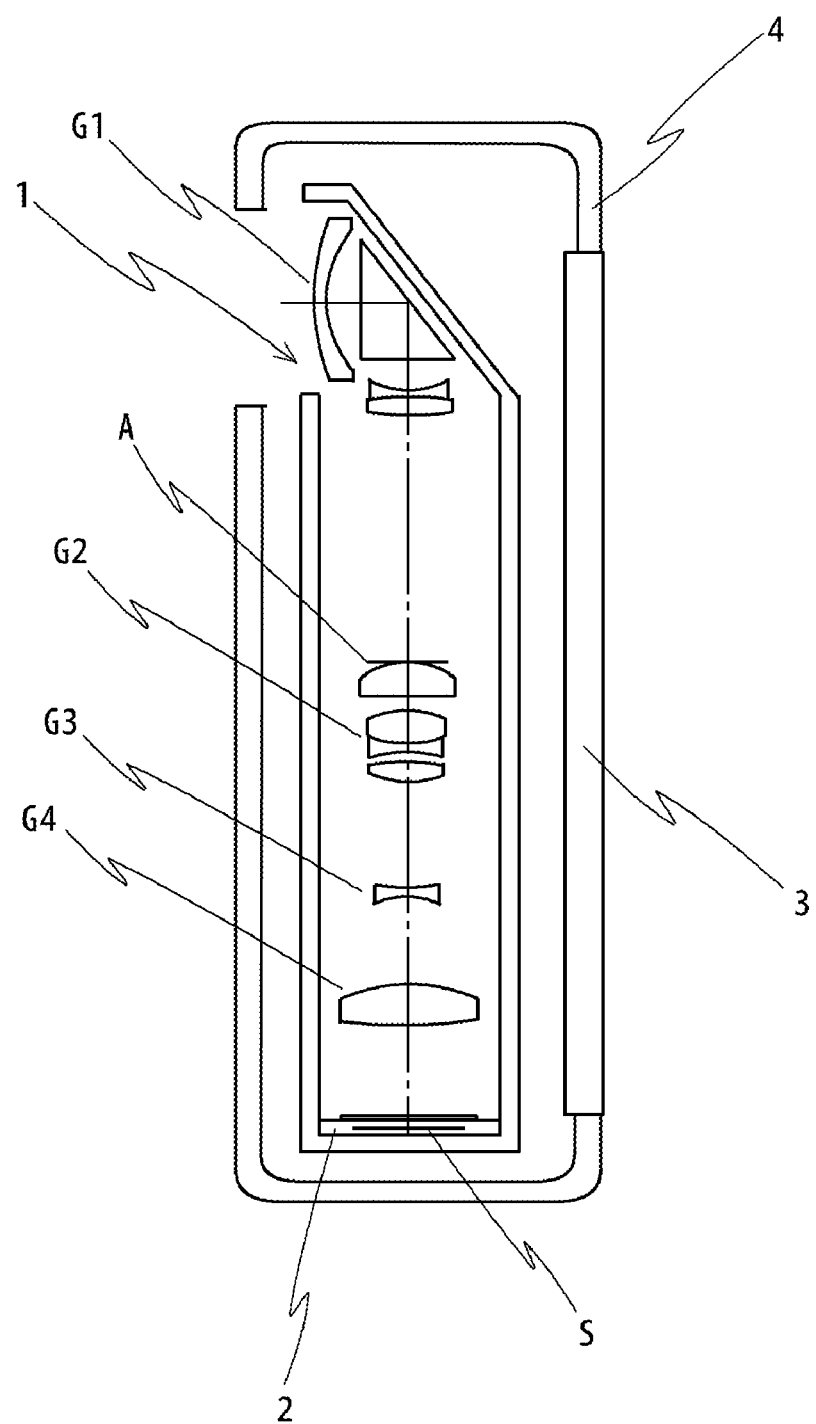
FIG. 65 is a schematic construction diagram of a digital still camera according to Embodiment V-5.

FIG. 65 is a schematic construction diagram of a digital still camera according to Embodiment V-5. In FIG. 65, the digital still camera comprises: an imaging device having a zoom lens system 1 and an image sensor 2 composed of a CCD; a liquid crystal display monitor 3; and a body 4. The employed zoom lens system 1 is a zoom lens system according to Embodiment V-1. In FIG. 65, the zoom lens system 1 comprises a first lens unit G1, an aperture diaphragm A, a second lens unit G2, a third lens unit G3 and a fourth lens unit G4. In the body 4, the zoom lens system 1 is arranged on the front side, while the image sensor 2 is arranged on the rear side of the zoom lens system 1. On the rear side of the body 4, the liquid crystal display monitor 3 is arranged, while an optical image of a photographic object generated by the zoom lens system 1 is formed on an image surface S.

As such, when the zoom lens system according to Embodiment V-1 is employed in a digital still camera, a small digital still camera is obtained that has a high resolution and high capability of compensating the curvature of field and that has a short overall length of lens system at the time of non-use. Here, in the digital still camera shown in FIG. 65, any one of the zoom lens systems according to Embodiments V-2 to V-4 may be employed in place of the zoom lens system according to Embodiment V-1. Further, the optical system of the digital still camera shown in FIG. 65 is applicable also to a digital video camera for moving images. In this case, moving images with high resolution can be acquired in addition to still images.

Here, the digital still camera according to the present Embodiment V-5 has been described for a case that the employed zoom lens system 1 is a zoom lens system according to Embodiments V-1 to V-4. However, in these zoom lens systems, the entire zooming range need not be used. That is, in accordance with a desired zooming range, a range where satisfactory optical performance is obtained may exclusively be used. Then, the zoom lens system may be used as one having a lower magnification than the zoom lens system described in Embodiments V-1 to V-4.

Further, an imaging device comprising a zoom lens system according to Embodiments V-1 to V-4 described above and an image sensor such as a CCD or a CMOS may be applied to a mobile telephone, a PDA (Personal Digital Assistance), a surveillance camera in a surveillance system, a Web camera, a vehicle-mounted camera or the like.

Numerical examples are described below in which the zoom lens systems according to Embodiments I-1 to I-4, II-1 to II-4, III-1 to III-4, IV-1 to IV-4 and V-1 to V-4 are implemented. Here, in the numerical examples, the units of length are all "mm", while the units of view angle are all "°". Moreover, in the numerical examples, r is the radius of curvature, d is the axial distance, nd is the refractive index to the d-line, and vd is the Abbe number to the d-line. In the numerical examples, the surfaces marked with * are aspherical surfaces, and the aspherical surface configuration is defined by the following expression.

$$Z = \frac{h^2/r}{1+\sqrt{1-(1+\kappa)(h/r)^2}} + A4h^4 + A6h^6 + A8h^8 + A10h^{10}$$

Here, κ is the conic constant, A4, A6, A8 and A10 are a fourth-order, sixth-order, eighth-order and tenth-order aspherical coefficients, respectively.

FIGS. 2, 5, 8 and 11 are longitudinal aberration diagrams of the zoom lens systems according to Embodiments I-1 to I-4, respectively.

FIGS. 15, 18, 21 and 24 are longitudinal aberration diagrams of the zoom lens systems according to Embodiments II-1 to II-4, respectively.

FIGS. 28, 31, 34 and 37 are longitudinal aberration diagrams of the zoom lens systems according to Embodiments III-1 to III-4, respectively.

FIGS. 41, 44, 47 and 50 are longitudinal aberration diagrams of the zoom lens systems according to Embodiments W-1 to IV-4, respectively.

FIGS. 54, 57, 60 and 63 are longitudinal aberration diagrams of the zoom lens systems according to Embodiments V-1 to V-4, respectively.

In each longitudinal aberration diagram, part (a) shows the aberration at a wide-angle limit, part (b) shows the aberration at a middle position, and part (c) shows the aberration at a telephoto limit. Each longitudinal aberration diagram, in order from the left-hand side, shows the spherical aberration (SA (mm)), the astigmatism (AST (mm)) and the distortion (DIS (%)). In each spherical aberration diagram, the vertical axis indicates the F-number (in each Fig., indicated as F), and the solid line, the short dash line and the long dash line indicate the characteristics to the d-line, the F-line and the C-line, respectively. In each astigmatism diagram, the vertical axis indicates the image height (in each Fig., indicated as H), and the solid line and the dash line indicate the characteristics to the sagittal plane (in each Fig., indicated as "s") and the meridional plane (in each Fig., indicated as "m"), respectively. In each distortion diagram, the vertical axis indicates the image height (in each Fig., indicated as H).

FIGS. 3, 6, 9 and 12 are lateral aberration diagrams of the zoom lens systems at a telephoto limit according to Embodiments I-1 to I-4, respectively.

FIGS. 16, 19, 22 and 25 are lateral aberration diagrams of the zoom lens systems at a telephoto limit according to Embodiments II-1 to II-4, respectively.

FIGS. 29, 32, 35 and 38 are lateral aberration diagrams of the zoom lens systems at a telephoto limit according to Embodiments III-1 to III-4, respectively.

FIGS. 42, 45, 48 and 51 are lateral aberration diagrams of the zoom lens systems at a telephoto limit according to Embodiments IV-1 to IV-4, respectively.

FIGS. 55, 58, 61 and 64 are lateral aberration diagrams of the zoom lens systems at a telephoto limit according to Embodiments V-1 to V-4, respectively.

In each lateral aberration diagram, the aberration diagrams in the upper three parts correspond to a basic state where image blur compensation is not performed at a telephoto limit, while the aberration diagrams in the lower three parts correspond to an image blur compensation state where the entire fourth lens unit G4 is moved by a predetermined amount in a direction perpendicular to the optical axis at a telephoto limit. Among the lateral aberration diagrams of a basic state, the upper part shows the lateral aberration at an image point of 75% of the maximum image height, the middle part shows the lateral aberration at the axial image point, and the lower part shows the lateral aberration at an image point of −75% of the maximum image height. Among the lateral aberration diagrams of an image blur compensation state, the upper part shows the lateral aberration at an image point of 75% of the maximum image height, the middle part shows the lateral aberration at the axial image point, and the lower part shows the lateral aberration at an image point of −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In each lateral aberration diagram, the meridional plane is adopted as the plane containing the optical axis of the first lens unit G1 and the optical axis of the fourth lens unit G4.

Here, in the zoom lens system according to each example, the amount of movement of the fourth lens unit G4 in a direction perpendicular to the optical axis in an image blur compensation state at a telephoto limit is as follows.

| Example | Amount of movement (mm) | | | | |
| --- | --- | --- | --- | --- | --- |
|  | I- | II- | III- | IV- | V- |
| 1 | 0.321 | 0.321 | 0.321 | 0.321 | 0.327 |
| 2 | 0.327 | 0.327 | 0.347 | 0.327 | 0.377 |
| 3 | 0.389 | 0.389 | 0.415 | 0.389 | 0.415 |
| 4 | 0.278 | 0.278 | 0.278 | 0.278 | 0.278 |

Here, when the shooting distance is infinity, at a telephoto limit, the amount of image decentering in a case that the zoom lens system inclines by 0.3° is equal to the amount of image decentering in a case that the entire fourth lens unit G4 displaces in parallel by each of the above-mentioned values in a direction perpendicular to the optical axis.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel translation required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

NUMERICAL EXAMPLE I-1

The zoom lens system of Numerical Example I-1 corresponds to Embodiment I-1 shown in FIG. 1. Table I-1 shows the surface data of the zoom lens system of Numerical Example I-1. Table I-2 shows the aspherical data. Table I-3 shows various data.

TABLE I-1

(Surface data)

| Surface number | r | d | nd | vd |
|---|---|---|---|---|
| Object surface | ∞ | | | |
| 1 | 65.98770 | 0.70000 | 1.80470 | 41.0 |
| 2* | 10.42920 | 2.15000 | | |
| 3 | ∞ | 8.70000 | 1.84666 | 23.8 |
| 4 | ∞ | 2.25880 | | |
| 5 | −6.73950 | 0.40000 | 1.72916 | 54.7 |
| 6 | −156.11850 | 1.35690 | 1.84666 | 23.8 |
| 7 | −13.29920 | Variable | | |
| 8 (Diaphragm) | ∞ | −0.20000 | | |
| 9* | 6.96010 | 2.37360 | 1.51443 | 63.3 |
| 10 | −58.40670 | 0.47960 | | |
| 11 | 10.60450 | 2.41110 | 1.49700 | 81.6 |
| 12 | −13.18500 | 0.40000 | 1.80610 | 33.3 |
| 13 | 11.01460 | 0.52340 | | |
| 14* | 14.63870 | 1.72540 | 1.51443 | 63.3 |
| 15 | −13.70590 | Variable | | |
| 16* | −21.97800 | 0.70000 | 1.60602 | 57.4 |
| 17 | 7.83670 | Variable | | |
| 18* | 14.92530 | 3.19200 | 1.60602 | 57.4 |
| 19* | −15.19790 | 3.00000 | | |
| 20 | ∞ | 0.90000 | 1.51680 | 64.2 |
| 21 | ∞ | (BF) | | |
| Image surface | ∞ | | | |

TABLE I-2

(Aspherical data)

Surface No. 2

K = 0.00000E+00, A4 = −1.49464E−04, A6 = −1.58314E−06, A8 = 4.17563E−09 A10 = −4.79826E−10
Surface No. 9

K = −5.82917E−01, A4 = 1.30605E−04, A6 = 1.98173E−08, A8 = 9.67527E−08 A10 = 9.66103E−10
Surface No. 14

K = 0.00000E+00, A4 = −1.03877E−03, A6 = −5.40190E−06, A8 = −9.66942E−07 A10 = 0.00000E+00

TABLE I-2-continued (Aspherical data)

Surface No. 16

K = 0.00000E+00, A4 = 8.21295E−05, A6 = −1.49070E−05, A8 = 1.34122E−06 A10 = 0.00000E+00
Surface No. 18

K = 0.00000E+00, A4 = 8.39781E−05, A6 = −2.02414E−06, A8 = −2.87245E−07 A10 = 0.00000E+00
Surface No. 19

K = 0.00000E+00, A4 = 4.71514E−04, A6 = −1.90431E−05, A8 = 0.00000E+00 A10 = 0.00000E+00

TABLE I-3

(Various data)

Zooming ratio 4.36001

| | Wide-angle limit | Middle position | Telephoto limit |
|---|---|---|---|
| Focal length | 5.0600 | 10.9698 | 22.0617 |
| F-number | 3.42032 | 5.37244 | 6.09970 |
| View angle | 41.0733 | 19.4013 | 9.6628 |
| Image height | 3.8300 | 3.8300 | 3.8300 |
| Overall length of lens system | 54.8694 | 54.8725 | 54.8989 |
| BF | 0.36937 | 0.37248 | 0.39889 |
| d7 | 16.8199 | 8.0052 | 0.9000 |
| d15 | 3.8000 | 5.5758 | 13.1619 |
| d17 | 2.8093 | 9.8482 | 9.3673 |

Zoom lens unit data

| Lens unit | Initial surface | Focal length |
|---|---|---|
| 1 | 1 | −8.20945 |
| 2 | 8 | 10.00098 |
| 3 | 16 | −9.44873 |
| 4 | 18 | 12.94317 |

NUMERICAL EXAMPLE I-2

The zoom lens system of Numerical Example I-2 corresponds to Embodiment I-2 shown in FIG. 4. Table I-4 shows the surface data of the zoom lens system of Numerical Example I-2. Table I-5 shows the aspherical data. Table I-6 shows various data.

TABLE I-4

(Surface data)

| Surface number | r | d | nd | vd |
|---|---|---|---|---|
| Object surface | ∞ | | | |
| 1 | 20.29870 | 0.70000 | 1.80470 | 41.0 |
| 2* | 9.12120 | 2.30360 | | |
| 3 | ∞ | 8.76000 | 1.84666 | 23.8 |
| 4 | ∞ | 1.55580 | | |
| 5 | −9.88260 | 0.40000 | 1.72916 | 54.7 |
| 6 | 18.44150 | 1.32940 | 1.84666 | 23.8 |
| 7 | −61.66310 | Variable | | |
| 8 (Diaphragm) | ∞ | −0.20000 | | |
| 9* | 8.05600 | 2.39450 | 1.51443 | 63.3 |
| 10 | −55.46670 | 0.30000 | | |
| 11 | 9.52760 | 2.55560 | 1.49700 | 81.6 |
| 12 | −15.06270 | 0.40000 | 1.80610 | 33.3 |
| 13 | 14.77460 | 0.54890 | | |

TABLE I-4-continued (Surface data)

| Surface number | r | d | nd | vd |
|---|---|---|---|---|
| 14* | 18.21700 | 1.79420 | 1.51443 | 63.3 |
| 15 | −13.27360 | Variable | | |
| 16* | −24.99250 | 0.70000 | 1.60602 | 57.4 |
| 17 | 6.02440 | Variable | | |
| 18* | 12.16420 | 2.78040 | 1.60602 | 57.4 |
| 19* | −23.38690 | 3.00000 | | |
| 20 | ∞ | 0.90000 | 1.51680 | 64.2 |
| 21 | ∞ | (BF) | | |
| Image surface | ∞ | | | |

TABLE I-5

(Aspherical data)

Surface No. 2

$K = 0.00000E+00, A4 = -4.14435E-05, A6 = -1.42629E-06,$
$A8 = 8.46111E-08\ A10 = -1.65884E-09$

Surface No. 9

$K = -5.37131E-01, A4 = 1.10009E-04, A6 = -7.66573E-07,$
$A8 = 1.26355E-07\ A10 = -4.74800E-10$

Surface No. 14

$K = 0.00000E+00, A4 = -9.53499E-04, A6 = -2.03088E-06,$
$A8 = -5.12543E-07\ A10 = 0.00000E+00$

Surface No. 16

$K = 0.00000E+00, A4 = 2.24120E-04, A6 = -2.16424E-05,$
$A8 = 2.46375E-06\ A10 = 0.00000E+00$

Surface No. 18

$K = 0.00000E+00, A4 = 3.24834E-04, A6 = 5.65419E-06,$
$A8 = -4.96504E-08\ A10 = 0.00000E+00$

Surface No. 19

$K = 0.00000E+00, A4 = 5.49934E-04, A6 = -3.71238E-06,$
$A8 = 0.00000E+00\ A10 = 0.00000E+00$

TABLE I-6

(Various data)

Zooming ratio 4.49999

| | Wide-angle limit | Middle position | Telephoto limit |
|---|---|---|---|
| Focal length | 6.1719 | 10.9699 | 27.7733 |
| F-number | 3.41944 | 4.76199 | 6.09949 |
| View angle | 35.3519 | 19.9384 | 7.8018 |
| Image height | 3.8300 | 3.8300 | 3.8300 |
| Overall length of lens system | 54.8801 | 54.8866 | 54.8404 |
| BF | 0.38005 | 0.38658 | 0.34042 |
| d7 | 16.3236 | 9.9741 | 0.9000 |
| d15 | 3.8000 | 5.0398 | 14.8262 |
| d17 | 4.1540 | 9.2637 | 8.5514 |

Zoom lens unit data

| Lens unit | Initial surface | Focal length |
|---|---|---|
| 1 | 1 | −8.34735 |
| 2 | 8 | 9.45624 |
| 3 | 16 | −7.94247 |
| 4 | 18 | 13.60585 |

NUMERICAL EXAMPLE I-3

The zoom lens system of Numerical Example I-3 corresponds to Embodiment I-3 shown in FIG. 7. Table I-7 shows the surface data of the zoom lens system of Numerical Example I-3. Table I-8 shows the aspherical data. Table I-9 shows various data.

TABLE I-7

(Surface data)

| Surface number | r | d | nd | vd |
|---|---|---|---|---|
| Object surface | ∞ | | | |
| 1 | 1001.79760 | 0.70000 | 1.80470 | 41.0 |
| 2* | 9.25290 | 2.32000 | | |
| 3 | ∞ | 8.76000 | 1.84666 | 23.8 |
| 4 | ∞ | 2.71790 | | |
| 5 | −6.08970 | 0.40000 | 1.72916 | 54.7 |
| 6 | −18.90120 | 1.40010 | 1.84666 | 23.8 |
| 7 | −9.07790 | Variable | | |
| 8 (Diaphragm) | ∞ | −0.20000 | | |
| 9* | 6.77300 | 3.18120 | 1.51443 | 63.3 |
| 10 | −39.17620 | 0.74890 | | |
| 11 | 25.31540 | 2.27680 | 1.49700 | 81.6 |
| 12 | −7.14450 | 0.40000 | 1.80610 | 33.3 |
| 13 | 24.66600 | 0.36590 | | |
| 14* | 25.89720 | 2.16020 | 1.51443 | 63.3 |
| 15 | −10.29080 | Variable | | |
| 16* | −21.97800 | 0.70000 | 1.60602 | 57.4 |
| 17 | 11.59350 | Variable | | |
| 18* | 26.58070 | 2.51440 | 1.60602 | 57.4 |
| 19* | −12.51780 | 3.00000 | | |
| 20 | ∞ | 0.90000 | 1.51680 | 64.2 |
| 21 | ∞ | (BF) | | |
| Image surface | ∞ | | | |

TABLE I-8

(Aspherical data)

Surface No. 2

$K = 0.00000E+00, A4 = -2.01792E-04, A6 = -4.37333E-06,$
$A8 = 1.66380E-08\ A10 = -5.75782E-10$

Surface No. 9

$K = -5.49906E-01, A4 = 1.24190E-04, A6 = 1.47047E-06,$
$A8 = -9.51055E-09\ A10 = 6.33967E-09$

Surface No. 14

$K = 0.00000E+00, A4 = -8.48846E-04, A6 = -2.27336E-06,$
$A8 = -5.96615E-07\ A10 = 0.00000E+00$

Surface No. 16

$K = 0.00000E+00, A4 = -1.72324E-04, A6 = -2.88270E-05,$
$A8 = 1.58378E-06\ A10 = 0.00000E+00$

Surface No. 18

$K = 0.00000E+00, A4 = -4.38292E-05, A6 = 1.49332E-05,$
$A8 = 1.80473E-07\ A10 = 0.00000E+00$

Surface No. 19

$K = 0.00000E+00, A4 = 1.67595E-04, A6 = 2.25549E-05,$
$A8 = 0.00000E+00\ A10 = 0.00000E+00$

TABLE I-9

(Various data)

Zooming ratio 4.04998

| | Wide-angle limit | Middle position | Telephoto limit |
|---|---|---|---|
| Focal length | 4.3500 | 7.4474 | 17.6174 |
| F-number | 3.42015 | 4.79568 | 6.09994 |
| View angle | 42.9474 | 26.2633 | 11.3236 |
| Image height | 3.6000 | 3.6000 | 3.6000 |
| Overall length of lens system | 56.8964 | 56.8410 | 56.8992 |
| BF | 0.39644 | 0.34098 | 0.39923 |
| d7 | 17.7546 | 11.1758 | 0.9000 |
| d15 | 3.8000 | 3.7257 | 8.9165 |
| d17 | 2.6000 | 9.2531 | 14.3381 |

Zoom lens unit data

| Lens unit | Initial surface | Focal length |
|---|---|---|
| 1 | 1 | −8.49995 |
| 2 | 8 | 10.91766 |
| 3 | 16 | −12.42629 |
| 4 | 18 | 14.39184 |

NUMERICAL EXAMPLE I-4

The zoom lens system of Numerical Example I-4 corresponds to Embodiment I-4 shown in FIG. 10. Table I-10 shows the surface data of the zoom lens system of Numerical Example I-4. Table I-11 shows the aspherical data. Table I-12 shows various data.

TABLE I-10

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.84280 | 2.40000 | | |
| 3 | ∞ | 8.20000 | 1.90366 | 31.3 |
| 4 | ∞ | 1.65900 | | |
| 5 | −8.81320 | 0.40000 | 1.72916 | 54.7 |
| 6 | 46.52790 | 1.38800 | 1.84666 | 23.8 |
| 7 | −19.52110 | Variable | | |
| 8 (Diaphragm) | ∞ | −0.20000 | | |
| 9* | 7.44880 | 3.63340 | 1.51443 | 63.3 |
| 10 | −27.36940 | 0.35780 | | |
| 11 | 11.74260 | 2.11680 | 1.49700 | 81.6 |
| 12 | −13.21450 | 0.40000 | 1.80610 | 33.3 |
| 13 | 11.19570 | 0.42130 | | |
| 14* | 12.64190 | 1.79540 | 1.51443 | 63.3 |
| 15 | −15.80390 | Variable | | |
| 16* | −22.33870 | 1.00000 | 1.60602 | 57.4 |
| 17 | 6.88070 | Variable | | |
| 18* | 11.22100 | 3.27260 | 1.60602 | 57.4 |
| 19* | −17.08940 | 3.00000 | | |
| 20 | ∞ | 0.90000 | 1.51680 | 64.2 |
| 21 | ∞ | (BF) | | |
| Image surface | ∞ | | | |

TABLE I-11

(Aspherical data)

Surface No. 1

K = 0.00000E+00, A4 = −1.01669E−04, A6 = 6.67457E−06, A8 = −5.20404E−08 A10 = 0.00000E+00

Surface No. 2

K = 0.00000E+00, A4 = −2.01288E−04, A6 = 4.19898E−06, A8 = 1.75627E−07 A10 = −2.12548E−09

Surface No. 9

K = 4.31402E−01, A4 = −2.47963E−04, A6 = −8.89222E−06, A8 = 2.13615E−07 A10 = −9.80776E−09

Surface No. 14

K = 0.00000E+00, A4 = −7.68546E−04, A6 = −2.35540E−06, A8 = −4.09337E−07 A10 = 0.00000E+00

Surface No. 16

K = 0.00000E+00, A4 = 1.09701E−04, A6 = 1.20136E−05, A8 = −1.27262E−06 A10 = 0.00000E+00

Surface No. 18

K = 0.00000E+00, A4 = 2.30030E−04, A6 = 7.28810E−07, A8 = −2.88100E−07 A10 = 0.00000E+00

Surface No. 19

K = 0.00000E+00, A4 = 7.77861E−04, A6 = −2.13214E−05, A8 = 0.00000E+00 A10 = 0.00000E+00

TABLE I-12

(Various data)

Zooming ratio 4.35970

| | Wide-angle limit | Middle position | Telephoto limit |
|---|---|---|---|
| Focal length | 5.0600 | 10.9688 | 22.0602 |
| F-number | 3.42015 | 5.33715 | 6.09987 |
| View angle | 40.1023 | 19.5124 | 9.6954 |
| Image height | 3.7300 | 3.8300 | 3.8300 |
| Overall length of lens system | 54.8782 | 54.8645 | 54.8790 |
| BF | 0.37823 | 0.36451 | 0.37897 |
| d7 | 17.0557 | 8.0561 | 0.9000 |
| d15 | 3.6000 | 5.5359 | 12.7897 |
| d17 | 2.6000 | 9.6637 | 9.5660 |

Zoom lens unit data

| Lens unit | Initial surface | Focal length |
|---|---|---|
| 1 | 1 | −8.37748 |
| 2 | 8 | 10.04190 |
| 3 | 16 | −8.56958 |
| 4 | 18 | 11.68678 |

The following Table I-13 shows the corresponding values to the individual conditions in the zoom lens systems of the numerical examples.

TABLE I-13

(Corresponding values to conditions)

| Condition | | Example | | | |
|---|---|---|---|---|---|
| | | I-1 | I-2 | I-3 | I-4 |
| (I-1) | $|f_{G1}|/f_T$ | 0.372 | 0.301 | 0.482 | 0.380 |
| (I-2) | $f_{G2}/f_T$ | 0.453 | 0.340 | 0.620 | 0.455 |
| | $f_T/f_W$ | 4.36 | 4.50 | 4.05 | 4.36 |

NUMERICAL EXAMPLE II-1

The zoom lens system of Numerical Example II-1 corresponds to Embodiment II-1 shown in FIG. 14. Table II-1 shows the surface data of the zoom lens system of Numerical Example II-1. Table II-2 shows the aspherical data. Table II-3 shows various data.

TABLE II-1

(Surface data)

| Surface number | r | d | nd | vd |
|---|---|---|---|---|
| Object surface | ∞ | | | |
| 1 | 65.98770 | 0.70000 | 1.80470 | 41.0 |
| 2* | 10.42920 | 2.15000 | | |
| 3 | ∞ | 8.70000 | 1.84666 | 23.8 |
| 4 | ∞ | 2.25880 | | |
| 5 | −6.73950 | 0.40000 | 1.72916 | 54.7 |
| 6 | −156.11850 | 1.35690 | 1.84666 | 23.8 |
| 7 | −13.29920 | Variable | | |
| 8 (Diaphragm) | ∞ | −0.20000 | | |
| 9* | 6.96010 | 2.37360 | 1.51443 | 63.3 |
| 10 | −58.40670 | 0.47960 | | |
| 11 | 10.60450 | 2.41110 | 1.49700 | 81.6 |
| 12 | −13.18500 | 0.40000 | 1.80610 | 33.3 |
| 13 | 11.01460 | 0.52340 | | |
| 14* | 14.63870 | 1.72540 | 1.51443 | 63.3 |
| 15 | −13.70590 | Variable | | |
| 16* | −21.97800 | 0.70000 | 1.60602 | 57.4 |
| 17 | 7.83670 | Variable | | |
| 18* | 14.92530 | 3.19200 | 1.60602 | 57.4 |
| 19* | −15.19790 | 3.00000 | | |
| 20 | ∞ | 0.90000 | 1.51680 | 64.2 |
| 21 | ∞ | (BF) | | |
| Image surface | ∞ | | | |

TABLE II-2

(Aspherical data)

Surface No. 2

K = 0.00000E+00, A4 = −1.49464E−04, A6 = −1.58314E−06, A8 = 4.17563E−09 A10 = −4.79826E−10
Surface No. 9

K = −5.82917E−01, A4 = 1.30605E−04, A6 = 1.98173E−08, A8 = 9.67527E−08 A10 = 9.66103E−10
Surface No. 14

K = 0.00000E+00, A4 = −1.03877E−03, A6 = −5.40190E−06, A8 = −9.66942E−07 A10 = 0.00000E+00

TABLE II-2-continued (Aspherical data)

Surface No. 16

K = 0.00000E+00, A4 = 8.21295E−05, A6 = −1.49070E−05, A8 = 1.34122E−06 A10 = 0.00000E+00
Surface No. 18

K = 0.00000E+00, A4 = 8.39781E−05, A6 = −2.02414E−06, A8 = −2.87245E−07 A10 = 0.00000E+00
Surface No. 19

K = 0.00000E+00, A4 = 4.71514E−04, A6 = −1.90431E−05, A8 = 0.00000E+00 A10 = 0.00000E+00

TABLE II-3

(Various data)

Zooming ratio 4.36001

| | Wide-angle limit | Middle position | Telephoto limit |
|---|---|---|---|
| Focal length | 5.0600 | 10.9698 | 22.0617 |
| F-number | 3.42032 | 5.37244 | 6.09970 |
| View angle | 41.0733 | 19.4013 | 9.6628 |
| Image height | 3.8300 | 3.8300 | 3.8300 |
| Overall length of lens system | 54.8694 | 54.8725 | 54.8989 |
| BF | 0.36937 | 0.37248 | 0.39889 |
| d7 | 16.8199 | 8.0052 | 0.9000 |
| d15 | 3.8000 | 5.5758 | 13.1619 |
| d17 | 2.8093 | 9.8482 | 9.3673 |

Zoom lens unit data

| Lens unit | Initial surface | Focal length |
|---|---|---|
| 1 | 1 | −8.20945 |
| 2 | 8 | 10.00098 |
| 3 | 16 | −9.44873 |
| 4 | 18 | 12.94317 |

NUMERICAL EXAMPLE II-2

The zoom lens system of Numerical Example II-2 corresponds to Embodiment II-2 shown in FIG. 17. Table II-4 shows the surface data of the zoom lens system of Numerical Example II-2. Table II-5 shows the aspherical data. Table II-6 shows various data.

TABLE II-4

(Surface data)

| Surface number | r | d | nd | vd |
|---|---|---|---|---|
| Object surface | ∞ | | | |
| 1 | 20.29870 | 0.70000 | 1.80470 | 41.0 |
| 2* | 9.12120 | 2.30360 | | |
| 3 | ∞ | 8.76000 | 1.84666 | 23.8 |
| 4 | ∞ | 1.55580 | | |
| 5 | −9.88260 | 0.40000 | 1.72916 | 54.7 |
| 6 | 18.44150 | 1.32940 | 1.84666 | 23.8 |
| 7 | −61.66310 | Variable | | |
| 8 (Diaphragm) | ∞ | −0.20000 | | |
| 9* | 8.05600 | 2.39450 | 1.51443 | 63.3 |
| 10 | −55.46670 | 0.30000 | | |
| 11 | 9.52760 | 2.55560 | 1.49700 | 81.6 |
| 12 | −15.06270 | 0.40000 | 1.80610 | 33.3 |
| 13 | 14.77460 | 0.54890 | | |

TABLE II-4-continued (Surface data)

| Surface number | r | d | nd | vd |
|---|---|---|---|---|
| 14* | 18.21700 | 1.79420 | 1.51443 | 63.3 |
| 15 | −13.27360 | Variable | | |
| 16* | −24.99250 | 0.70000 | 1.60602 | 57.4 |
| 17 | 6.02440 | Variable | | |
| 18* | 12.16420 | 2.78040 | 1.60602 | 57.4 |
| 19* | −23.38690 | 3.00000 | | |
| 20 | ∞ | 0.90000 | 1.51680 | 64.2 |
| 21 | ∞ | (BF) | | |
| Image surface | ∞ | | | |

TABLE II-5

(Aaspherical data)

Surface No. 2

K = 0.00000E+00, A4 = −4.14435E−05, A6 = −1.42629E−06,
A8 = 8.46111E−08 A10 = −1.65884E−09
Surface No. 9

K = −5.37131E−01, A4 = 1.10009E−04, A6 = −7.66573E−07,
A8 = 1.26355E−07 A10 = −4.74800E−10
Surface No. 14

K = 0.00000E+00, A4 = −9.53499E−04, A6 = −2.03088E−06,
A8 = −5.12543E−07 A10 = 0.00000E+00
Surface No. 16

K = 0.00000E+00, A4 = 2.24120E−04, A6 = −2.16424E−05,
A8 = 2.46375E−06 A10 = 0.00000E+00
Surface No. 18

K = 0.00000E+00, A4 = 3.24834E−04, A6 = 5.65419E−06,
A8 = −4.96504E−08 A10 = 0.00000E+00
Surface No. 19

K = 0.00000E+00, A4 = 5.49934E−04, A6 = −3.71238E−06,
A8 = 0.00000E+00 A10 = 0.00000E+00

TABLE II-6

(Various data)

Zooming ratio 4.49999

| | Wide-angle limit | Middle position | Telephoto limit |
|---|---|---|---|
| Focal length | 6.1719 | 10.9699 | 27.7733 |
| F-number | 3.41944 | 4.76199 | 6.09949 |
| View angle | 35.3519 | 19.9384 | 7.8018 |
| Image height | 3.8300 | 3.8300 | 3.8300 |
| Overall length of lens system | 54.8801 | 54.8866 | 54.8404 |
| BF | 0.38005 | 0.38658 | 0.34042 |
| d7 | 16.3236 | 9.9741 | 0.9000 |
| d15 | 3.8000 | 5.0398 | 14.8262 |
| d17 | 4.1540 | 9.2637 | 8.5514 |

Zoom lens unit data

| Lens unit | Initial surface | Focal length |
|---|---|---|
| 1 | 1 | −8.34735 |
| 2 | 8 | 9.45624 |
| 3 | 16 | −7.94247 |
| 4 | 18 | 13.60585 |

NUMERICAL EXAMPLE II-3

The zoom lens system of Numerical Example II-3 corresponds to Embodiment II-3 shown in FIG. 20. Table II-7 shows the surface data of the zoom lens system of Numerical Example II-3. Table II-8 shows the aspherical data. Table II-9 shows various data.

TABLE II-7

(Surface data)

| Surface number | r | d | nd | vd |
|---|---|---|---|---|
| Object surface | ∞ | | | |
| 1 | 1001.79760 | 0.70000 | 1.80470 | 41.0 |
| 2* | 9.25290 | 2.32000 | | |
| 3 | ∞ | 8.76000 | 1.84666 | 23.8 |
| 4 | ∞ | 2.71790 | | |
| 5 | −6.08970 | 0.40000 | 1.72916 | 54.7 |
| 6 | −18.90120 | 1.40010 | 1.84666 | 23.8 |
| 7 | −9.07790 | Variable | | |
| 8 | ∞ | −0.20000 | | |
| (Diaphragm) | | | | |
| 9* | 6.77300 | 3.18120 | 1.51443 | 63.3 |
| 10 | −39.17620 | 0.74890 | | |
| 11 | 25.31540 | 2.27680 | 1.49700 | 81.6 |
| 12 | −7.14450 | 0.40000 | 1.80610 | 33.3 |
| 13 | 24.66600 | 0.36590 | | |
| 14* | 25.89720 | 2.16020 | 1.51443 | 63.3 |
| 15 | −10.29080 | Variable | | |
| 16* | −21.97800 | 0.70000 | 1.60602 | 57.4 |
| 17 | 11.59350 | Variable | | |
| 18* | 26.58070 | 2.51440 | 1.60602 | 57.4 |
| 19* | −12.51780 | 3.00000 | | |
| 20 | ∞ | 0.90000 | 1.51680 | 64.2 |
| 21 | ∞ | (BF) | | |
| Image surface | ∞ | | | |

TABLE II-8

(Aspherical data)

Surface No. 2

K = 0.00000E+00, A4 = −2.01792E−04, A6 = −4.37333E−06,
A8 = 1.66380E−08 A10 = −5.75782E−10
Surface No. 9

K = −5.49906E−01, A4 = 1.24190E−04, A6 = 1.47047E−06,
A8 = −9.51055E−09 A10 = 6.33967E−09
Surface No. 14

K = 0.00000E+00, A4 = −8.48846E−04, A6 = −2.27336E−06,
A8 = −5.96615E−07 A10 = 0.00000E+00
Surface No. 16

K = 0.00000E+00, A4 = −1.72324E−04, A6 = −2.88270E−05,
A8 = 1.58378E−06 A10 = 0.00000E+00
Surface No. 18

K = 0.00000E+00, A4 = −4.38292E−05, A6 = 1.49332E−05,
A8 = 1.80473E−07 A10 = 0.00000E+00
Surface No. 19

K = 0.00000E+00, A4 = 1.67595E−04, A6 = 2.25549E−05,
A8 = 0.00000E+00 A10 = 0.00000E+00

TABLE II-9

(Various data)

Zooming ratio 4.04998

| | Wide-angle limit | Middle position | Telephoto limit |
|---|---|---|---|
| Focal length | 4.3500 | 7.4474 | 17.6174 |
| F-number | 3.42015 | 4.79568 | 6.09994 |
| View angle | 42.9474 | 26.2633 | 11.3236 |
| Image height | 3.6000 | 3.6000 | 3.6000 |
| Overall length of lens system | 56.8964 | 56.8410 | 56.8992 |
| BF | 0.39644 | 0.34098 | 0.39923 |
| d7 | 17.7546 | 11.1758 | 0.9000 |
| d15 | 3.8000 | 3.7257 | 8.9165 |
| d17 | 2.6000 | 9.2531 | 14.3381 |

Zoom lens unit data

| Lens unit | Initial surface | Focal length |
|---|---|---|
| 1 | 1 | −8.49995 |
| 2 | 8 | 10.91766 |
| 3 | 16 | −12.42629 |
| 4 | 18 | 14.39184 |

NUMERICAL EXAMPLE II-4

The zoom lens system of Numerical Example II-4 corresponds to Embodiment II-4 shown in FIG. 23. Table II-10 shows the surface data of the zoom lens system of Numerical Example II-4. Table II-11 shows the aspherical data. Table II-12 shows various data.

TABLE II-10

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.84280 | 2.40000 | | |
| 3 | ∞ | 8.20000 | 1.90366 | 31.3 |
| 4 | ∞ | 1.65900 | | |
| 5 | −8.81320 | 0.40000 | 1.72916 | 54.7 |
| 6 | 46.52790 | 1.38800 | 1.84666 | 23.8 |
| 7 | −19.52110 | Variable | | |
| 8 (Diaphragm) | ∞ | −0.20000 | | |
| 9* | 7.44880 | 3.63340 | 1.51443 | 63.3 |
| 10 | −27.36940 | 0.35780 | | |
| 11 | 11.74260 | 2.11680 | 1.49700 | 81.6 |
| 12 | −13.21450 | 0.40000 | 1.80610 | 33.3 |
| 13 | 11.19570 | 0.42130 | | |
| 14* | 12.64190 | 1.79540 | 1.51443 | 63.3 |
| 15 | −15.80390 | Variable | | |
| 16* | −22.33870 | 1.00000 | 1.60602 | 57.4 |
| 17 | 6.88070 | Variable | | |
| 18* | 11.22100 | 3.27260 | 1.60602 | 57.4 |
| 19* | −17.08940 | 3.00000 | | |
| 20 | ∞ | 0.90000 | 1.51680 | 64.2 |
| 21 | ∞ | (BF) | | |
| Image surface | ∞ | | | |

TABLE II-11

(Aspherical data)

Surface No. 1

$K = 0.00000E+00, A4 = -1.01669E-04, A6 = 6.67457E-06,$
$A8 = -5.20404E-08\ A10 = 0.00000E+00$

Surface No. 2

$K = 0.00000E+00, A4 = -2.01288E-04, A6 = 4.19898E-06,$
$A8 = 1.75627E-07\ A10 = -2.12548E-09$

Surface No. 9

$K = 4.31402E-01, A4 = -2.47963E-04, A6 = -8.89222E-06,$
$A8 = 2.13615E-07\ A10 = -9.80776E-09$

Surface No. 14

$K = 0.00000E+00, A4 = -7.68546E-04, A6 = -2.35540E-06,$
$A8 = -4.09337E-07\ A10 = 0.00000E+00$

Surface No. 16

$K = 0.00000E+00, A4 = 1.09701E-04, A6 = 1.20136E-05,$
$A8 = -1.27262E-06\ A10 = 0.00000E+00$

Surface No. 18

$K = 0.00000E+00, A4 = 2.30030E-04, A6 = 7.28810E-07,$
$A8 = -2.88100E-07\ A10 = 0.00000E+00$

Surface No. 19

$K = 0.00000E+00, A4 = 7.77861E-04, A6 = -2.13214E-05,$
$A8 = 0.00000E+00\ A10 = 0.00000E+00$

TABLE II-12

(Various data)

Zooming ratio 4.35970

| | Wide-angle limit | Middle position | Telephoto limit |
|---|---|---|---|
| Focal length | 5.0600 | 10.9688 | 22.0602 |
| F-number | 3.42015 | 5.33715 | 6.09987 |
| View angle | 40.1023 | 19.5124 | 9.6954 |
| Image height | 3.7300 | 3.8300 | 3.8300 |
| Overall length of lens system | 54.8782 | 54.8645 | 54.8790 |
| BF | 0.37823 | 0.36451 | 0.37897 |
| d7 | 17.0557 | 8.0561 | 0.9000 |
| d15 | 3.6000 | 5.5359 | 12.7897 |
| d17 | 2.6000 | 9.6637 | 9.5660 |

Zoom lens unit data

| Lens unit | Initial surface | Focal length |
|---|---|---|
| 1 | 1 | −8.37748 |
| 2 | 8 | 10.04190 |
| 3 | 16 | −8.56958 |
| 4 | 18 | 11.68678 |

The following Table II-13 shows the corresponding values to the individual conditions in the zoom lens systems of the numerical examples.

TABLE II-13

(Corresponding values to conditions)

| Condition | | II-1 | II-2 | II-3 | II-4 |
|---|---|---|---|---|---|
| (II-1) | $T_{G2}/f_W$ | 3.146 | 2.499 | 3.875 | 3.193 |
| (II-2) | $\beta_{2T}/\beta_{2W}$ | 3.346 | 3.721 | 2.675 | 3.301 |
|  | $f_T/f_W$ | 4.36 | 4.50 | 4.05 | 4.36 |

NUMERICAL EXAMPLE III-1

The zoom lens system of Numerical Example III-1 corresponds to Embodiment III-1 shown in FIG. 27. Table III-1 shows the surface data of the zoom lens system of Numerical Example III-1. Table III-2 shows the aspherical data. Table III-3 shows various data.

TABLE III-1

(Surface data)

| Surface number | r | d | nd | vd |
|---|---|---|---|---|
| Object surface | ∞ | | | |
| 1 | 65.98770 | 0.70000 | 1.80470 | 41.0 |
| 2* | 10.42920 | 2.15000 | | |
| 3 | ∞ | 8.70000 | 1.84666 | 23.8 |
| 4 | ∞ | 2.25880 | | |
| 5 | −6.73950 | 0.40000 | 1.72916 | 54.7 |
| 6 | −156.11850 | 1.35690 | 1.84666 | 23.8 |
| 7 | −13.29920 | Variable | | |
| 8 (Diaphragm) | ∞ | −0.20000 | | |
| 9* | 6.96010 | 2.37360 | 1.51443 | 63.3 |
| 10 | −58.40670 | 0.47960 | | |
| 11 | 10.60450 | 2.41110 | 1.49700 | 81.6 |
| 12 | −13.18500 | 0.40000 | 1.80610 | 33.3 |
| 13 | 11.01460 | 0.52340 | | |
| 14* | 14.63870 | 1.72540 | 1.51443 | 63.3 |
| 15 | −13.70590 | Variable | | |
| 16* | −21.97800 | 0.70000 | 1.60602 | 57.4 |
| 17 | 7.83670 | Variable | | |
| 18* | 14.92530 | 3.19200 | 1.60602 | 57.4 |
| 19* | −15.19790 | 3.00000 | | |
| 20 | ∞ | 0.90000 | 1.51680 | 64.2 |
| 21 | ∞ | (BF) | | |
| Image surface | ∞ | | | |

TABLE III-2

(Aspherical data)

Surface No. 2

K = 0.00000E+00, A4 = −1.49464E−04, A6 = −1.58314E−06,
A8 = 4.17563E−09 A10 = −4.79826E−10

Surface No. 9

K = −5.82917E−01, A4 = 1.30605E−04, A6 = 1.98173E−08,
A8 = 9.67527E−08 A10 = 9.66103E−10

Surface No. 14

K = 0.00000E+00, A4 = −1.03877E−03, A6 = −5.40190E−06,
A8 = −9.66942E−07 A10 = 0.00000E+00

Surface No. 16

K = 0.00000E+00, A4 = 8.21295E−05, A6 = −1.49070E−05,
A8 = 1.34122E−06 A10 = 0.00000E+00

Surface No. 18

K = 0.00000E+00, A4 = 8.39781E−05, A6 = −2.02414E−06,
A8 = −2.87245E−07 A10 = 0.00000E+00

TABLE III-2-continued (Aspherical data)

Surface No. 19

K = 0.00000E+00, A4 = 4.71514E−04, A6 = −1.90431E−05,
A8 = 0.00000E+00 A10 = 0.00000E+00

TABLE III-3

(Various data)

Zooming ratio 4.36001

| | Wide-angle limit | Middle position | Telephoto limit |
|---|---|---|---|
| Focal length | 5.0600 | 10.9698 | 22.0617 |
| F-number | 3.42032 | 5.37244 | 6.09970 |
| View angle | 41.0733 | 19.4013 | 9.6628 |
| Image height | 3.8300 | 3.8300 | 3.8300 |
| Overall length of lens system | 54.8694 | 54.8725 | 54.8989 |
| BF | 0.36937 | 0.37248 | 0.39889 |
| d7 | 16.8199 | 8.0052 | 0.9000 |
| d15 | 3.8000 | 5.5758 | 13.1619 |
| d17 | 2.8093 | 9.8482 | 9.3673 |

Zoom lens unit data

| Lens unit | Initial surface | Focal length |
|---|---|---|
| 1 | 1 | −8.20945 |
| 2 | 8 | 10.00098 |
| 3 | 16 | −9.44873 |
| 4 | 18 | 12.94317 |

NUMERICAL EXAMPLE III-2

The zoom lens system of Numerical Example III-2 corresponds to Embodiment III-2 shown in FIG. 30. Table III-4 shows the surface data of the zoom lens system of Numerical Example III-2. Table III-5 shows the aspherical data. Table III-6 shows various data.

TABLE III-4

(Surface data)

| Surface number | r | d | nd | vd |
|---|---|---|---|---|
| Object surface | ∞ | | | |
| 1 | 27.68260 | 0.70000 | 1.99000 | 30.0 |
| 2* | 9.88200 | 2.32000 | | |
| 3 | ∞ | 8.76000 | 1.84666 | 23.8 |
| 4 | ∞ | 2.07150 | | |
| 5 | −7.33240 | 0.40000 | 1.72916 | 54.7 |
| 6 | 36.79370 | 1.47050 | 1.84666 | 23.8 |
| 7 | −16.39040 | Variable | | |
| 8 (Diaphragm) | ∞ | −0.20000 | | |
| 9* | 7.24310 | 2.35250 | 1.51443 | 63.3 |
| 10 | 27.34760 | 0.99730 | | |
| 11 | 7.57810 | 2.89970 | 1.49700 | 81.6 |
| 12 | −9.52940 | 0.40000 | 1.80610 | 33.3 |
| 13 | 19.47650 | 0.30000 | | |
| 14* | 16.24680 | 1.66540 | 1.51443 | 63.3 |
| 15 | −13.22920 | Variable | | |
| 16* | −21.97800 | 0.70000 | 1.60602 | 57.4 |
| 17 | 7.08230 | Variable | | |

TABLE III-4-continued (Surface data)

| Surface number | r | d | nd | vd |
|---|---|---|---|---|
| 18* | 15.64430 | 2.70290 | 1.60602 | 57.4 |
| 19* | −15.96620 | 3.00000 | | |
| 20 | ∞ | 0.90000 | 1.51680 | 64.2 |
| 21 | ∞ | (BF) | | |
| Image surface | ∞ | | | |

TABLE III-5

(Aspherical data)

Surface No. 2

K = 0.00000E+00, A4 = −7.82078E−05, A6 = −2.22356E−06,
A8 = 4.77213E−08 A10 = −9.42847E−10

Surface No. 9

K = −3.70659E−01, A4 = 1.88011E−04, A6 = 1.95044E−06,
A8 = 7.98942E−08 A10 = 3.71832E−09

Surface No. 14

K = 0.00000E+00, A4 = −1.38155E−03, A6 = −6.73421E−06,
A8 = −6.05089E−07 A10 = 0.00000E+00

Surface No. 16

K = 0.00000E+00, A4 = 1.46224E−04, A6 = 2.48664E−06,
A8 = 1.18843E−08 A10 = 0.00000E+00

Surface No. 18

K = 0.00000E+00, A4 = 2.48033E−04, A6 = 1.83654E−07,
A8 = −4.07955E−07 A10 = 0.00000E+00

Surface No. 19

K = 0.00000E+00, A4 = 7.39038E−04, A6 = −2.40974E−05,
A8 = 0.00000E+00 A10 = 0.00000E+00

TABLE III-6

(Various data)

Zooming ratio 4.36002

| | Wide-angle limit | Middle position | Telephoto limit |
|---|---|---|---|
| Focal length | 5.0600 | 10.9699 | 22.0618 |
| F-number | 3.41984 | 5.38986 | 6.09991 |
| View angle | 41.2302 | 19.3410 | 9.6671 |
| Image height | 3.8300 | 3.8300 | 3.8300 |
| Overall length of lens system | 54.8707 | 54.8396 | 54.8996 |
| BF | 0.37075 | 0.33970 | 0.39958 |
| d7 | 16.6602 | 8.0150 | 0.9000 |
| d15 | 3.8000 | 5.2311 | 11.3415 |
| d17 | 2.6000 | 9.8140 | 10.8187 |

Zoom lens unit data

| Lens unit | Initial surface | Focal length |
|---|---|---|
| 1 | 1 | −8.23984 |
| 2 | 8 | 9.84307 |
| 3 | 16 | −8.75882 |
| 4 | 18 | 13.47358 |

NUMERICAL EXAMPLE III-3

The zoom lens system of Numerical Example III-3 corresponds to Embodiment III-3 shown in FIG. 33. Table III-7 shows the surface data of the zoom lens system of Numerical Example III-3. Table III-8 shows the aspherical data. Table III-9 shows various data.

TABLE III-7

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.67540 | 2.40000 | | |
| 3 | ∞ | 8.20000 | 1.90366 | 31.3 |
| 4 | ∞ | 1.94650 | | |
| 5 | −8.36760 | 0.40000 | 1.72916 | 54.7 |
| 6 | 80.26640 | 1.31620 | 1.84666 | 23.8 |
| 7 | −17.33310 | Variable | | |
| 8 (Diaphragm) | ∞ | −0.20000 | | |
| 9* | 7.35140 | 3.62170 | 1.51443 | 63.3 |
| 10 | −23.06860 | 0.30000 | | |
| 11 | 13.55180 | 1.98760 | 1.49700 | 81.6 |
| 12 | −13.34550 | 0.40000 | 1.80610 | 33.3 |
| 13 | 11.42200 | 0.86790 | | |
| 14* | 12.64190 | 1.81530 | 1.51443 | 63.3 |
| 15 | −16.00290 | Variable | | |
| 16* | −30.44990 | 1.00000 | 1.60602 | 57.4 |
| 17 | 8.15580 | Variable | | |
| 18* | 20.79540 | 2.75300 | 1.60602 | 57.4 |
| 19* | −16.91680 | 3.00000 | | |
| 20 | ∞ | 0.90000 | 1.51680 | 64.2 |
| 21 | ∞ | (BF) | | |
| Image surface | ∞ | | | |

TABLE III-8

(Aspherical data)

Surface No. 1

K = 0.00000E+00, A4 = −5.80957E−05, A6 = 5.75334E−06,
A8 = −4.57318E−08 A10 = 0.00000E+00

Surface No. 2

K = 0.00000E+00, A4 = −1.53579E−04, A6 = 3.15322E−06,
A8 = 1.87487E−07 A10 = −2.34224E−09

Surface No. 9

K = 2.72796E−01, A4 = −2.60368E−04, A6 = −6.79034E−06,
A8 = 8.12022E−08 A10 = −4.68069E−09

Surface No. 14

K = 0.00000E+00, A4 = −6.83488E−04, A6 = −2.18640E−06,
A8 = −2.68525E−07 A10 = 0.00000E+00

Surface No. 16

K = 0.00000E+00, A4 = −1.22448E−05, A6 = −4.57264E−06,
A8 = −6.27660E−09 A10 = 0.00000E+00

Surface No. 18

K = 0.00000E+00, A4 = 1.96392E−04, A6 = −4.52179E−06,
A8 = −2.50220E−07 A10 = 0.00000E+00

Surface No. 19

K = 0.00000E+00, A4 = 5.97787E−04, A6 = −2.33004E−05,
A8 = 0.00000E+00 A10 = 0.00000E+00

TABLE III-9

(Various data)
Zooming ratio 4.35998

|  | Wide-angle limit | Middle position | Telephoto limit |
|---|---|---|---|
| Focal length | 5.0600 | 10.9694 | 22.0616 |
| F-number | 3.41995 | 5.39056 | 6.10017 |
| View angle | 40.9469 | 19.4263 | 9.6732 |
| Image height | 3.8300 | 3.8300 | 3.8300 |
| Overall length of lens system | 54.8826 | 54.8454 | 54.8651 |
| BF | 0.38267 | 0.34548 | 0.36524 |
| d7 | 17.0121 | 8.2170 | 0.9000 |
| d15 | 3.6000 | 4.9358 | 12.0735 |
| d17 | 2.6796 | 10.1389 | 10.3182 |

Zoom lens unit data

| Lens unit | Initial surface | Focal length |
|---|---|---|
| 1 | 1 | −8.24413 |
| 2 | 8 | 10.24622 |
| 3 | 16 | −10.51211 |
| 4 | 18 | 15.82879 |

NUMERICAL EXAMPLE III-4

The zoom lens system of Numerical Example III-4 corresponds to Embodiment III-4 shown in FIG. 36. Table III-10 shows the surface data of the zoom lens system of Numerical Example III-4. Table III-11 shows the aspherical data. Table III-12 shows various data.

TABLE III-10

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.84280 | 2.40000 | | |
| 3 | ∞ | 8.20000 | 1.90366 | 31.3 |
| 4 | ∞ | 1.65900 | | |
| 5 | −8.81320 | 0.40000 | 1.72916 | 54.7 |
| 6 | 46.52790 | 1.38800 | 1.84666 | 23.8 |
| 7 | −19.52110 | Variable | | |
| 8 (Diaphragm) | ∞ | −0.20000 | | |
| 9* | 7.44880 | 3.63340 | 1.51443 | 63.3 |
| 10 | −27.36940 | 0.35780 | | |
| 11 | 11.74260 | 2.11680 | 1.49700 | 81.6 |
| 12 | −13.21450 | 0.40000 | 1.80610 | 33.3 |
| 13 | 11.19570 | 0.42130 | | |
| 14* | 12.64190 | 1.79540 | 1.51443 | 63.3 |
| 15 | −15.80390 | Variable | | |
| 16* | −22.33870 | 1.00000 | 1.60602 | 57.4 |
| 17 | 6.88070 | Variable | | |
| 18* | 11.22100 | 3.27260 | 1.60602 | 57.4 |
| 19* | −17.08940 | 3.00000 | | |
| 20 | ∞ | 0.90000 | 1.51680 | 64.2 |
| 21 | ∞ | (BF) | | |
| Image surface | ∞ | | | |

TABLE III-11

(Aspherical data)

Surface No. 1

K = 0.00000E+00, A4 = −1.01669E−04, A6 = 6.67457E−06,
A8 = −5.20404E−08 A10 = 0.00000E+00

TABLE III-11-continued (Aspherical data)

Surface No. 2

K = 0.00000E+00, A4 = −2.01288E−04, A6 = 4.19898E−06,
A8 = 1.75627E−07 A10 = −2.12548E−09

Surface No. 9

K = 4.31402E−01, A4 = −2.47963E−04, A6 = −8.89222E−06,
A8 = 2.13615E−07 A10 = −9.80776E−09

Surface No. 14

K = 0.00000E+00, A4 = −7.68546E−04, A6 = −2.35540E−06,
A8 = −4.09337E−07 A10 = 0.00000E+00

Surface No. 16

K = 0.00000E+00, A4 = 1.09701E−04, A6 = 1.20136E−05,
A8 = −1.27262E−06 A10 = 0.00000E+00

Surface No. 18

K = 0.00000E+00, A4 = 2.30030E−04, A6 = 7.28810E−07,
A8 = −2.88100E−07 A10 = 0.00000E+00

Surface No. 19

K = 0.00000E+00, A4 = 7.77861E−04, A6 = −2.13214E−05,
A8 = 0.00000E+00 A10 = 0.00000E+00

TABLE III-12

(Various data)
Zooming ratio 4.35970

|  | Wide-angle limit | Middle position | Telephoto limit |
|---|---|---|---|
| Focal length | 5.0600 | 10.9688 | 22.0602 |
| F-number | 3.42015 | 5.33715 | 6.09987 |
| View angle | 40.1023 | 19.5124 | 9.6954 |
| Image height | 3.7300 | 3.8300 | 3.8300 |
| Overall length of lens system | 54.8782 | 54.8645 | 54.8790 |
| BF | 0.37823 | 0.36451 | 0.37897 |
| d7 | 17.0557 | 8.0561 | 0.9000 |
| d15 | 3.6000 | 5.5359 | 12.7897 |
| d17 | 2.6000 | 9.6637 | 9.5660 |

Zoom lens unit data

| Lens unit | Initial surface | Focal length |
|---|---|---|
| 1 | 1 | −8.37748 |
| 2 | 8 | 10.04190 |
| 3 | 16 | −8.56958 |
| 4 | 18 | 11.68678 |

The following Table III-13 shows the corresponding values to the individual conditions in the zoom lens systems of the numerical examples.

TABLE III-13

(Corresponding values to conditions)

| | Condition | Example III-1 | Example III-2 | Example III-3 | Example III-4 |
|---|---|---|---|---|---|
| (III-1) | $\beta_{3T}/\beta_{3W}$ | 1.308 | 1.417 | 1.360 | 1.321 |
| (III-2) | $(M_{23T} - M_{23W})/f_W$ | 1.850 | 1.490 | 2.248 | 1.816 |
| (III-3) | $\beta_{2T}/\beta_{2W}$ | 3.346 | 3.088 | 3.201 | 3.301 |
| | $f_T/f_W$ | 4.36 | 4.36 | 4.36 | 4.36 |

NUMERICAL EXAMPLE IV-1

The zoom lens system of Numerical Example IV-1 corresponds to Embodiment IV-1 shown in FIG. 40. Table IV-1 shows the surface data of the zoom lens system of Numerical Example IV-1. Table IV-2 shows the aspherical data. Table IV-3 shows various data.

TABLE IV-1

(Surface data)

| Surface number | r | d | nd | vd |
|---|---|---|---|---|
| Object surface | ∞ | | | |
| 1 | 65.98770 | 0.70000 | 1.80470 | 41.0 |
| 2* | 10.42920 | 2.15000 | | |
| 3 | ∞ | 8.70000 | 1.84666 | 23.8 |
| 4 | ∞ | 2.25880 | | |
| 5 | −6.73950 | 0.40000 | 1.72916 | 54.7 |
| 6 | −156.11850 | 1.35690 | 1.84666 | 23.8 |
| 7 | −13.29920 | Variable | | |
| 8 (Diaphragm) | ∞ | −0.20000 | | |
| 9* | 6.96010 | 2.37360 | 1.51443 | 63.3 |
| 10 | −58.40670 | 0.47960 | | |
| 11 | 10.60450 | 2.41110 | 1.49700 | 81.6 |
| 12 | −13.18500 | 0.40000 | 1.80610 | 33.3 |
| 13 | 11.01460 | 0.52340 | | |
| 14* | 14.63870 | 1.72540 | 1.51443 | 63.3 |
| 15 | −13.70590 | Variable | | |
| 16* | −21.97800 | 0.70000 | 1.60602 | 57.4 |
| 17 | 7.83670 | Variable | | |
| 18* | 14.92530 | 3.19200 | 1.60602 | 57.4 |
| 19* | −15.19790 | 3.00000 | | |
| 20 | ∞ | 0.90000 | 1.51680 | 64.2 |
| 21 | ∞ | (BF) | | |
| Image surface | ∞ | | | |

TABLE IV-2

(Aspherical data)

Surface No. 2

K = 0.00000E+00, A4 = −1.49464E−04, A6 = −1.58314E−06, A8 = 4.17563E−09 A10 = −4.79826E−10

Surface No. 9

K = −5.82917E−01, A4 = 1.30605E−04, A6 = 1.98173E−08, A8 = 9.67527E−08 A10 = 9.66103E−10

Surface No. 14

K = 0.00000E+00, A4 = −1.03877E−03, A6 = −5.40190E−06, A8 = −9.66942E−07 A10 = 0.00000E+00

Surface No. 16

K = 0.00000E+00, A4 = 8.21295E−05, A6 = −1.49070E−05, A8 = 1.34122E−06 A10 = 0.00000E+00

TABLE IV-2-continued (Aspherical data)

Surface No. 18

K = 0.00000E+00, A4 = 8.39781E−05, A6 = −2.02414E−06, A8 = −2.87245E−07 A10 = 0.00000E+00

Surface No. 19

K = 0.00000E+00, A4 = 4.71514E−04, A6 = −1.90431E−05, A8 = 0.00000E+00 A10 = 0.00000E+00

TABLE IV-3

(Various data)

Zooming ratio 4.36001

| | Wide-angle limit | Middle position | Telephoto limit |
|---|---|---|---|
| Focal length | 5.0600 | 10.9698 | 22.0617 |
| F-number | 3.42032 | 5.37244 | 6.09970 |
| View angle | 41.0733 | 19.4013 | 9.6628 |
| Image height | 3.8300 | 3.8300 | 3.8300 |
| Overall length of lens system | 54.8694 | 54.8725 | 54.8989 |
| BF | 0.36937 | 0.37248 | 0.39889 |
| d7 | 16.8199 | 8.0052 | 0.9000 |
| d15 | 3.8000 | 5.5758 | 13.1619 |
| d17 | 2.8093 | 9.8482 | 9.3673 |

Zoom lens unit data

| Lens unit | Initial surface | Focal length |
|---|---|---|
| 1 | 1 | −8.20945 |
| 2 | 8 | 10.00098 |
| 3 | 16 | −9.44873 |
| 4 | 18 | 12.94317 |

NUMERICAL EXAMPLE IV-2

The zoom lens system of Numerical Example IV-2 corresponds to Embodiment IV-2 shown in FIG. 43. Table IV-4 shows the surface data of the zoom lens system of Numerical Example IV-2. Table IV-5 shows the aspherical data. Table IV-6 shows various data.

TABLE IV-4

(Surface data)

| Surface number | r | d | nd | vd |
|---|---|---|---|---|
| Object surface | ∞ | | | |
| 1 | 20.29870 | 0.70000 | 1.80470 | 41.0 |
| 2* | 9.12120 | 2.30360 | | |
| 3 | ∞ | 8.76000 | 1.84666 | 23.8 |
| 4 | ∞ | 1.55580 | | |
| 5 | −9.88260 | 0.40000 | 1.72916 | 54.7 |
| 6 | 18.44150 | 1.32940 | 1.84666 | 23.8 |
| 7 | −61.66310 | Variable | | |
| 8 (Diaphragm) | ∞ | −0.20000 | | |
| 9* | 8.05600 | 2.39450 | 1.51443 | 63.3 |
| 10 | −55.46670 | 0.30000 | | |
| 11 | 9.52760 | 2.55560 | 1.49700 | 81.6 |
| 12 | −15.06270 | 0.40000 | 1.80610 | 33.3 |
| 13 | 14.77460 | 0.54890 | | |
| 14* | 18.21700 | 1.79420 | 1.51443 | 63.3 |
| 15 | −13.27360 | Variable | | |
| 16* | −24.99250 | 0.70000 | 1.60602 | 57.4 |
| 17 | 6.02440 | Variable | | |

TABLE IV-4-continued (Surface data)

| Surface number | r | d | nd | vd |
|---|---|---|---|---|
| 18* | 12.16420 | 2.78040 | 1.60602 | 57.4 |
| 19* | −23.38690 | 3.00000 | | |
| 20 | ∞ | 0.90000 | 1.51680 | 64.2 |
| 21 | ∞ | (BF) | | |
| Image surface | ∞ | | | |

TABLE IV-5

(Aspherical data)

Surface No. 2

K = 0.00000E+00, A4 = −4.14435E−05, A6 = −1.42629E−06,
A8 = 8.46111E−08 A10 = −1.65884E−09
Surface No. 9

K = −5.37131E−01, A4 = 1.10009E−04, A6 = −7.66573E−07,
A8 = 1.26355E−07 A10 = −4.74800E−10
Surface No. 14

K = 0.00000E+00, A4 = −9.53499E−04, A6 = −2.03088E−06,
A8 = −5.12543E−07 A10 = 0.00000E+00
Surface No. 16

K = 0.00000E+00, A4 = 2.24120E−04, A6 = −2.16424E−05,
A8 = 2.46375E−06 A10 = 0.00000E+00
Surface No. 18

K = 0.00000E+00, A4 = 3.24834E−04, A6 = 5.65419E−06,
A8 = −4.96504E−08 A10 = 0.00000E+00
Surface No. 19

K = 0.00000E+00, A4 = 5.49934E−04, A6 = −3.71238E−06,
A8 = 0.00000E+00 A10 = 0.00000E+00

TABLE IV-6

(Various data)

Zooming ratio 4.49999

| | Wide-angle limit | Middle position | Telephoto limit |
|---|---|---|---|
| Focal length | 6.1719 | 10.9699 | 27.7733 |
| F-number | 3.41944 | 4.76199 | 6.09949 |
| View angle | 35.3519 | 19.9384 | 7.8018 |
| Image height | 3.8300 | 3.8300 | 3.8300 |
| Overall length of lens system | 54.8801 | 54.8866 | 54.8404 |
| BF | 0.38005 | 0.38658 | 0.34042 |
| d7 | 16.3236 | 9.9741 | 0.9000 |
| d15 | 3.8000 | 5.0398 | 14.8262 |
| d17 | 4.1540 | 9.2637 | 8.5514 |

Zoom lens unit data

| Lens unit | Initial surface | Focal length |
|---|---|---|
| 1 | 1 | −8.34735 |
| 2 | 8 | 9.45624 |
| 3 | 16 | −7.94247 |
| 4 | 18 | 13.60585 |

NUMERICAL EXAMPLE IV-3

The zoom lens system of Numerical Example IV-3 corresponds to Embodiment IV-3 shown in FIG. 46. Table IV-7 shows the surface data of the zoom lens system of Numerical Example IV-3. Table IV-8 shows the aspherical data. Table IV-9 shows various data.

TABLE IV-7

(Surface data)

| Surface number | r | d | nd | vd |
|---|---|---|---|---|
| Object surface | ∞ | | | |
| 1 | 1001.79760 | 0.70000 | 1.80470 | 41.0 |
| 2* | 9.25290 | 2.32000 | | |
| 3 | ∞ | 8.76000 | 1.84666 | 23.8 |
| 4 | ∞ | 2.71790 | | |
| 5 | −6.08970 | 0.40000 | 1.72916 | 54.7 |
| 6 | −18.90120 | 1.40010 | 1.84666 | 23.8 |
| 7 | −9.07790 | Variable | | |
| 8 (Diaphragm) | ∞ | −0.20000 | | |
| 9* | 6.77300 | 3.18120 | 1.51443 | 63.3 |
| 10 | −39.17620 | 0.74890 | | |
| 11 | 25.31540 | 2.27680 | 1.49700 | 81.6 |
| 12 | −7.14450 | 0.40000 | 1.80610 | 33.3 |
| 13 | 24.66600 | 0.36590 | | |
| 14* | 25.89720 | 2.16020 | 1.51443 | 63.3 |
| 15 | −10.29080 | Variable | | |
| 16* | −21.97800 | 0.70000 | 1.60602 | 57.4 |
| 17 | 11.59350 | Variable | | |
| 18* | 26.58070 | 2.51440 | 1.60602 | 57.4 |
| 19* | −12.51780 | 3.00000 | | |
| 20 | ∞ | 0.90000 | 1.51680 | 64.2 |
| 21 | ∞ | (BF) | | |
| Image surface | ∞ | | | |

TABLE IV-8

(Aspherical data)

Surface No. 2

K = 0.00000E+00, A4 = −2.01792E−04, A6 = −4.37333E−06,
A8 = 1.66380E−08 A10 = −5.75782E−10
Surface No. 9

K = −5.49906E−01, A4 = 1.24190E−04, A6 = 1.47047E−06,
A8 = −9.51055E−09 A10 = 6.33967E−09
Surface No. 14

K = 0.00000E+00, A4 = −8.48846E−04, A6 = −2.27336E−06,
A8 = −5.96615E−07 A10 = 0.00000E+00
Surface No. 16

K = 0.00000E+00, A4 = −1.72324E−04, A6 = −2.88270E−05,
A8 = 1.58378E−06 A10 = 0.00000E+00
Surface No. 18

K = 0.00000E+00, A4 = −4.38292E−05, A6 = 1.49332E−05,
A8 = 1.80473E−07 A10 = 0.00000E+00
Surface No. 19

K = 0.00000E+00, A4 = 1.67595E−04, A6 = 2.25549E−05,
A8 = 0.00000E+00 A10 = 0.00000E+00

TABLE IV-9

(Various data)

Zooming ratio 4.04998

| | Wide-angle limit | Middle position | Telephoto limit |
|---|---|---|---|
| Focal length | 4.3500 | 7.4474 | 17.6174 |
| F-number | 3.42015 | 4.79568 | 6.09994 |
| View angle | 42.9474 | 26.2633 | 11.3236 |

TABLE IV-9-continued (Various data)

| | | | |
|---|---|---|---|
| Image height | 3.6000 | 3.6000 | 3.6000 |
| Overall length of lens system | 56.8964 | 56.8410 | 56.8992 |
| BF | 0.39644 | 0.34098 | 0.39923 |
| d7 | 17.7546 | 11.1758 | 0.9000 |
| d15 | 3.8000 | 3.7257 | 8.9165 |
| d17 | 2.6000 | 9.2531 | 14.3381 |

Zoom lens unit data

| Lens unit | Initial surface | Focal length |
|---|---|---|
| 1 | 1 | −8.49995 |
| 2 | 8 | 10.91766 |
| 3 | 16 | −12.42629 |
| 4 | 18 | 14.39184 |

NUMERICAL EXAMPLE IV-4

The zoom lens system of Numerical Example IV-4 corresponds to Embodiment IV-4 shown in FIG. 49. Table IV-10 shows the surface data of the zoom lens system of Numerical Example IV-4. Table IV-11 shows the aspherical data. Table IV-12 shows various data.

TABLE IV-10

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.84280 | 2.40000 | | |
| 3 | ∞ | 8.20000 | 1.90366 | 31.3 |
| 4 | ∞ | 1.65900 | | |
| 5 | −8.81320 | 0.40000 | 1.72916 | 54.7 |
| 6 | 46.52790 | 1.38800 | 1.84666 | 23.8 |
| 7 | −19.52110 | Variable | | |
| 8 (Diaphragm) | ∞ | −0.20000 | | |
| 9* | 7.44880 | 3.63340 | 1.51443 | 63.3 |
| 10 | −27.36940 | 0.35780 | | |
| 11 | 11.74260 | 2.11680 | 1.49700 | 81.6 |
| 12 | −13.21450 | 0.40000 | 1.80610 | 33.3 |
| 13 | 11.19570 | 0.42130 | | |
| 14* | 12.64190 | 1.79540 | 1.51443 | 63.3 |
| 15 | −15.80390 | Variable | | |
| 16* | −22.33870 | 1.00000 | 1.60602 | 57.4 |
| 17 | 6.88070 | Variable | | |
| 18* | 11.22100 | 3.27260 | 1.60602 | 57.4 |
| 19* | −17.08940 | 3.00000 | | |
| 20 | ∞ | 0.90000 | 1.51680 | 64.2 |
| 21 | ∞ | (BF) | | |
| Image surface | ∞ | | | |

TABLE IV-11

(Aspherical data)

Surface No. 1

K = 0.00000E+00, A4 = −1.01669E−04, A6 = 6.67457E−06, A8 = −5.20404E−08 A10 = 0.00000E+00
Surface No. 2

K = 0.00000E+00, A4 = −2.01288E−04, A6 = 4.19898E−06, A8 = 1.75627E−07 A10 = −2.12548E−09

TABLE IV-11-continued (Aspherical data)

Surface No. 9

K = 4.31402E−01, A4 = −2.47963E−04, A6 = −8.89222E−06, A8 = 2.13615E−07 A10 = −9.80776E−09
Surface No. 14

K = 0.00000E+00, A4 = −7.68546E−04, A6 = −2.35540E−06, A8 = −4.09337E−07 A10 = 0.00000E+00
Surface No. 16

K = 0.00000E+00, A4 = 1.09701E−04, A6 = 1.20136E−05, A8 = −1.27262E−06 A10 = 0.00000E+00
Surface No. 18

K = 0.00000E+00, A4 = 2.30030E−04, A6 = 7.28810E−07, A8 = −2.88100E−07 A10 = 0.00000E+00
Surface No. 19

K = 0.00000E+00, A4 = 7.77861E−04, A6 = −2.13214E−05, A8 = 0.00000E+00 A10 = 0.00000E+00

TABLE IV-12

(Various data)

Zooming ratio 4.35970

| | Wide-angle limit | Middle position | Telephoto limit |
|---|---|---|---|
| Focal length | 5.0600 | 10.9688 | 22.0602 |
| F-number | 3.42015 | 5.33715 | 6.09987 |
| View angle | 40.1023 | 19.5124 | 9.6954 |
| Image height | 3.7300 | 3.8300 | 3.8300 |
| Overall length of lens system | 54.8782 | 54.8645 | 54.8790 |
| BF | 0.37823 | 0.36451 | 0.37897 |
| d7 | 17.0557 | 8.0561 | 0.9000 |
| d15 | 3.6000 | 5.5359 | 12.7897 |
| d17 | 2.6000 | 9.6637 | 9.5660 |

Zoom lens unit data

| Lens unit | Initial surface | Focal length |
|---|---|---|
| 1 | 1 | −8.37748 |
| 2 | 8 | 10.04190 |
| 3 | 16 | −8.56958 |
| 4 | 18 | 11.68678 |

The following Table IV-13 shows the corresponding values to the individual conditions in the zoom lens systems of the numerical examples.

TABLE IV-13

(Corresponding values to conditions)

| | | Example | | | |
|---|---|---|---|---|---|
| Condition | | IV-1 | IV-2 | IV-3 | IV-4 |
| (IV-1) | $(D_T - D_W)/f_W$ | 0.136 | 0.105 | 0.140 | 0.125 |
| (IV-2) | $|f_{G1}|/f_T$ | 0.372 | 0.301 | 0.482 | 0.380 |
| (IV-3) | $T_{G2}/f_W$ | 3.146 | 2.499 | 3.875 | 3.193 |
| | $f_T/f_W$ | 4.36 | 4.50 | 4.05 | 4.36 |

NUMERICAL EXAMPLE V-1

The zoom lens system of Numerical Example V-1 corresponds to Embodiment V-1 shown in FIG. 53. Table V-1 shows the surface data of the zoom lens system of Numerical Example V-1. Table V-2 shows the aspherical data. Table V-3 shows various data.

TABLE V-1

(Surface data)

| Surface number | r | d | nd | vd |
|---|---|---|---|---|
| Object surface | ∞ | | | |
| 1 | 20.29870 | 0.70000 | 1.80470 | 41.0 |
| 2* | 9.12120 | 2.30360 | | |
| 3 | ∞ | 8.76000 | 1.84666 | 23.8 |
| 4 | ∞ | 1.55580 | | |
| 5 | −9.88260 | 0.40000 | 1.72916 | 54.7 |
| 6 | 18.44150 | 1.32940 | 1.84666 | 23.8 |
| 7 | −61.66310 | Variable | | |
| 8 (Diaphragm) | ∞ | −0.20000 | | |
| 9* | 8.05600 | 2.39450 | 1.51443 | 63.3 |
| 10 | −55.46670 | 0.30000 | | |
| 11 | 9.52760 | 2.55560 | 1.49700 | 81.6 |
| 12 | −15.06270 | 0.40000 | 1.80610 | 33.3 |
| 13 | 14.77460 | 0.54890 | | |
| 14* | 18.21700 | 1.79420 | 1.51443 | 63.3 |
| 15 | −13.27360 | Variable | | |
| 16* | −24.99250 | 0.70000 | 1.60602 | 57.4 |
| 17 | 6.02440 | Variable | | |
| 18* | 12.16420 | 2.78040 | 1.60602 | 57.4 |
| 19* | −23.38690 | 3.00000 | | |
| 20 | ∞ | 0.90000 | 1.51680 | 64.2 |
| 21 | ∞ | (BF) | | |
| Image surface | ∞ | | | |

TABLE V-2

(Aspherical data)

Surface No. 2

K = 0.00000E+00, A4 = −4.14435E−05, A6 = −1.42629E−06, A8 = 8.46111E−08 A10 = −1.65884E−09

Surface No. 9

K = −5.37131E−01, A4 = 1.10009E−04, A6 = −7.66573E−07, A8 = 1.26355E−07 A10 = −4.74800E−10

Surface No. 14

K = 0.00000E+00, A4 = −9.53499E−04, A6 = −2.03088E−06, A8 = −5.12543E−07 A10 = 0.00000E+00

Surface No. 16

K = 0.00000E+00, A4 = 2.24120E−04, A6 = −2.16424E−05, A8 = 2.46375E−06 A10 = 0.00000E+00

Surface No. 18

K = 0.00000E+00, A4 = 3.24834E−04, A6 = 5.65419E−06, A8 = −4.96504E−08 A10 = 0.00000E+00

Surface No. 19

K = 0.00000E+00, A4 = 5.49934E−04, A6 = −3.71238E−06, A8 = 0.00000E+00 A10 = 0.00000E+00

TABLE V-3

(Various data)

Zooming ratio 4.49999

| | Wide-angle limit | Middle position | Telephoto limit |
|---|---|---|---|
| Focal length | 6.1719 | 10.9699 | 27.7733 |
| F-number | 3.41944 | 4.76199 | 6.09949 |
| View angle | 35.3519 | 19.9384 | 7.8018 |

TABLE V-3-continued (Various data)

| | | | |
|---|---|---|---|
| Image height | 3.8300 | 3.8300 | 3.8300 |
| Overall length of lens system | 54.8801 | 54.8866 | 54.8404 |
| BF | 0.38005 | 0.38658 | 0.34042 |
| d7 | 16.3236 | 9.9741 | 0.9000 |
| d15 | 3.8000 | 5.0398 | 14.8262 |
| d17 | 4.1540 | 9.2637 | 8.5514 |

Zoom lens unit data

| Lens unit | Initial surface | Focal length |
|---|---|---|
| 1 | 1 | −8.34735 |
| 2 | 8 | 9.45624 |
| 3 | 16 | −7.94247 |
| 4 | 18 | 13.60585 |

NUMERICAL EXAMPLE V-2

The zoom lens system of Numerical Example V-2 corresponds to Embodiment V-2 shown in FIG. 56. Table V-4 shows the surface data of the zoom lens system of Numerical Example V-2. Table V-5 shows the aspherical data. Table V-6 shows various data.

TABLE V-4

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.05460 | 2.40000 | | |
| 3 | ∞ | 8.20000 | 1.90366 | 31.3 |
| 4 | ∞ | 1.79480 | | |
| 5 | −7.29300 | 0.40000 | 1.72916 | 54.7 |
| 6 | 51.67020 | 1.25610 | 1.84666 | 23.8 |
| 7 | −16.01680 | Variable | | |
| 8 (Diaphragm) | ∞ | −0.20000 | | |
| 9* | 6.31610 | 1.79240 | 1.51443 | 63.3 |
| 10 | −31.94710 | 1.15530 | | |
| 11 | 14.47630 | 1.68690 | 1.49700 | 81.6 |
| 12 | −9.23390 | 0.40000 | 1.80610 | 33.3 |
| 13 | 12.37640 | 0.34220 | | |
| 14* | 12.64190 | 1.68910 | 1.51443 | 63.3 |
| 15 | −9.65280 | Variable | | |
| 16* | −18.02530 | 1.00000 | 1.60602 | 57.4 |
| 17 | 9.41540 | Variable | | |
| 18* | 12.04590 | 2.31880 | 1.60602 | 57.4 |
| 19* | −37.52260 | 3.00000 | | |
| 20 | ∞ | 0.90000 | 1.51680 | 64.2 |
| 21 | ∞ | (BF) | | |
| Image surface | ∞ | | | |

TABLE V-5

(Aspherical data)

Surface No. 1

K = 0.00000E+00, A4 = 1.01532E−04, A6 = 6.38228E−06, A8 = −7.41560E−08 A10 = 0.00000E+00

Surface No. 2

K = 0.00000E+00, A4 = 1.33841E−05, A6 = 6.04275E−06, A8 = 3.07502E−07 A10 = −4.24528E−09

TABLE V-5-continued (Aspherical data)

Surface No. 9

K = −8.55586E−01, A4 = 2.51345E−04, A6 = −6.61856E−06,
A8 = 1.04518E−06 A10 = −4.26656E−08

Surface No. 14

K = 0.00000E+00, A4 = −1.30679E−03, A6 = −3.99207E−07,
A8 = −1.18313E−06 A10 = 0.00000E+00

Surface No. 16

K = 0.00000E+00, A4 = −5.52385E−05, A6 = 2.81045E−05,
A8 = −2.69002E−06 A10 = 0.00000E+00

Surface No. 18

K = 0.00000E+00, A4 = 7.91723E−04, A6 = −3.20236E−06,
A8 = 7.90273E−08 A10 = 0.00000E+00

Surface No. 19

K = 0.00000E+00, A4 = 1.29141E−03, A6 = −1.28340E−05,
8 = 0.00000E+00 A10 = 0.00000E+00

TABLE V-6

(Various data)

Zooming ratio 3.00001

|  | Wide-angle limit | Middle position | Telephoto limit |
|---|---|---|---|
| Focal length | 5.0600 | 8.7600 | 15.1800 |
| F-number | 3.42036 | 4.64963 | 6.09956 |
| View angle | 41.0695 | 24.2213 | 14.0117 |
| Image height | 3.8300 | 3.8300 | 3.8300 |
| Overall length of lens system | 46.3698 | 46.3498 | 46.3822 |
| BF | 0.36982 | 0.34977 | 0.38215 |
| d7 | 11.1644 | 5.8484 | 0.9000 |
| d15 | 3.6000 | 4.9090 | 9.7442 |
| d17 | 2.6000 | 6.6070 | 6.7202 |

Zoom lens unit data

| Lens unit | Initial surface | Focal length |
|---|---|---|
| 1 | 1 | −7.03470 |
| 2 | 8 | 8.88480 |
| 3 | 16 | −10.06718 |
| 4 | 18 | 15.31701 |

NUMERICAL EXAMPLE V-3

The zoom lens system of Numerical Example V-3 corresponds to Embodiment V-3 shown in FIG. 59. Table V-7 shows the surface data of the zoom lens system of Numerical Example V-3. Table V-8 shows the aspherical data. Table V-9 shows various data.

TABLE V-7

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.67540 | 2.40000 | | |
| 3 | ∞ | 8.20000 | 1.90366 | 31.3 |
| 4 | ∞ | 1.94650 | | |
| 5 | −8.36760 | 0.40000 | 1.72916 | 54.7 |
| 6 | 80.26640 | 1.31620 | 1.84666 | 23.8 |
| 7 | −17.33310 | Variable | | |
| 8 (Diaphragm) | ∞ | −0.20000 | | |
| 9* | 7.35140 | 3.62170 | 1.51443 | 63.3 |
| 10 | −23.06860 | 0.30000 | | |
| 11 | 13.55180 | 1.98760 | 1.49700 | 81.6 |
| 12 | −13.34550 | 0.40000 | 1.80610 | 33.3 |
| 13 | 11.42200 | 0.86790 | | |
| 14* | 12.64190 | 1.81530 | 1.51443 | 63.3 |
| 15 | −16.00290 | Variable | | |
| 16* | −30.44990 | 1.00000 | 1.60602 | 57.4 |
| 17 | 8.15580 | Variable | | |
| 18* | 20.79540 | 2.75300 | 1.60602 | 57.4 |
| 19* | −16.91680 | 3.00000 | | |
| 20 | ∞ | 0.90000 | 1.51680 | 64.2 |
| 21 | ∞ | (BF) | | |
| Image surface | ∞ | | | |

TABLE V-8

(Aspherical data)

Surface No. 1

K = 0.00000E+00, A4 = −5.80957E−05, A6 = 5.75334E−06,
A8 = −4.57318E−08 A10 = 0.00000E+00

Surface No. 2

K = 0.00000E+00, A4 = −1.53579E−04, A6 = 3.15322E−06,
A8 = 1.87487E−07 A10 = −2.34224E−09

Surface No. 9

K = 2.72796E−01, A4 = −2.60368E−04, A6 = −6.79034E−06,
A8 = 8.12022E−08 A10 = −4.68069E−09

Surface No. 14

K = 0.00000E+00, A4 = −6.83488E−04, A6 = −2.18640E−06,
A8 = −2.68525E−07 A10 = 0.00000E+00

Surface No. 16

K = 0.00000E+00, A4 = −1.22448E−05, A6 = −4.57264E−06,
A8 = −6.27660E−09 A10 = 0.00000E+00

Surface No. 18

K = 0.00000E+00, A4 = 1.96392E−04, A6 = −4.52179E−06,
A8 = −2.50220E−07 A10 = 0.00000E+00

Surface No. 19

K = 0.00000E+00, A4 = 5.97787E−04, A6 = −2.33004E−05,
A8 = 0.00000E+00 A10 = 0.00000E+00

TABLE V-9

(Various data)

Zooming ratio 4.35998

|  | Wide-angle limit | Middle position | Telephoto limit |
|---|---|---|---|
| Focal length | 5.0600 | 10.9694 | 22.0616 |
| F-number | 3.41995 | 5.39056 | 6.10017 |
| View angle | 40.9469 | 19.4263 | 9.6732 |
| Image height | 3.8300 | 3.8300 | 3.8300 |
| Overall length of lens system | 54.8826 | 54.8454 | 54.8651 |
| BF | 0.38267 | 0.34548 | 0.36524 |
| d7 | 17.0121 | 8.2170 | 0.9000 |
| d15 | 3.6000 | 4.9358 | 12.0735 |
| d17 | 2.6796 | 10.1389 | 10.3182 |

TABLE V-9-continued (Various data)

Zoom lens unit data

| Lens unit | Initial surface | Focal length |
|---|---|---|
| 1 | 1 | −8.24413 |
| 2 | 8 | 10.24622 |
| 3 | 16 | −10.51211 |
| 4 | 18 | 15.82879 |

NUMERICAL EXAMPLE V-4

The zoom lens system of Numerical Example V-4 corresponds to Embodiment V-4 shown in FIG. 62. Table V-10 shows the surface data of the zoom lens system of Numerical Example V-4. Table V-11 shows the aspherical data. Table V-12 shows various data.

TABLE V-10

(Surface data)

| Surface number | r | d | nd | vd |
|---|---|---|---|---|
| Object surface | ∞ | | | |
| 1* | 32.16900 | 0.50000 | 1.85976 | 40.6 |
| 2* | 8.84280 | 2.40000 | | |
| 3 | ∞ | 8.20000 | 1.90366 | 31.3 |
| 4 | ∞ | 1.65900 | | |
| 5 | −8.81320 | 0.40000 | 1.72916 | 54.7 |
| 6 | 46.52790 | 1.38800 | 1.84666 | 23.8 |
| 7 | −19.52110 | Variable | | |
| 8 (Diaphragm) | ∞ | −0.20000 | | |
| 9* | 7.44880 | 3.63340 | 1.51443 | 63.3 |
| 10 | −27.36940 | 0.35780 | | |
| 11 | 11.74260 | 2.11680 | 1.49700 | 81.6 |
| 12 | −13.21450 | 0.40000 | 1.80610 | 33.3 |
| 13 | 11.19570 | 0.42130 | | |
| 14* | 12.64190 | 1.79540 | 1.51443 | 63.3 |
| 15 | −15.80390 | Variable | | |
| 16* | −22.33870 | 1.00000 | 1.60602 | 57.4 |
| 17 | 6.88070 | Variable | | |
| 18* | 11.22100 | 3.27260 | 1.60602 | 57.4 |
| 19* | −17.08940 | 3.00000 | | |
| 20 | ∞ | 0.90000 | 1.51680 | 64.2 |
| 21 | ∞ | (BF) | | |
| Image surface | ∞ | | | |

TABLE V-11

(Aspherical data)

Surface No. 1

K = 0.00000E+00, A4 = −1.01669E−04, A6 = 6.67457E−06,
A8 = −5.20404E−08 A10 = 0.00000E+00

Surface No. 2

K = 0.00000E+00, A4 = −2.01288E−04, A6 = 4.19898E−06,
A8 = 1.75627E−07 A10 = −2.12548E−09

Surface No. 9

K = 4.31402E−01, A4 = −2.47963E−04, A6 = −8.89222E−06,
A8 = 2.13615E−07 A10 = −9.80776E−09

Surface No. 14

K = 0.00000E+00, A4 = −7.68546E−04, A6 = −2.35540E−06,
A8 = −4.09337E−07 A10 = 0.00000E+00

TABLE V-11-continued (Aspherical data)

Surface No. 16

K = 0.00000E+00, A4 = 1.09701E−04, A6 = 1.20136E−05,
A8 = −1.27262E−06 A10 = 0.00000E+00

Surface No. 18

K = 0.00000E+00, A4 = 2.30030E−04, A6 = 7.28810E−07,
A8 = −2.88100E−07 A10 = 0.00000E+00

Surface No. 19

K = 0.00000E+00, A4 = 7.77861E−04, A6 = −2.13214E−05,
A8 = 0.00000E+00 A10 = 0.00000E+00

TABLE V-12

(Various data)

Zooming ratio 4.35970

| | Wide-angle limit | Middle position | Telephoto limit |
|---|---|---|---|
| Focal length | 5.0600 | 10.9688 | 22.0602 |
| F-number | 3.42015 | 5.33715 | 6.09987 |
| View angle | 40.1023 | 19.5124 | 9.6954 |
| Image height | 3.7300 | 3.8300 | 3.8300 |
| Overall length of lens system | 54.8782 | 54.8645 | 54.8790 |
| BF | 0.37823 | 0.36451 | 0.37897 |
| d7 | 17.0557 | 8.0561 | 0.9000 |
| d15 | 3.6000 | 5.5359 | 12.7897 |
| d17 | 2.6000 | 9.6637 | 9.5660 |

Zoom lens unit data

| Lens unit | Initial surface | Focal length |
|---|---|---|
| 1 | 1 | −8.37748 |
| 2 | 8 | 10.04190 |
| 3 | 16 | −8.56958 |
| 4 | 18 | 11.68678 |

The following Table V-13 shows the corresponding values to the individual conditions in the zoom lens systems of the numerical examples.

TABLE V-13

(Corresponding values to conditions)

| Condition | | Example | | | |
|---|---|---|---|---|---|
| | | V-1 | V-2 | V-3 | V-4 |
| (V-1) | $f_{G4}/f_{G3}$ | −1.713 | −1.521 | −1.506 | −1.364 |
| (V-2) | $1 - \beta_{4T}$ | 0.375 | 0.332 | 0.300 | 0.450 |
| | $f_T/f_W$ | 4.50 | 3.00 | 4.36 | 4.36 |

The zoom lens system according to the present invention is applicable to a digital input device such as a digital camera, a mobile telephone, a PDA (Personal Digital Assistance), a surveillance camera in a surveillance system, a Web camera or a vehicle-mounted camera. In particular, the zoom lens system according to the present invention is suitable for a photographing optical system where high image quality is required like in a digital camera.

Although the present invention has been fully described by way of example with reference to the accompanying drawings, it is to be understood that various changes and modifications will be apparent to those skilled in the art. Therefore, unless otherwise such changes and modification depart from the scope of the present invention, they should be construed as being included therein.

What is claimed is:

1. A zoom lens system comprising multiple lens elements consisting of four lens units, wherein the four lens units are, in order from an object side to an image side, a first lens unit having negative optical power, a second lens unit having positive optical power, a third lens unit having negative optical power, and a fourth lens unit having positive optical power, wherein in zooming from a wide-angle limit to a telephoto limit at the time of image taking, one or more of the four lens units are moved along an optical axis such that an air space between at least any two lens units among the four lens units is varied, so that variable magnification is achieved, wherein the first lens unit includes a lens element having a reflecting surface for bending a light beam incident from the object, and wherein the following conditions are satisfied:

$0.20 < |f_{G1}|/f_T < 0.52$ and $f_T/f_W \geq 4.0$ where, $f_{G1}$ is a composite focal length of the first lens unit, $f_T$ is a focal length of the entire system at a telephoto limit, and $f_W$ is a focal length of the entire system at a wide-angle limit.

2. The zoom lens system as claimed in claim 1, wherein in zooming from a wide-angle limit to a telephoto limit at the time of image taking, the first lens unit does not move along the optical axis.

3. The zoom lens system as claimed in claim 1, wherein each of the first lens unit, the second lens unit, and the third lens unit includes at least one lens element having an aspheric surface.

4. The zoom lens system as claimed in claim 1, wherein an aperture diaphragm is arranged between the first lens unit and the second lens unit.

5. The zoom lens system as claimed in claim 1, satisfying the following conditions:

$0.20 < f_{G2}/f_T < 0.62$ and $f_T/f_W \geq 4.0$ where, $f_{G2}$ is a composite focal length of the second lens unit, $f_T$ is a focal length of the entire system at a telephoto limit, and $f_W$ is a focal length of the entire system at a wide-angle limit.

6. An imaging device capable of outputting an optical image of an object as an electric image signal, comprising:

a zoom lens system that forms the optical image of the object; and an image sensor that converts the optical image formed by the zoom lens system into the electric image signal, wherein in the zoom lens system, the zoom lens system comprises multiple lens elements consisting of four lens units, wherein the four lens units are, in order from an object side to an image side, a first lens unit having negative optical power, a second lens unit having positive optical power, a third lens unit having negative optical power, and a fourth lens unit having positive optical power, wherein in zooming from a wide-angle limit to a telephoto limit at the time of image taking, one or more of the four lens units are moved along an optical axis such that an air space between at least any two lens units among the four lens units is varied, so that variable magnification is achieved, wherein the first lens unit includes a lens element having a reflecting surface for bending a light beam incident from the object, and wherein the following conditions are satisfied:

$0.20 < |f_{G1}|/f_T < 0.52$ and $f_T/f_W \geq 4.0$ where, $f_{G1}$ is a composite focal length of the first lens unit, $f_T$ is a focal length of the entire system at a telephoto limit, and $f_W$ is a focal length of the entire system at a wide-angle limit.

7. A camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein in the zoom lens system, the zoom lens system comprises multiple lens elements consisting of four lens units, wherein the four lens units are, in order from an object side to an image side, a first lens unit having negative optical power, a second lens unit having positive optical power, a third lens unit having negative optical power, and a fourth lens unit having positive optical power, wherein in zooming from a wide-angle limit to a telephoto limit at the time of image taking, one or more of the four lens units are moved along an optical axis such that an air space between at least any two lens units among the four lens units is varied, so that variable magnification is achieved, wherein the first lens unit includes a lens element having a reflecting surface for bending a light beam incident from the object, and wherein the following conditions are satisfied:

$0.20 < |f_{G1}|/f_T < 0.52$ and $f_T/f_W \geq 4.0$ where, $f_{G1}$ is a composite focal length of the first lens unit, $f_T$ is a focal length of the entire system at a telephoto limit, and $f_W$ is a focal length of the entire system at a wide-angle limit.

* * * * *